US012669281B2

(12) United States Patent
Lim et al.

(10) Patent No.: US 12,669,281 B2
(45) Date of Patent: Jun. 30, 2026

(54) REFRIGERATOR

(71) Applicant: SAMSUNG ELECTRONICS CO., LTD., Suwon-si (KR)

(72) Inventors: Suhyeong Lim, Suwon-si (KR); Donghyeon Kwak, Suwon-si (KR); Jaejin Lee, Suwon-si (KR); Hojune Jeon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 50 days.

(21) Appl. No.: 18/738,506

(22) Filed: Jun. 10, 2024

(65) Prior Publication Data

US 2025/0075963 A1 Mar. 6, 2025

Related U.S. Application Data

(63) Continuation of application No. PCT/KR2024/007095, filed on May 24, 2024.

(30) Foreign Application Priority Data

Aug. 30, 2023 (KR) ........................ 10-2023-0114979
Nov. 3, 2023 (KR) ........................ 10-2023-0151228
Jan. 17, 2024 (KR) ........................ 10-2024-0007695

(51) Int. Cl.
*F25D 23/02* (2006.01)
*E05F 1/10* (2006.01)

(52) U.S. Cl.
CPC .............. *F25D 23/028* (2013.01); *E05F 1/10* (2013.01); *E05Y 2900/31* (2013.01)

(58) Field of Classification Search
CPC ............. F25D 23/028; F25D 2323/024; E05Y 2201/264; E05Y 2201/426;
(Continued)

(56) References Cited

U.S. PATENT DOCUMENTS 5,522,656 A * 6/1996 Jenkins ................. E05F 1/1246 292/79
5,988,709 A 11/1999 Lee et al.
(Continued)

FOREIGN PATENT DOCUMENTS

JP 2009-186141 8/2009
JP 2016105033 A * 6/2016 ........... F25D 23/028
(Continued)

OTHER PUBLICATIONS

WO 2021177476 translation (Year: 2021).*
(Continued)

*Primary Examiner* — Hiwot E Tefera
(74) *Attorney, Agent, or Firm* — STAAS & HALSEY LLP

(57) ABSTRACT

A refrigerator including a storage compartment; a rotatable door to open and close the storage compartment; a movable lever mounted on the door; a guide, having first and second contact surfaces, to guide movement of the lever while the door is rotated; and a door pusher to press the door to open the storage compartment. While the door is rotated, the lever is moved along in contact with the guide. While the lever is contacting the first contact surface, the lever applies a force to the door in a direction of closing the storage compartment. While the lever is contacting the second contact surface, the lever applies a force to the door in a direction of opening the storage compartment. The door pusher is operable to press the door in the direction of opening the storage compartment until the lever is in contact with the second contact surface.

14 Claims, 26 Drawing Sheets

(58) Field of Classification Search
CPC ......... E05Y 2201/412; E05Y 2201/434; E05Y 2201/638; E05Y 2900/31; E05F 15/63; E05F 1/10; E05F 15/614
See application file for complete search history.

(56) References Cited

U.S. PATENT DOCUMENTS

| | | | |
|---|---|---|---|
| 7,008,032 B2 | 3/2006 | Chekal et al. | |
| 7,111,362 B2 | 9/2006 | Gordecki | |
| 8,454,102 B2 | 6/2013 | Kim | |
| 8,944,540 B2 | 2/2015 | Kim et al. | |
| 9,322,474 B2 | 4/2016 | Lee et al. | |
| 9,429,356 B2 | 8/2016 | Kim et al. | |
| 10,145,604 B2 | 12/2018 | Kim et al. | |
| 10,837,214 B2 | 11/2020 | Kim et al. | |
| 10,927,587 B2 | 2/2021 | Lee et al. | |
| 10,941,597 B2 | 3/2021 | Lee et al. | |
| 2006/0232176 A1* | 10/2006 | Kim | E05D 7/081 312/401 |
| 2008/0203739 A1* | 8/2008 | Lim | E05C 19/04 292/340 |
| 2013/0264930 A1* | 10/2013 | Kim | E05F 1/00 312/405 |
| 2013/0307398 A1* | 11/2013 | Kim | F25D 23/04 312/404 |
| 2014/0145576 A1* | 5/2014 | White | E05F 1/1253 312/319.1 |
| 2015/0260443 A1* | 9/2015 | Lee | E05C 3/14 312/405 |
| 2015/0260445 A1* | 9/2015 | Kim | E05D 7/04 312/405 |
| 2015/0260447 A1* | 9/2015 | Kim | F25D 27/005 312/405 |
| 2016/0245579 A1* | 8/2016 | Eom | E05F 5/02 |
| 2017/0211304 A1* | 7/2017 | Fang | E05D 7/081 |
| 2017/0261252 A1* | 9/2017 | Son | F25D 11/00 |
| 2018/0347892 A1* | 12/2018 | Kim | E05F 15/619 |

FOREIGN PATENT DOCUMENTS

| | | | |
|---|---|---|---|
| KR | 10-0247727 | 4/2000 | |
| KR | 20-0222902 | 5/2001 | |
| KR | 10-0689929 | 3/2007 | |
| KR | 10-2013-0105543 | 9/2013 | |
| KR | 10-2013-0114963 | 10/2013 | |
| KR | 10-1564911 | 11/2015 | |
| KR | 10-1639435 | 7/2016 | |
| KR | 10-1873115 | 6/2018 | |
| KR | 10-2018-0110374 | 10/2018 | |
| KR | 10-1910655 | 10/2018 | |
| KR | 10-2228916 | 3/2021 | |
| KR | 10-2365864 | 2/2022 | |
| KR | 10-2022-0132619 | 9/2022 | |
| KR | 10-2530915 | 5/2023 | |
| KR | 10-2023-0082479 | 6/2023 | |
| WO | WO-2021177476 A1 * | 9/2021 | F25D 23/028 |
| WO | WO-2022030834 A1 * | 2/2022 | E05F 3/20 |

OTHER PUBLICATIONS

JP 2009186141 translation (Year: 2009).*
KR20-0222902 translation (Year: 2001).*
WO 2022030834 translation (Year: 2022).*
International Search Report dated Sep. 13, 2024 for International Application No. PCT/KR2024/007095.

* cited by examiner

REFRIGERATOR

CROSS-REFERENCE TO RELATED APPLICATIONS

This application is a continuation application, under 35 U.S.C. § 111(a), of International Application No. PCT/KR2024/007095, filed on May 24, 2024, which claims priority under 35 U.S.C. § 119 to Korean Patent Application 10-2023-0114979, filed on Aug. 30, 2023, Korean Patent Application 10-2023-0151228, filed on Nov. 3, 2023, and Korean Patent Application 10-2024-0007695, filed on Jan. 17, 2024, in the Korean Intellectual Property Office, the disclosures of which are incorporated by reference herein in their entireties.

TECHNICAL FIELD

The present disclosure relates to a refrigerator.

BACKGROUND ART

A refrigerator is a device that is composed of a main body including a storage compartment, and a cold air supply system configured to supply cold air to the storage compartment so as to keep food fresh. The storage compartment includes a refrigerating compartment in which food is kept refrigerated by maintaining the temperature at approximately 0 to 5 degrees Celsius, and a freezing compartment in which food is kept frozen by maintaining the temperature at approximately −30 to 0 degrees Celsius. A front surface of the storage compartment is provided to be open for food entry and exit.

The refrigerator uses a compressor, a condenser, an expander, and an evaporator to repeat a cooling cycle of compressing, condensing, expanding, and evaporating a refrigerant. At this time, both the freezing compartment and the refrigerating compartment may be cooled by a single evaporator disposed on the freezing compartment, or the freezing compartment and the refrigerating compartment may each be provided with the evaporator, thereby being cooled independently of each other.

The refrigerator includes a door that opens and closes the storage compartment. The door is rotatable relative to the main body so as to open and close the storage compartment.

The door may be provided to allow a user to hold a handle disposed on the door, and thus the user can open and close the door relative to the main body by rotating the door. Alternatively, the refrigerator may include a door opening and closing structure configured to easily open or close the door.

DISCLOSURE

Technical Problem

The present disclosure is directed to providing a refrigerator including an improved structure to allow a door to be opened automatically.

Further, the present disclosure is directed to providing a refrigerator including an improved structure to allow a door to be easily opened.

Further, the present disclosure is directed to providing a refrigerator including an improved structure to allow a door to rotate to a fully opened position without stopping in a process of opening.

Further, the present disclosure is directed to providing a refrigerator including an improved structure to allow a door to be easily closed.

Technical tasks to be achieved in this document are not limited to the technical tasks mentioned above, and other technical tasks not mentioned will be clearly understood by those skilled in the art from the description below.

Technical Solution

Aspect of embodiments of the disclosure will be set forth in part in the description which follows and, in part, will be apparent from the description, or may be learned by practice of the presented embodiments.

According to an embodiment of the disclosure, a refrigerator may include a main body including a storage compartment; a door configured to be rotatable so as to open and close the storage compartment; a lever mounted on the door and configured to be movable with respect to the door; a guide configured to contact the lever so as to guide movement of the lever while the door is being rotated to open and close the storage compartment, wherein the guide has a first contact surface and a second contact surface; and a door pusher configured to press the door so as to open the storage compartment. The guide, lever, and door pusher may be configured so that, while the door is rotated to open and close the storage compartment, the lever is moved along, and in contact with, the guide, while the lever is in contact with the first contact surface of the guide, the lever applies a force to the door in a direction of closing the storage compartment, while the lever is in contact with the second contact surface of the guide, the lever applies a force to the door in a direction of opening the storage compartment, and the door pusher is operable to press the door in the direction of opening the storage compartment until the lever is in contact with the second contact surface.

According to an embodiment of the disclosure, while rotating the door from a position of the storage compartment being closed to a position of the storage compartment being open, an angle by which the door moves while the lever is in contact with the second contact surface may be greater than an angle by which the door moves while the lever is in contact with the first contact surface.

According to an embodiment of the disclosure, the guide may include a curved point between the first contact surface and the second contact surface. While the door is rotated so as to open the storage compartment, the lever may be sequentially in contact with the first contact surface, the curved point, and the second contact surface. While the door is rotated so as to close the storage compartment, the lever may be sequentially in contact with the second contact surface, the curved point, and the first contact surface.

According to an embodiment of the disclosure, the refrigerator may further include a spring connected to the lever so as to be compressed and stretched in response to the lever moving with respect to the door. The spring may be configured to accumulate a maximum elastic force while the lever is in contact with the curved point. The spring may be configured to be compressed by the lever in response to the lever being moved along the first contact surface toward the curved point. The spring may be configured to apply an elastic force to the door, in the direction of opening the storage compartment, while the lever is being moved away from the curved point along the second contact surface.

According to an embodiment of the disclosure, the door pusher may be configured to be movable between a first pusher position, which is a position of the door pusher while the storage compartment is closed, and a second pusher position to which the door pusher moves to press the door in the direction of opening the storage compartment. The lever may be in contact with the second contact surface while the door pusher is in the second pusher position.

According to an embodiment of the disclosure, the door pusher may be configured to move linearly between the first pusher position and the second pusher position.

According to an embodiment of the disclosure, the door pusher may include a stopper configured to stop the door pusher with respect to the main body when the door pusher reaches the second pusher position.

According to an embodiment of the disclosure, a distance between the stopper and an end of the door pusher configured to contact the door may be equal to a distance the door pusher moves between the first pusher position and the second pusher position.

According to an embodiment of the disclosure, the refrigerator may further include a pusher case mounted on the main body and configured to accommodate at least a portion of the door pusher. The door pusher may be configured to be movable with respect to the pusher case. The pusher case may include a case entrance and exit portion through which the door pusher moves. The stopper may be configured to be locked to the case entrance and exit portion when the door pusher reaches the second pusher position.

According to an embodiment of the disclosure, the refrigerator may further include a power source configured to transmit power to the door pusher; and a controller electrically connected to the power source. The controller may be configured to control the power source to operate the door pusher to press the door until the lever is in contact with the second contact surface based on a condition for opening the storage compartment.

According to an embodiment of the disclosure, the door pusher may be configured to be movable between a first pusher position, which is a position of the door pusher while the storage compartment is closed, and a second pusher position to which the door pusher moves to press the door in the direction of opening the storage compartment. The controller may be configured to control the power source to transmit power to operate the door pusher until the door pusher reaches the second pusher position, based on the condition for opening the storage compartment.

According to an embodiment of the disclosure, the refrigerator may further include a position detection sensor electrically connected to the controller, and configured to detect a position of the door pusher. Based on the door pusher reaching the second pusher position, the controller may be configured to control the power source to operate the door pusher to stop or to move to the first pusher position.

According to an embodiment of the disclosure, the door may be a first door, and the refrigerator may further include a second door disposed in parallel with the first door, and configured to be rotatable so as to open and close the storage compartment, and a rotation bar coupled to the first door so as to be rotatable relative to the first door, and configured to cover a gap between the first door and the second door while the first door and the second door are in positions closing the storage compartment. The rotation bar may be configured to be rotatable between a first bar position with respect to the first door corresponding to the position of the first door in which the storage compartment is closed, and a second bar position with respect to the first door corresponding to a position of the first door in which the storage compartment is open. While the first door is rotated from the position in which the storage compartment is closed, by an angle less than a first opening angle, the lever may be in contact with the first contact surface and the rotation bar may be biased to rotate to the first bar position. While the first door is rotated from the position in which the storage compartment is closed, by an angle that is greater than the first opening angle but less than a second opening angle greater than the first opening angle, the lever may be in contact with the first contact surface and the rotation bar may be biased to rotate to the second bar position. The lever may be in contact with the second contact surface when the first door is rotated, from the position in which the storage compartment is closed, by the second opening angle.

According to an embodiment of the disclosure, the refrigerator may further include a hinge bracket connecting the main body and the door to support the door so that the door is rotatable with respect to the main body. The guide may be coupled to the hinge bracket.

A refrigerator according to an embodiment of the present disclosure may include a main body forming a storage compartment; a door configured to be rotatable so as to open and close the storage compartment, provided to be opened while being rotated in a first direction and provided to be closed while being rotated in a second direction; a guide configured to apply a force in a direction of rotating in the second direction to the door in response to the door being rotated from a position, in which the door is closed, to the first direction by an angle less than a reference angle, and configured to apply a force in a direction of rotating in the first direction to the door in response to the door being rotated from the position, in which the door is closed, to the first direction by an angle greater than the reference angle; and a door pusher mounted on the main body and configured to press the door so as to open the door. The door pusher is configured to press the door until the door is rotated from the position, in which the door is closed, to the first direction by an angle greater than or equal to the reference angle.

A refrigerator according to an embodiment of the present disclosure may include a main body forming a storage compartment; a door configured to be rotatable so as to open and close the storage compartment; a lever mounted on the door; a guide provided to be in contact with the lever in response to the door being rotated; and a door pusher configured to be movable between a first pusher position and a second pusher position with respect to the main body and configured to press the door to a direction, in which the door is opened, as the door pusher moves from the first pusher position to the second pusher position. The guide includes a first contact surface provided to apply a force to the lever in a direction, in which the door is closed, in response to contact with the lever; and a second contact surface provided to apply a force to the lever in a direction, in which the door is opened, in response to contact with the lever. The lever is in contact with the second contact surface in response to the door pusher being in the second pusher position.

DESCRIPTION OF DRAWINGS

These and/or other aspects of the disclosure will become apparent and more readily appreciated from the following description of embodiments, taken in conjunction with the accompanying drawings of which.

MODES OF THE INVENTION

Figure 1:
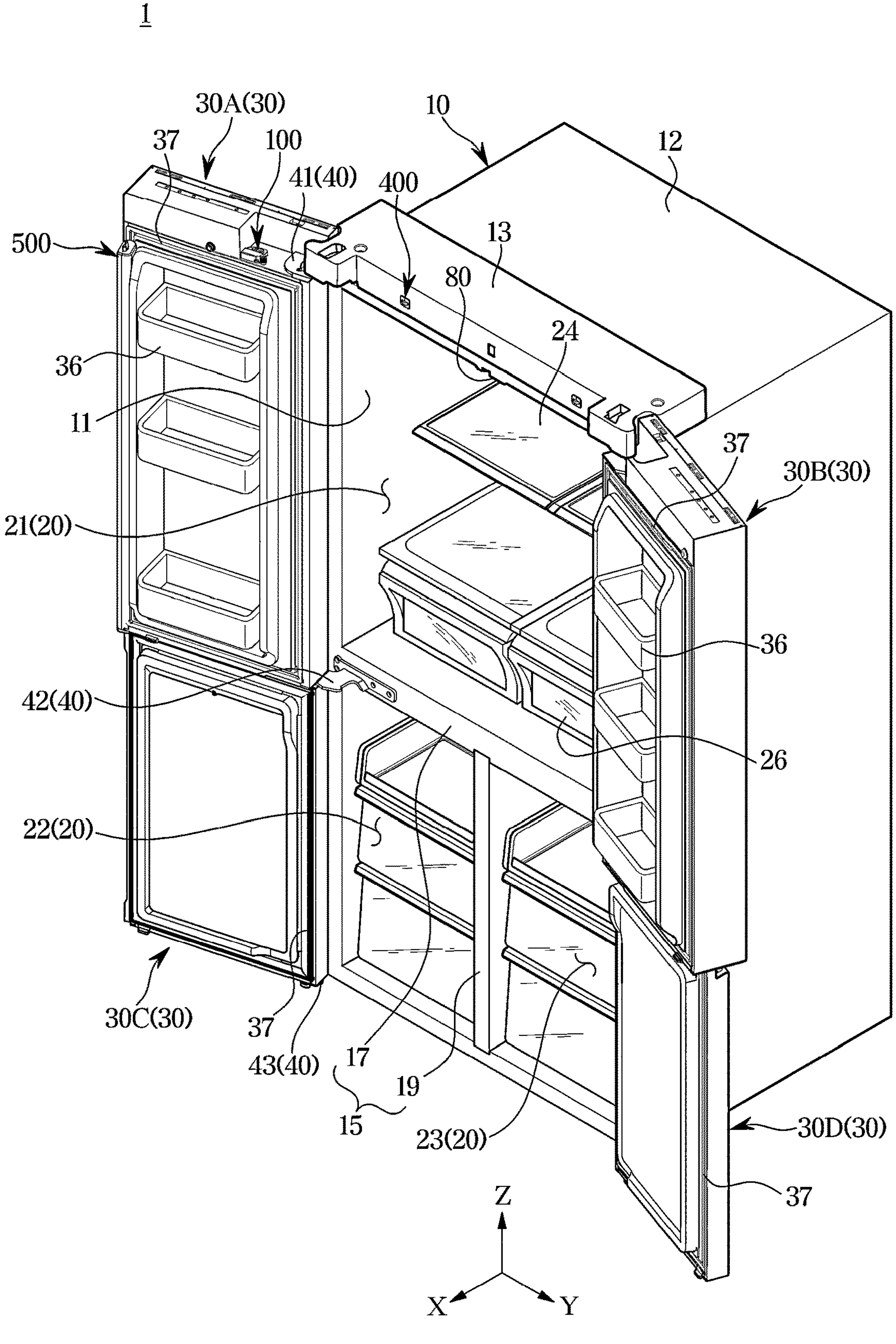
FIG. 1 is a perspective view of a refrigerator according to one embodiment of the present disclosure.

Various embodiments of the present document and terms used therein are not intended to limit the technical features described in this document to specific embodiments, and should be understood to include various modifications, equivalents, or substitutes of the corresponding embodiments.

In connection with the description of the drawings, similar reference numerals may be used for similar or related components.

The singular form of a noun corresponding to an item may include one or a plurality of the items unless clearly indicated otherwise in a related context.

In this document, phrases, such as "A or B", "at least one of A and B", "at least one of A or B," "A, B or C," "at least one of A, B and C," and "at least one of A, B, or C", may include any one or all possible combinations of items listed together in the corresponding phrase among the phrases.

As used herein, the term "and/or" includes any and all combinations of one or more of associated listed items.

Terms such as "1st", "2nd", "primary" or "secondary" may be used simply to distinguish a component from other components, without limiting the component in other aspects (e.g., importance or order).

Further, as used herein, the terms "front," "rear," "top," "bottom," "side," "left," "right," "top," "bottom," and the like are defined with reference to the drawings and are not intended to limit the shape and position of each element.

It will be understood that when the terms "includes," "comprises," "including," and/or "comprising," when used in this specification, specify the presence of stated features, figures, steps, operations, components, members, or combinations thereof, but do not preclude the presence or addition of one or more other features, figures, steps, operations, components, members, or combinations thereof.

It will be understood that when a certain component is referred to as being "connected to", "coupled to", "supported by" or "in contact with" another component, it can be directly or indirectly connected to, coupled to, supported by, or in contact with the other component. When a component is indirectly connected to, coupled to, supported by, or in contact with another component, it may be connected to, coupled to, supported by, or in contact with the other component through a third component.

It will also be understood that when a component is referred to as being "on" or "over" another component, it can be directly on the other component or intervening components may also be present.

A refrigerator according to an embodiment of the disclosure may include a main body.

The "main body" may include an inner case, an outer case positioned outside the inner case, and an insulation provided between the inner case and the outer case.

The "inner case" may include a case, a plate, a panel, or a liner forming a storage room. The inner case may be formed as one body, or may be formed by assembling a plurality of plates together. The "outer case" may form an appearance of the main body, and be coupled to an outer side of the inner case such that the insulation is positioned between the inner case and the outer case.

The "insulation" may insulate inside of the storage room from outside of the storage room to maintain inside temperature of the storage room at appropriate temperature without being influenced by an external environment of the storage room. According to an embodiment of the disclosure, the insulation may include a foaming insulation. The foaming insulation may be molded by fixing the inner case and the outer case with jigs, etc. and then injecting and foaming urethane foam as a mixture of polyurethane and a foaming agent between the inner case and the outer case.

According to an embodiment of the disclosure, the insulation may include a vacuum insulation in addition to a foaming insulation, or may be configured only with a vacuum insulation instead of a forming insulation. The vacuum insulation may include a core material and a cladding material accommodating the core material and sealing the inside with vacuum or pressure close to vacuum. The vacuum insulation may further include an adsorbent for adsorbing a gas and water to stably maintain a vacuum state. However, the insulation is not limited to the above-mentioned foaming insulation or vacuum insulation, and may include various materials capable of being used for insulation.

The "storage room" may include a space defined by the inner case. The storage room may further include an inner case defining a space corresponding to a storage room. Various goods, such as food, medicine, cosmetics, etc., may be stored in the storage room, and the storage room may open at at least one side to put the goods in or take the goods out.

The refrigerator may include one or more storage rooms. In a case in which two or more storage rooms are formed in the refrigerator, the respective storage rooms may have different purposes of use, and may be maintained at different temperature. To this end, the storage rooms may be partitioned by a partition wall including an insulation.

The storage room may be maintained within an appropriate temperature range according to a purpose of use, and include a "refrigerating room", a "freezing room", and a "temperature conversion room" according to purposes of use and/or temperature ranges. The refrigerating room may be maintained at appropriate temperature to keep food refrigerating, and the freezing room may be maintained at appropriate temperature to keep food frozen. The "refrigerating" may be keeping food cold without freezing the food, and for example, the refrigerating room may be maintained within a range of 0 degrees Celsius to 7 degrees Celsius. The "freezing" may be freezing food or keeping food frozen, and for example, the freezing room may be maintained within a range of −20 degrees Celsius to −1 degrees Celsius. The temperature conversion room may be used as any one of a refrigerating room or a freezing room according to or regardless of a user's selection.

The storage room may also be called various other terms, such as "vegetable room", "freshness room", "cooling room", and "ice-making room", in addition to "refrigerating room", "freezing room", and "temperature conversion room", and the terms, such as "refrigerating room", "freezing room", "temperature conversion room", etc., as used below need to be understood to represent storage rooms having the corresponding purposes of use and the corresponding temperature ranges.

The refrigerator according to an embodiment of the disclosure may include at least one door configured to open or close the open side of the storage room. The respective doors may be provided to open and close one or more storage rooms, or a single door may be provided to open and close a plurality of storage rooms. The door may be rotatably or slidably mounted on the front of the main body.

The "door" may seal the storage room in a closed state. The door may include an insulation, like the main body, to insulate the storage room in the closed state.

According to an embodiment, the door may include an outer door plate forming the front surface of the door, an inner door plate forming the rear surface of the door and facing the storage room, an upper cap, a lower cap, and a door insulation provided therein.

A gasket may be provided on the edge of the inner door plate to seal the storage room by coming into close contact with the front surface of the main body when the door is closed. The inner door plate may include a dyke that protrudes rearward to allow a door basket for storing items to be fitted.

According to an embodiment, the door may include a door body and a front panel that is detachably coupled to the front of the door body and forms the front surface of the door. The door body may include an outer door plate that forms the front surface of the door body, an inner door plate that forms the rear surface of the door body and faces the storage room, an upper cap, a lower cap, and a door insulator provided therein.

The refrigerator may be classified as French Door Type, Side-by-side Type, Bottom Mounted Freezer (BMF), Top Mounted Freezer (TMF), or One Door Refrigerator depending on the arrangement of the doors and the storage rooms.

The refrigerator according to an embodiment of the disclosure may include a cool air supply device for supplying cool air to the storage room.

The "cool air supply device" may include a machine, an apparatus, an electronic device, and/or a combination system thereof, capable of generating cool air and guiding the cool air to cool the storage room.

According to an embodiment of the disclosure, the cool air supply device may generate cool air through a cooling cycle including compression, condensation, expansion, and evaporation processes of refrigerants. To this end, the cool air supply device may include a cooling cycle device having a compressor, a condenser, an expander, and an evaporator to drive the cooling cycle. According to an embodiment of the disclosure, the cool air supply device may include a semiconductor such as a thermoelectric element. The thermoelectric element may cool the storage room by heating and cooling actions through the Peltier effect.

The refrigerator according to an embodiment of the disclosure may include a machine room where at least some components belonging to the cool air supply device are installed.

The "machine room" may be partitioned and insulated from the storage room to prevent heat generated from the components installed in the machine room from being transferred to the storage room. To dissipate heat from the components installed inside the machine room, the machine room may communicate with outside of the main body.

The refrigerator according to an embodiment of the disclosure may include a dispenser provided on the door to provide water and/or ice. The dispenser may be provided on the door to allow access by the user without opening the door.

The refrigerator according to an embodiment of the disclosure may include an ice-making device that produces ice. The ice-making device may include an ice-making tray that stores water, an ice-moving device that separates ice from the ice-making tray, and an ice-bucket that stores ice generated in the ice-making tray.

The refrigerator according to an embodiment of the disclosure may include a controller for controlling the refrigerator.

The "controller" may include a memory for storing and/or memorizing data and/or programs for controlling the refrigerator, and a processor for outputting control signals for controlling the cool air supply device, etc. according to the programs and/or data memorized in the memory.

The memory may store or record various information, data, commands, programs, and the like necessary for operations of the refrigerator. The memory may store temporary data generated while generating control signals for controlling components included in the refrigerator. The memory may include at least one of volatile memory or non-volatile memory, or a combination thereof.

The processor may control the overall operation of the refrigerator. The processor may control the components of the refrigerator by executing programs stored in memory. The processor may include a separate neural processing unit (NPU) that performs an operation of an artificial intelligence (AI) model. In addition, the processor may include a central processing unit (CPU), a graphics processor (GPU), and the like. The processor may generate a control signal to control the operation of the cool air supply device. For example, the processor may receive temperature information of the storage room from a temperature sensor, and generate a cooling control signal for controlling an operation of the cool air supply device based on the temperature information of the storage room.

Furthermore, the processor may process a user input of a user interface and control an operation of the user interface according to the programs and/or data memorized/stored in the memory. The user interface may be provided using an input interface and an output interface. The processor may receive the user input from the user interface. In addition, the processor may transmit a display control signal and image data for displaying an image on the user interface to the user interface in response to the user input.

The processor and memory may be provided integrally or may be provided separately. The processor may include one or more processors. For example, the processor may include a main processor and at least one sub-processor. The memory may include one or more memories.

The refrigerator according to an embodiment of the disclosure may include a processor and a memory for controlling all the components included in the refrigerator, and may include a plurality of processors and a plurality of memories for individually controlling the components of the refrigerator. For example, the refrigerator may include a processor and a memory for controlling the operation of the cool air supply device according to an output of the temperature sensor. In addition, the refrigerator may be separately equipped with a processor and a memory for controlling the operation of the user interface according to the user input.

A communication module may communicate with external devices, such as servers, mobile devices, and other home appliances via a nearby access point (AP). The AP may connect a local area network (LAN) to which a refrigerator or a user device is connected to a wide area network (WAN) to which a server is connected. The refrigerator or the user device may be connected to the server via the WAN.

The input interface may include keys, a touch screen, a microphone, and the like. The input interface may receive the user input and pass the received user input to the processor.

The output interface may include a display, a speaker, and the like. The output interface may output various notifications, messages, information, and the like generated by the processor.

Hereinafter, various embodiments according to the disclosure will be described in detail with reference to the accompanying drawings.

The terms "up," "down," "front," "rear," and the like used in the following description are defined with reference to the drawings, and the shape and position of each element are not limited by these terms. For example, the terms "front" and "rear" below may refer to the front and rear of the refrigerator in an X direction relative to the drawings, respectively. The terms "up" and "down" may refer to upwardly in a Z-direction and downwardly in the Z-direction of the refrigerator, respectively, relative to the drawings. The terms "left" and "right" may refer to the left side of the refrigerator in a Y-direction and the right side of the refrigerator in the Y-direction, respectively, relative to the drawings.

FIG. 1 is a perspective view of a refrigerator according to one embodiment of the present disclosure.

Referring to FIG. 1, a refrigerator 1 according to one embodiment of the present disclosure may include a main body 10, a storage compartment 20 disposed inside the main body 10, a door 30 configured to open and close the storage compartment 20, and a cooling system for supplying cold air to the storage compartment 20.

The main body 10 may include an inner case 11 provided to form the storage compartment 20 and an outer case 12 provided to form an exterior of the refrigerator 1.

The outer case 12 may be formed to have the shape of a box in which a front surface is open. The outer case 12 may form an upper surface, a lower surface, left and right surfaces, a rear surface, etc. of the refrigerator 1.

A front surface of the inner case 11 may be open. The storage compartment 20 may be disposed in the inner case 11 and the inner case 11 may be disposed inside the outer case 12. An inner wall of the inner case 11 may form an inner wall of the storage compartment 20.

A body insulation material may be disposed between the outer case 12 and the inner case 11 of the main body 10 to allow the outer case 12 and the inner case 11 to be insulated from each other. The storage compartment 20 may be formed inside the main body 10. For example, the storage compartment 20 may include a refrigerating compartment in which food is kept refrigerated by maintaining the temperature at approximately 0 to 5 degrees Celsius. For example, the storage compartment 20 may include a freezing compartment in which food is kept frozen by maintaining the temperature at approximately −30 to 0 degrees Celsius.

For example, the storage compartment 20 may be divided into a plurality of regions by a partition 15. Particularly, by a first partition 17 extending in the horizontal direction, the storage compartment 20 may be divided into a first storage compartment 21 disposed in an upper portion thereof and lower storage compartments 22 and 23 disposed in a lower portion thereof. In addition, the storage compartments 22 and 23 disposed in the lower portion the storage compartment 20 may be divided into a second storage compartment 22 on the left and a third storage compartment 23 on the right by a second partition 19 extending in the vertical direction. At this time, the first storage compartment 21 may be used as the refrigerating compartment. Both the second storage compartment 22 and the third storage compartment 23 may be used as the freezing compartment. Alternatively, one of the second storage compartment 22 and the third storage compartment 23 may be used as the freezing compartment and the other of the second storage compartment 22 and the third storage compartment 23 may be used as the refrigerating compartment.

The division method of the storage compartment 20 and the purposes of each of the divided storage compartments 21, 22, and 23 are only examples and are not limited thereto.

A shelf 24 on which food is placed and a storage container 26 in which food is stored may be provided in the storage compartment 20.

The refrigerator 1 may include a cooling system configured to generate cold air using a cooling cycle and supply the generated cold air to the storage compartment 20. The cooling system may generate cold air using a refrigeration circulation cycle that compresses, condenses, expands, and evaporates a refrigerant. For example, the cooling system may include a compressor, a condenser, an expansion valve, an evaporator, a blower fan, etc.

The main body 10 may include a cold air supply duct provided to form a cold air flow path through which cold air generated by the cooling system flows into the storage compartment 20. The cold air supply duct may be formed in a rear portion of the inner case 11, and may be disposed at the rear of the storage compartment 20 and communicate with the storage compartment 20.

The door 30 may be configured to open and close the storage compartment 20. The door 30 may be configured to open and close an opening formed on one side of the main body 10. The door 30 may be configured to be rotatable with respect to the main body 10.

An outer surface of the door 30 may form a portion of the exterior of the refrigerator 1. When the door 30 is in a closed position, the outer surface of the door 30 may form at least a portion of a front exterior of the refrigerator 1. When the door 30 is in the closed position, an inner surface of the door 30 may face the inside of the storage compartment 20. The inner surface of the door 30 refers to one surface of the door 30 facing the storage compartment 20 when the door 30 closes the storage compartment 20. In addition, the outer surface of the door 30 refers to the other surface opposite to the inner surface of the door 30 facing the storage compartment 20 when the door 30 closes the storage compartment 20, and refers to the front surface of the door 30 when the refrigerator 1 is viewed from the front.

A door gasket 37 provided to seal a gap between the door 30 and the main body 10 to prevent cold air from leaking into the storage compartment 20 may be disposed on the inner surface of the door 30. The door gasket 37 may be arranged along an inner circumference of the door 30. The door gasket 37 may be formed of an elastic material such as rubber.

The refrigerator 1 may include a plurality of doors 30A, 30B, 30C, and 30D configured to open and close each partitioned storage compartment 21, 22, and 23.

Particularly, the first storage compartment 21 may be opened and closed by a pair of upper doors 30A and 30B. The refrigerator 1 may include a first door 30A configured to open and close a portion of the first storage compartment 21 and a second door 30B configured to open and close another portion of the first storage compartment 21. The first door 30A and the second door 30B may each be rotatable independently of each other with respect to the main body 10.

The first door 30A and the second door 30B may be arranged side by side with each other. Particularly, the first door 30A and the second door 30B may be arranged side by side in the horizontal direction (Y direction). For example, the first door 30A may be configured to open and close a left portion of the first storage compartment 21, and the second door 30B may be configured to open and close a right portion of the first storage compartment 21.

The refrigerator 1 may include a rotation bar 500. The rotation bar 500 may be configured to be rotatable with respect to one of the pair of upper doors 30A and 30B (e.g., first door 30A), and provided to cover a gap between the pair of upper doors 30A and 30B when the pair of upper doors 30A and 30B closes the first storage compartment 21.

Further, the second storage compartment 22 may be opened and closed by a lower left door 30C. The refrigerator 1 may include a third door 30C configured to open and close the second storage compartment 22. The third door 30C may be configured to be rotatable with respect to the main body 10. For example, the first door 30A and the third door 30C may be arranged side by side in the vertical direction (Z).

Further, the third storage compartment 23 may be opened and closed by a lower right door 30D. The refrigerator 1 may include a fourth door 30D configured to open and close the third storage compartment 23. The fourth door 30D may be configured to be rotatable with respect to the main body 10. For example, the second door 30B and the fourth door 30D may be arranged side by side in the vertical direction (Z). Additionally, the third door 30C and the fourth door 30D may be arranged side by side in the horizontal direction (Y).

For example, a handle may be provided on each of the plurality of doors 30A, 30B, 30C, and 30D, and a user can hold the handle provided on each of the plurality of doors 30A, 30B, 30C, and 30D to open and close each door 30A, 30B, 30C, and 30D. In other words, a user can open or close each storage compartment 21, 22, and 23 by holding the handle provided on each of the plurality of doors 30A, 30B, 30C, and 30D.

For example, the handle provided on each of the plurality of doors 30A, 30B, 30C, and 30D may include a concave groove shape for gripping.

For example, a door basket 36 provided to store food may be disposed on a rear surface of the first door 30A. For example, the door basket 36 provided to store food may be disposed on a rear surface of the second door 30B.

The refrigerator 1 may include a hinge bracket 40 provided to connect the main body 10 and the door 30. The hinge bracket 40 may be provided to allow the door 30 to be rotatable with respect to the main body 10.

The hinge bracket 40 may be fixed to the main body 10. Particularly, the hinge bracket 40 may be coupled to the outer case 12.

The hinge bracket 40 may rotatably support the door 30. The door 30 may be rotatably coupled to the main body 10 by the hinge bracket 40. A rotation axis of the door 30 may pass through the hinge bracket 40.

Particularly, the refrigerator 1 may include a plurality of hinge brackets 41, 42, and 43 provided to support each of the plurality of doors 30A, 30B, 30C, and 30D.

For example, the refrigerator 1 may include an upper door hinge bracket 41. The upper door hinge bracket 41 may be coupled to an upper portion of the main body 10. For example, the upper door hinge bracket 41 may be provided as a pair so as to rotatably support the first door 30A and the second door 30B, respectively. The pair of upper door hinge brackets 41 may be disposed on the upper left and upper right sides of the main body 10, respectively. Each of the pair of upper door hinge brackets 41 may be coupled to an upper portion of the first door 30A and an upper portion of the second door 30B.

For example, the refrigerator 1 may include a lower door hinge bracket 43. The lower door hinge bracket 43 may be coupled to a lower portion of the main body 10. For example, the lower door hinge bracket 43 may be provided as a pair so as to rotatably support the third door 30C and the fourth door 30D, respectively. The pair of lower door hinge brackets 43 may be disposed on the lower left and lower right sides of the main body 10, respectively. Each of the pair of lower door hinge brackets 43 may be coupled to a lower portion of the third door 30C and a lower portion of the fourth door 30D.

For example, the refrigerator 1 may include an intermediate hinge bracket 42. The intermediate hinge bracket 42 may be coupled to a middle portion of the main body 10. The intermediate hinge bracket 42 may be disposed between the upper door hinge bracket 41 and the lower door hinge bracket 43. For example, the intermediate hinge bracket 42 may be provided as a pair so as to rotatably support the first door 30A and the second door 20B, respectively. Additionally, the intermediate hinge brackets 42 may be provided as a pair so as to rotatably support the third door 30C and the fourth door 30D, respectively. The pair of intermediate hinge brackets 42 may be provided on the left and right sides of the middle portion of the main body 10, respectively. Each of the pair of intermediate hinge brackets 42 may be coupled to the lower portion of the first door 30A and the lower portion of the second door 20B. Additionally, each of the pair of intermediate hinge brackets 42 may be coupled to the upper portion of the third door 30C and the upper portion of the fourth door 30D.

The upper door hinge bracket 41 and the intermediate hinge bracket 42 may be arranged side by side along the direction in which the rotation axes of the first door 30A and the second door 30B extend. As shown in FIG. 1, the upper door hinge bracket 41 and the intermediate hinge bracket 42 may be arranged side by side in the vertical direction (Z).

The lower door hinge bracket 43 and the intermediate hinge bracket 42 may be arranged side by side along the direction in which the rotation axes of the third door 30C and the fourth door 30D extend. As shown in FIG. 1, the lower door hinge bracket 43 and the intermediate hinge bracket 42 may be arranged side by side in the vertical direction (Z).

A detailed description of the structure of the hinge bracket 40 will be described later.

The main body 10 may further include a top table 13 disposed on the upper portion of the main body 10. Particularly, the top table 13 may be coupled to the upper portion of the outer case 12. The top table 13 may be coupled to an upper surface of the outer case 12. The top table 13 may be fixed to the outer case 12.

The top table 13 may cover the upper door hinge bracket 41. Accordingly, the top table 13 may be referred to as 'hinge bracket cover 13'.

The top table 13 may cover various electrical components. An accommodating space 13*a* (refer to FIG. 3) in which various electrical components are accommodated may be formed in the top table 13. Particularly, the top table 13 may cover a door opening device 400, which will be described later, and the door opening device 400 may be accommodated in the top table 13. Accordingly, the top table 13 may be referred to as 'door opening device cover 13'.

A detailed description of the structure of the top table 13 will be described later.

The configuration of the refrigerator 1 described above with reference to FIG. 1 is only an example for describing the refrigerator according to the present disclosure, and the present disclosure is not limited thereto. The refrigerator according to the present disclosure may be provided to include various configurations to perform the function of supplying cold air to the storage compartment for storing food.

The type of refrigerator, to which the refrigerator according to the present disclosure is applied, is not limited to the type of refrigerator 1 shown in the drawing, and the refrigerator according to the present disclosure may include various types of refrigerators such as side-by-side type, French door type, Bottom Mounted Freezer (BMF) type, Top Mounted Freezer (TMF) type or one-door type.

In addition, the refrigerator 1 according to one embodiment of the present disclosure is described on the assumption that the refrigerator is an indirect cooling type, but is not limited thereto. The present disclosure may be applied to a direct cooling type refrigerator.

Hereinafter for convenience of description, the refrigerator according to the present disclosure will be described based on the refrigerator 1 according to one embodiment shown in FIGS. 1 to 26.

Figure 2:
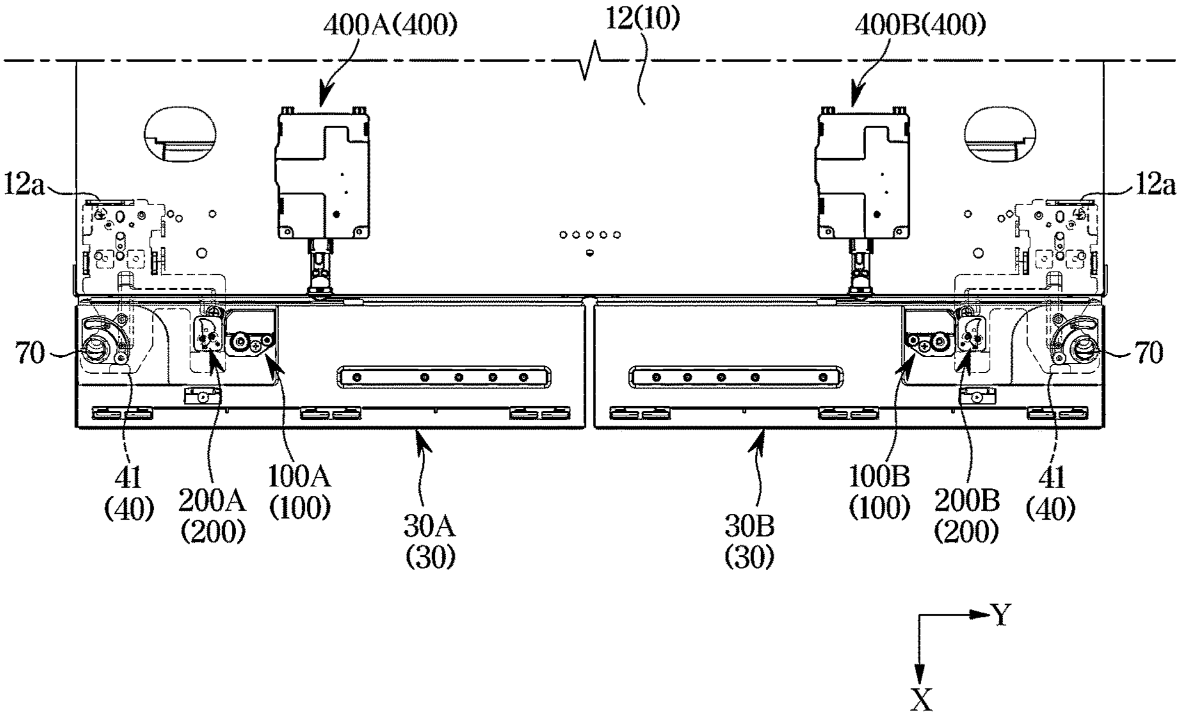
FIG. 2 is a top view illustrating a top table separated from the refrigerator according to one embodiment of the present disclosure.

FIG. 2 is a top view illustrating a top table separated from the refrigerator according to one embodiment of the present disclosure.

Referring to FIG. 2, the refrigerator 1 according to one embodiment of the present disclosure may include the door opening device 400 configured to open the door 30.

The door opening device 400 may be configured to automatically open the door 30. The door opening device 400 may be configured to automatically rotate the door 30 with respect to the main body 10 to open the storage compartment 20.

Particularly, the door opening device 400 may be mounted on the main body 10. In a state in which the door opening device 400 is mounted on the main body 10, the door opening device 400 may open the door 30 by pressing the door 30 toward an opening direction. The door opening device 400 may be configured to press the door 30 based on a condition for opening the door 30.

The door opening device 400 may be configured to automatically open the first storage compartment 21. That is, the refrigerator 1 may include a first door opening device 400A configured to open the first door 30A, and a second door opening device 400B configured to open the second door 30B.

Particularly, the first door opening device 400A may be configured to open the first door 30A. The first door opening device 400A may be configured to automatically open the first door 30A based on a condition for opening the first door 30A. The first door opening device 400A may be configured to open a portion of the first storage compartment 21 by rotating the first door 30A with respect to the main body 10.

Further, the second door opening device 400B may be configured to open the second door 30B. The second door opening device 400B may be configured to automatically open the second door 30B based on a condition for opening the second door 30B. The second door opening device 400B may be configured to open another portion of the first storage compartment 21 by rotating the second door 30B with respect to the main body 10.

The first door opening device 400A and the second door opening device 400B may be configured to open the first storage compartment 21 independently of each other.

In this case, the door opening device 400 may be mounted on the upper portion of the main body 10. Particularly, the door opening device 400 may be accommodated inside the top table 13. The upper portion of the door opening device 400 may be covered by the top table 13. The door opening device 400 may be disposed on the upper surface of the outer case 12. For example, the first door opening device 400A may be disposed on the left side of the upper portion of the main body 10 with respect to a center of the main body, and the second door opening device 400B may be disposed on the right side of the upper portion of the main body 10 with respect to the center. That is, the first door opening device 400A and the second door opening device 400B may be arranged side by side in the horizontal direction (Y).

The door opening device 400 may be mounted on the upper portion of the main body 10 so as to press the upper portion of the door 30. For example, the first door opening device 400A may be configured to press the upper portion of the first door 30A. Further, the second door opening device 400B may be configured to press the upper portion of the second door 30B.

However, the present disclosure is not limited thereto, and the door opening device 400 may be mounted in various positions of the main body 10 and configured to open the first storage compartment 21 by pressing various portions other than the upper portion of the first door 30A or the second door 30B.

For example, unlike FIG. 2, the door opening device 400 may be mounted on the horizontal partition 17 to press the lower portion of the first door 30A or the second door 30B.

Further, unlike FIG. 2, the door opening device 400 may be configured to open the second storage compartment 22. That is, the door opening device 400 may be configured to press the third door 30C based on a condition for opening the second storage compartment 22. At this time, the door opening device 400 may be mounted on the lower portion of the main body 10 or on the horizontal partition 17.

Further, unlike FIG. 2, the door opening device 400 may be configured to open the third storage compartment 23. That is, the door opening device 400 may be configured to press the fourth door 30D based on a condition for opening the third storage compartment 23. At this time, the door opening device 400 may be mounted on the lower portion of the main body 10 or on the horizontal partition 17.

Hereinafter for convenience of description, the door opening device 400 will be described based on an example in which the door opening device 400 is mounted to the upper portion of the main body 10 and configured to open the first storage compartment 21 by pressing the first door 30A or the second door 30B.

Hereinafter for convenience of description, the first door opening device 400A among the first door opening device 400A and the second door opening device 400B will be described as an example, and for convenience, the first door opening device 400A may be referred to as 'door opening device 400'. Features of the door opening device 400 described below may be correspondingly applied to the second door opening device 400B.

Referring to FIG. 2, the refrigerator 1 according to one embodiment of the present disclosure may include a door opening and closing guide module configured to guide the opening and closing of the door 30.

Particularly, the refrigerator 1 may include a guide 200. The guide 200 may be provided to guide rotation of the door 30 while the door 30 is being opened or closed. In other words, the guide 200 may be provided to guide the door 30 to rotate in a specific direction according to the position of the door 30. In other words, the guide 200 may be provided to assist in opening or closing the door 30 according to the position of the door 30.

Particularly, the guide 200 may be provided to apply a force to the door 30 in the direction, in which the door 30 is opened or closed, according to the position of the door 30 while the door 30 is being opened or closed. Whether the door 30 receives a force in an opening direction or a closing direction by the guide 200 may vary according to the relative position of the door 30 with respect to the guide 200. That is, the guide 200 may guide the rotation of the door 30 to allow the door 30 to rotate in the opening direction when the door 30 is located at a specific position while the door 30 is being opened. Further, the guide 200 may guide the rotation of the door 30 to allow the door 30 to rotate in the closing direction when the door 30 is located at a specific position while the door 30 is being closed. When the direction in which the door 30 rotates while the door 30 is being opened is defined as a first direction, and the direction in which the door 30 rotates while the door 30 is being closed is defined as a second direction, the guide 200 may guide the door 30 to rotate in the first direction by transmitting a force for the door 30 to rotate in the first direction and the guide 200 may guide the door 30 to rotate in the second direction by transmitting a force for the door 30 to rotate in the second direction according to the position of the door 30 when the door 30 rotates in the first direction or the second direction.

The guide 200 may be fixed to the main body 10. For example, the guide 200 may be coupled to the hinge bracket 40. As shown in FIG. 2, the guide 200 may be coupled to the upper door hinge bracket 41. Alternatively, the guide 200 may be formed integrally with the upper door hinge bracket 41.

The refrigerator 1 may include a lever device 100. The lever device 100 may be mounted on the door 30. As shown in FIG. 2, the lever device 100 may be mounted on the upper portion of the door 30.

The lever device 100 may include a lever 130 (refer to FIG. 11, etc.) provided to be in contact with the guide 200 while the door 30 is being opened or closed. The lever device 100 may receive a force from the guide 200 when the lever 130 comes into contact with the guide 200. When the lever 130 is in contact with the guide 200, a force applied to the lever device 100 from the guide 200 may vary according to the relative position of the lever 130 with respect to the guide 200. 'The force applied to the lever device 100 from the guide 200 varies' means that a magnitude or direction of a force applied from the guide 200 to the lever device 100 may be changed according to the relative position of the lever 130 with respect to the guide 200. Accordingly, according to the relative position of the lever 130 with respect to the guide 200 when the lever 130 is in contact with the guide 200, the lever device 100 may transmit a force to the door 30 in the direction in which the door 30 is opened or a force to the door 30 in the direction in which the door 30 is closed. In other words, according to the position of the door 30 while the door 30 is being opened or closed, the lever device 100 may transmit a force to the door 30 in the direction in which the door 30 is opened or transmit a force to the door 30 in the direction in which the door 30 is closed. A direction, in which the door 30 rotates while the door 30 is being opened, may be referred to as a first direction and a direction, in which the door 30 rotates while the door 30 is being closed, may be referred to as a second direction. Accordingly, according to the position of the door 30 when the door 30 rotates in the first direction or the second direction, the lever device 100 may transmit a force to the door 30 in the direction in which the door 30 rotates in the first direction or transmit a force to the door 30 in the direction in which the door 30 rotates in the second direction.

The door opening and closing guide module may be provided to guide the opening and closing of each of the first door 30A and the second door 30B.

Particularly, the refrigerator 1 may include a first guide 200A provided to guide the rotation of the first door 30A while the first door 30A is being opened or closed. According to the position of the first door 30A while the first door 30A is being opened or closed, the first guide 200A may be provided to apply a force to the first door 30A in the direction in which the first door 30A is opened or closed.

The first guide 200A may be fixed to the main body 10. For example, the first guide 200A may be coupled to the upper door hinge bracket 41 connected to the first door 30A among the pair of upper door hinge brackets 41. In other words, as shown in FIG. 2, the first guide 200A may be coupled to the upper door hinge bracket 41 disposed on the left side.

Further, the refrigerator 1 may include a first lever device 100A mounted on the first door 30A. For example, the first lever device 100A may be mounted on an upper portion of the first door 30A.

The lever 130 of the first lever device 100A (refer to FIG. 11) may be provided to be in contact with the first guide 200A while the first door 30A is being opened or closed. According to the position of the first door 30A while the first door 30A is being opened or closed, the first lever device 100A may be provided to apply a force to the first door 30A in the direction in which the first door 30A is opened or apply a force to the first door 30A in the direction in which the first door 30A is closed.

Further, the refrigerator 1 may include a second guide 200B provided to guide the rotation of the second door 30B while the second door 30B is being opened or closed. According to the position of the second door 30B while the second door 30B is being opened or closed, the second guide 200B may be provided to apply a force to the second door 30B in the direction in which the second door 30B is opened or closed.

The second guide 200B may be fixed to the main body 10. For example, the second guide 200B may be coupled to the upper door hinge bracket 41 connected to the second door 30B among the pair of upper door hinge brackets 41. In other words, as shown in FIG. 2, the second guide 200B may be coupled to the upper door hinge bracket 41 disposed on the right side.

Further, the refrigerator 1 may include a second lever device 100B mounted on the second door 30B. For example, the second lever device 100B may be mounted on an upper portion of the second door 30B.

A lever 130 of the second lever device 100B (refer to FIG. 11) may be provided to be in contact with the second guide 200B while the second door 30B is being opened or closed. According to the position of the second door 30B while the second door 30B is being opened or closed, the second lever device 100B may be provided to apply a force to the first door 30A in the direction in which the second door 30B is opened or apply a force to the second door 30B in the direction in which the second door 30B is closed.

However, the arrangement of the door opening and closing guide module, such as the lever device 100 and the guide 200, is not limited thereto.

For example, unlike FIG. 2, the lever device 100 may be mounted on a lower portion of the first door 30A or the second door 30B, and the guide 200 may be mounted on the intermediate hinge bracket 42.

For example, unlike FIG. 2, the guide 200 may be provided to guide the rotation of the third door 30C. The guide 200 may be provided to transmit a force to the third door 30C when the third door 30C rotates. At this time, the guide 200 may be disposed on the lower door hinge bracket 43 or the intermediate hinge bracket 42. Additionally, when the third door 30C rotates, the lever device 100 may be provided to be in contact with the guide 200 and may be provided to transmit a force to the third door 30C. At this time, the lever device 100 may be mounted on the lower or upper portion of the third door 30C to correspond to the position of the guide 200.

For example, unlike FIG. 2, the guide 200 may be provided to guide the rotation of the fourth door 30D. The guide 200 may be provided to transmit a force to the fourth door 30D when the fourth door 30D rotates. At this time, the guide 200 may be disposed on the lower door hinge bracket 43 or the intermediate hinge bracket 42. Additionally, when the fourth door 30D rotates, the lever device 100 may be provided to be in contact with the guide 200, and may be provided to transmit a force to the fourth door 30D. At this time, the lever device 100 may be mounted on the lower or upper portion of the fourth door 30D to correspond to the position of the guide 200.

Hereinafter for convenience of description, a configuration, in which the guide 200 is coupled to the upper door hinge bracket 41 and the lever device 100 is mounted on the upper portion of the first door 30A or the upper portion of the second door 30B so as to guide the rotation of the first door 30A or the second door 30B, will be described as example.

Hereinafter for convenience of description, the first lever device 100A among the first lever device 100A and the second lever device 100B will be described as an example. For convenience, the first lever device 100A is referred to as 'lever device 100'. Features of the lever device 100 described below may be correspondingly applied to the second lever device 100B.

Hereinafter for convenience of description, the first guide 200A among the first guide 200A and the second guide 200B will be described as an example, and for convenience, the first guide 200A will be referred to as 'guide 200'. Features of the guide 200 described below may be correspondingly applied to the second guide 200B.

Hereinafter for convenience of description, the first door 30A among the plurality of doors 30A, 30B, 30C, and 30D will be described as an example, and for convenience, the first door 30A will be referred to as 'door 30'.

Hereinafter for convenience of description, among the plurality of hinge brackets 41, 42, and 43, the upper door hinge bracket 41 connecting the first door 30A and the main body 10 will be described as an example. The upper door hinge bracket 41 may be referred to as 'hinge bracket 40'.

Hereinafter among the partitioned storage compartments 21, 22, and 23, the first storage compartment 21 opened and closed by the first door 30A may be referred to as 'storage compartment 20'.

The door 30 may be configured to be rotatable between an open position that opens the storage compartment 20 to the maximum and a closed position that closes the storage compartment 20. That is, the storage compartment 20 may be opened when the door 30 rotates from the closed position to the open position, and the storage compartment 20 may be closed when the door 30 rotates from the open position to the closed position. The open and closed positions of the door 30 may be defined as positions relative to the main body 10 and the storage compartment 20.

The door 30 may be opened by rotating in a first direction, and may be closed by rotating in a second direction opposite to the first direction. That is, the door 30 may be configured to rotate in the first direction from the closed position to the open position, and may be closed by rotating in the second direction from the open position to the closed position.

An opening angle of the door 30 may be defined as an angle by which the door 30 rotates from the closed position. That is, the opening angle of the door 30 may be defined as an angle at which the door 30 rotates from the closed position to the first direction. As the opening angle of the door 30 increases, an extent to which the door 30 opens the storage compartment 20 may increase. The open position of the door 30 may be defined as the position of the door 30 when the opening angle of the door 30 is maximum.

For example, when the door 30 is in the open position, the opening angle of the door 30 may be approximately 80 degrees to 120 degrees.

The door 30 may be configured to be rotatable about a rotation axis extending in one direction. For example, the door 30 may be configured to be rotatable about the rotation axis extending in the vertical direction (Z).

The rotation axis of the door 30 may be determined differently depending on the connection relationship between the door 30 and the main body 10. The rotation axis of the door 30 may pass through the door 30 and the hinge bracket 40. Accordingly, the door 30 may be rotatable relative to the hinge bracket 40 with respect to the rotation axis.

As illustrated in FIG. 2, when the hinge bracket 40 is fixed to the main body 10 and a portion, in which the door 30 and the hinge bracket 40 are connected to each other, is fixed to the main body 10, the rotation axis of the door 30 may be defined as an imaginary straight line fixed to the main body 10. That is, the door 30 may be configured to be rotatable between the open position and the closed position with respect to the rotation axis that is fixed to the main body 10.

However, when the hinge bracket 40 moves relative to the main body 10 and a portion, in which the door 30 and the hinge bracket 40 are connected to each other, moves relative to the main body 10 (e.g., a multiple-joint hinge type in which the hinge bracket includes a plurality of links rotatably connected to each other) when the door 30 opens or closes the storage compartment 20, the rotation axis of the door 30 may not be fixed to the main body 10. Even in this case, the opening angle of the door 30 may be defined as an angle by which the door 30 rotates from the closed position to the first direction, and as the door 30 rotates from the closed position to the open position, the opening angle of the door 30 may increase.

The above-described door opening device 400 may be configured to rotate the door 30 from the closed position to the open position. The door opening device 400 may press the door 30 and rotate the door 30 toward the open position.

The above-described guide 200 may be provided to guide the rotation of the door 30 while the door 30 is being opened or closed. The guide 200 may apply a force to the door 30 while the door 30 is being opened or closed. While the door 30 is being opened, the magnitude or direction of force applied to the door 30 by the guide 200 may vary according to the opening angle of the door 30. Additionally, while the door 30 is being closed, the magnitude or direction of force applied to the door 30 by the guide 200 may vary according to the opening angle of the door 30.

The above-described lever device 100 may be mounted on the door 30 and may move together with the door 30 while the door 30 is being opened or closed. While the door 30 is being opened or closed, the lever device 100 may transmit a force to the door 30 by being in contact with the guide 200. The relative position of the lever device 100 with respect to the guide 200 may vary according to the opening angle of the door 30, and a point in which the lever 130 of the lever device 100 is in contact with the guide 200 may vary according to the opening angle of the door 30. A magnitude and direction of the force applied to the door 30 may vary according to a point of the lever 130 of the lever device 100 in contact with the guide 200.

Hereinafter the structure and operation of the door opening device 400, the guide 200, and the lever device 100 of the refrigerator 1 according to one embodiment of the present disclosure will be described with reference to FIGS. 3 to 26.

Figure 3:
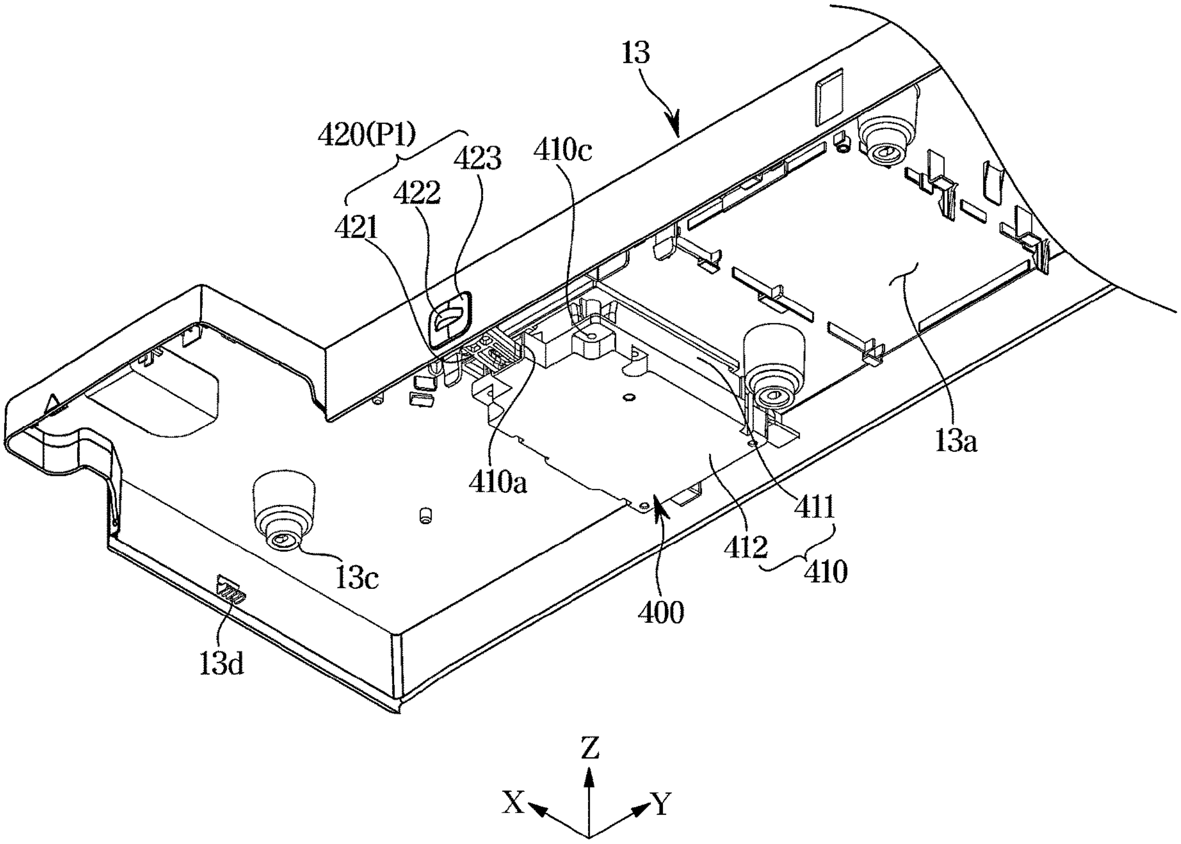
FIG. 3 is a view illustrating the top table and a door opening device of the refrigerator according to one embodiment of the present disclosure when a door pusher is located at a first pusher position.
Figure 4:
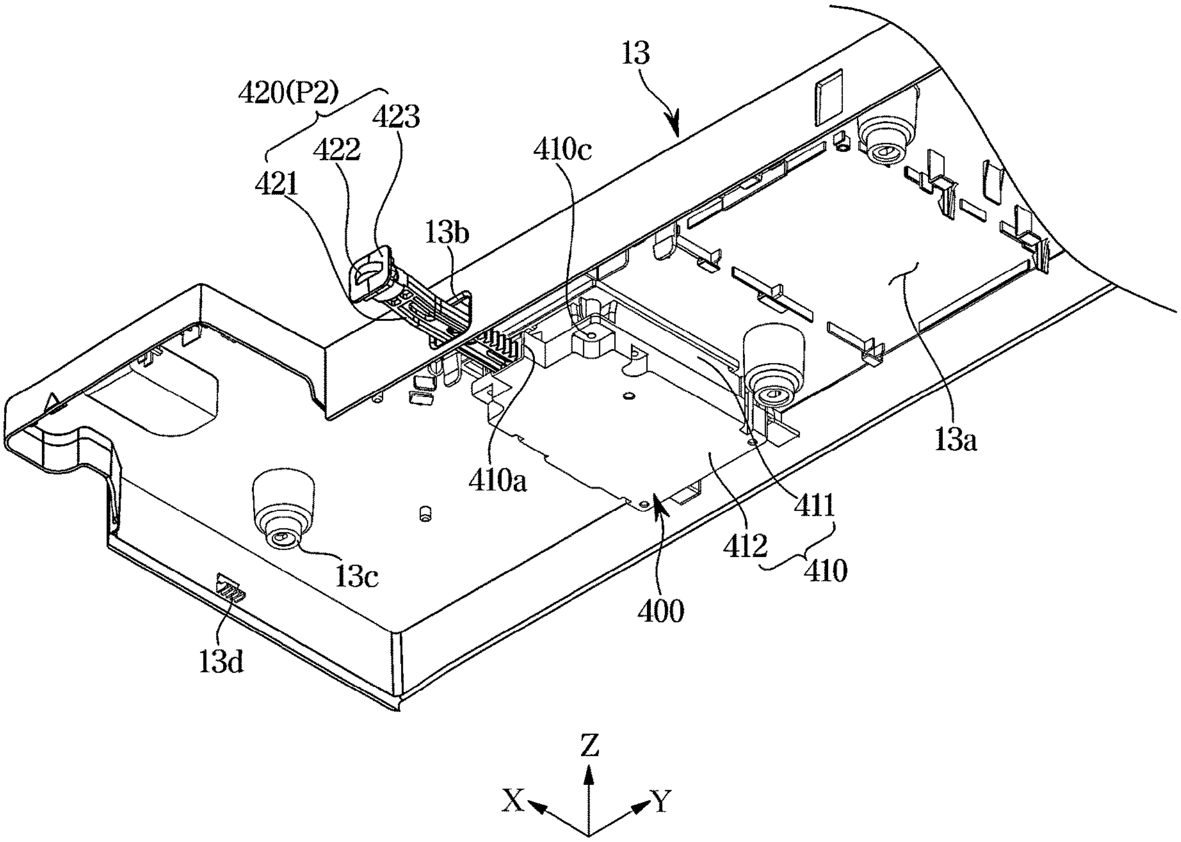
FIG. 4 is a view illustrating the top table and the door opening device of the refrigerator according to one embodiment of the present disclosure when the door pusher is located at a second pusher position.

FIG. 3 is a view illustrating the top table and a door opening device of the refrigerator according to one embodiment of the present disclosure when a door pusher is located at a first pusher position. FIG. 4 is a view illustrating the top table and the door opening device of the refrigerator according to one embodiment of the present disclosure when the door pusher is located at a second pusher position.

Referring to FIGS. 3 and 4, the door opening device 400 of the refrigerator 1 according to one embodiment of the present disclosure may include a door pusher 420. The door pusher 420 may be configured to press the door 30 to open the door 30.

The door pusher 420 may be mounted on the main body 10. The door pusher 420 may be supported by a pusher case 410, which will be described later, and the pusher case 410 may be fixed to the main body 10. Accordingly, the door pusher 420 may be mounted on the main body 10 through the pusher case 410.

The door opening device 400 may include the pusher case 410 provided to support the door pusher 420. The pusher case 410 may accommodate at least a portion of the door pusher 420.

The pusher case 410 may be mounted on the main body 10. The pusher case 410 may be fixed to the main body 10.

For example, the pusher case 410 may be mounted on the top table 13. The pusher case 410 may include a fixing portion 410*c* coupled to the top table 13 and fixed to the main body 10. For example, the pusher case 410 may be fixed to the top table 13 by a fastening member (e.g., screw) that penetrates the fixing portion 410*c*.

The top table 13 may be fixed to the outer case 12. The top table 13 may include an outer case coupling portion provided to be fixed to the outer case 12. For example, the top table 13 may be fixed to the outer case 12 by screwing an outer case coupling portion 13*c* to one surface of the outer case 12 or the hinge bracket 40. Alternatively, the top table 13 may be fixed to the outer case 12 by hooking an outer case coupling portion 13*d* to the outer case 12 or the hinge bracket 40. As the top table 13 is fixed to the outer case 12, the door opening device 400 including the pusher case 410 may be stably mounted to the main body 10.

For example, the pusher case 410 may be covered by the top table 13. The pusher case 410 may be accommodated inside the top table 13. The top table 13 may be coupled to the inside of the top table 13. The top table 13 may include the accommodating space 13*a* provided to accommodate the door opening device 400, and the pusher case 410 may be disposed inside the accommodating space 13*a*.

For example, the pusher case 410 may include a first pusher case 411 and a second pusher case 412. The first pusher case 411 and the second pusher case 412 may be coupled to each other. Between the first pusher case 411 and the second pusher case 412, an accommodating space may be formed to accommodate various components of the door opening device 400, such as the door pusher 420 (refer to FIG. 5, etc.).

For example, the first pusher case 411 may be disposed above the second pusher case 412. The first pusher case 411 and the second pusher case 412 may be coupled to each other in the vertical direction.

However, the present disclosure is not limited thereto, and the pusher case 410 may include various structures.

The door pusher 420 may be configured to be movable with respect to the main body 10. The door pusher 420 may be configured to press the door 30 while moving relative to the main body 10. The door pusher 420 may be movably mounted on the main body 10.

The door pusher 420 may be movable in the pusher case 410. The pusher case 410 may movably support the door pusher 420. As the door pusher 420 is movably supported on the pusher case 410 and the pusher case 410 is fixed to the main body 10, the door pusher 420 may be mounted on the main body 10 and at the same time, the door pusher 420 may be movable relative to the main body 10.

The door pusher 420 may be movable with respect to the accommodating space 13*a* within the top table 13. The door pusher 420 may be inserted into the accommodating space 13*a* and accommodated within the accommodating space 13*a*, or may be withdrawn from the accommodating space 13*a* to press the door 30.

The top table 13 may include an opening 13*b* formed on one side of the accommodating space 13*a*. The door pusher 420 may be provided to penetrate the opening 13*b* and be movable with respect to the accommodating space 13*a*. The opening 13*b* may be formed on one surface of the top table 13 facing the door 30 when the door 30 is in the closed position. For example, the opening 13*b* may be formed on one front surface of the top table 13.

The door pusher 420 may be movable between a first pusher position P1 and a second pusher position P2. Particularly, the door pusher 420 may be configured to perform reciprocating movement between the first pusher position P1 and the second pusher position P2.

The first pusher position P1 may be a position of the door pusher 420 when the door 30 is located in the closed position. The second pusher position P2 may be a position when the door pusher 420 moves from the first pusher position P1 to a direction of pressing the door 30. The door pusher 420 may move from the first pusher position P1 to the second pusher position P2 and press the closed door 30 so as to open the closed door 30. The second pusher position P2 may be a position in which the door pusher 420 moves forward from the first pusher position P1.

The door pusher 420 may be accommodated in the accommodating space 13*a* of the top table 13 when the door pusher 420 is positioned in the first pusher position P1. That is, the door pusher 420 may be in a state of being inserted into the accommodating space 13*a* of the top table 13 when the door pusher 420 is positioned at the first pusher position P1. The door pusher 420 may be withdrawn from the accommodating space 13*a* and moved from the first pusher position P1 to the second pusher position P2. While the door pusher 420 penetrates the opening 13*b* of the top table 13, the door pusher 420 may be movable between the first pusher position P1 and the second pusher position P2.

For example, as shown in FIGS. 3 and 4, the door pusher 420 may be provided to be linearly movable between the first pusher position P1 and the second pusher position P2. As shown in the drawing, the door pusher 420 may be configured to move linearly in the front and rear direction (X). However, the door pusher 420 may move non-linearly between the first pusher position P1 and the second pusher position P2.

The door pusher 420 may be configured to press the door 30 until the door pusher 420 reaches the second pusher position P2. Thereafter, based on reaching the second pusher position P2, the door pusher 420 may stop moving or move to the first pusher position P1. In this case, the door pusher 420 may no longer press the door 30.

The door pusher 420 may include a movable rod 421 configured to be movable with respect to the main body 10. The movable rod 421 may be configured to be movable with respect to the pusher case 410. The movable rod 421 may be supported on the pusher case 410. At least a portion of the movable rod 421 may be accommodated in the pusher case 410. The movable rod 421 may be provided to be movable with respect to the accommodating space 13*a* of the top table 13. At least a portion of the movable rod 421 may be accommodated in the accommodating space 13*a*. The movable rod 421 may be inserted into or withdrawn from the accommodating space 13*a*.

For example, the movable rod 421 may be configured to move linearly with respect to the main body 10. The movable rod 421 may be configured to move linearly with respect to the pusher case 410.

The door pusher 420 may include a push roller 422. The push roller 422 may be mounted on one side of the movable rod 421 with respect to the direction of pressing the door 30. When the door pusher 420 moves from the first pusher position P1 to the second pusher position P2, the push roller 422 may be in contact with the door 30. That is, the door 30 may be pressed by the push roller 422.

The push roller 422 may be configured to be rotatable with respect to the movable rod 421. The push roller 422 may be configured to be rotatable with respect to the movable rod 421.

As the rotatable push roller 422 is provided on one side of the movable rod 421, friction between the door pusher 420 and the door 30 may be reduced, and it is possible to prevent abrasion of the door pusher 420 and the door 30. Accordingly, the door 30 may be opened more efficiently.

The door pusher 420 may include an opening cover 423 disposed on one side of the movable rod 421. The opening cover 423 may be provided to cover the opening 13*b* of the top table 13 when the door pusher 420 is located in the first pusher position P1. The opening cover 423 may be provided to seal a gap between the door pusher 420 and the opening 13*b* when the door pusher 420 is located in the first pusher position P1.

As mentioned above, the door opening device 400 may automatically open the door 30 by including the door pusher 420 configured to be movable with respect to the main body 10 and configured to press the door 30.

An example of a structure included in the door opening device 400 will be described with reference to FIGS. 5 to 9.

Figure 5:
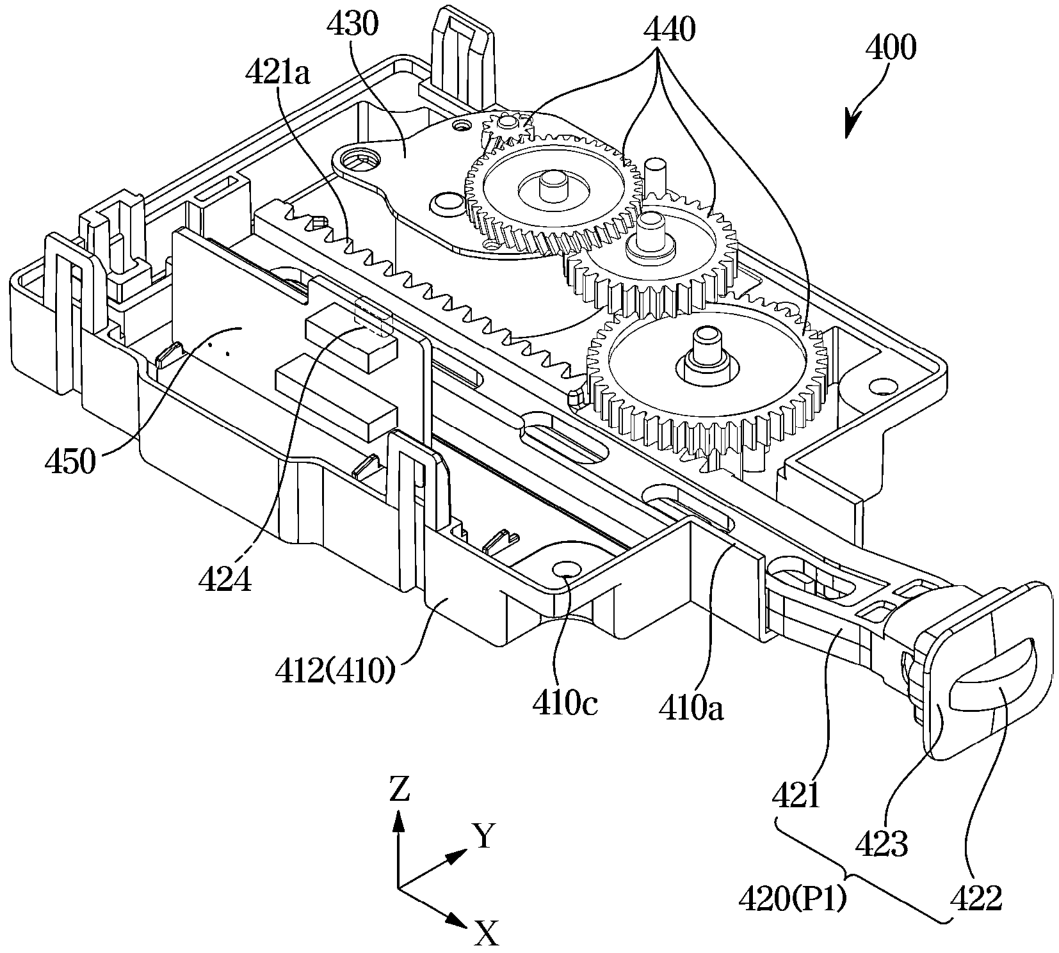
FIG. 5 is a view illustrating a partial configuration of the door opening device of the refrigerator according to one embodiment of the present disclosure.
Figure 6:
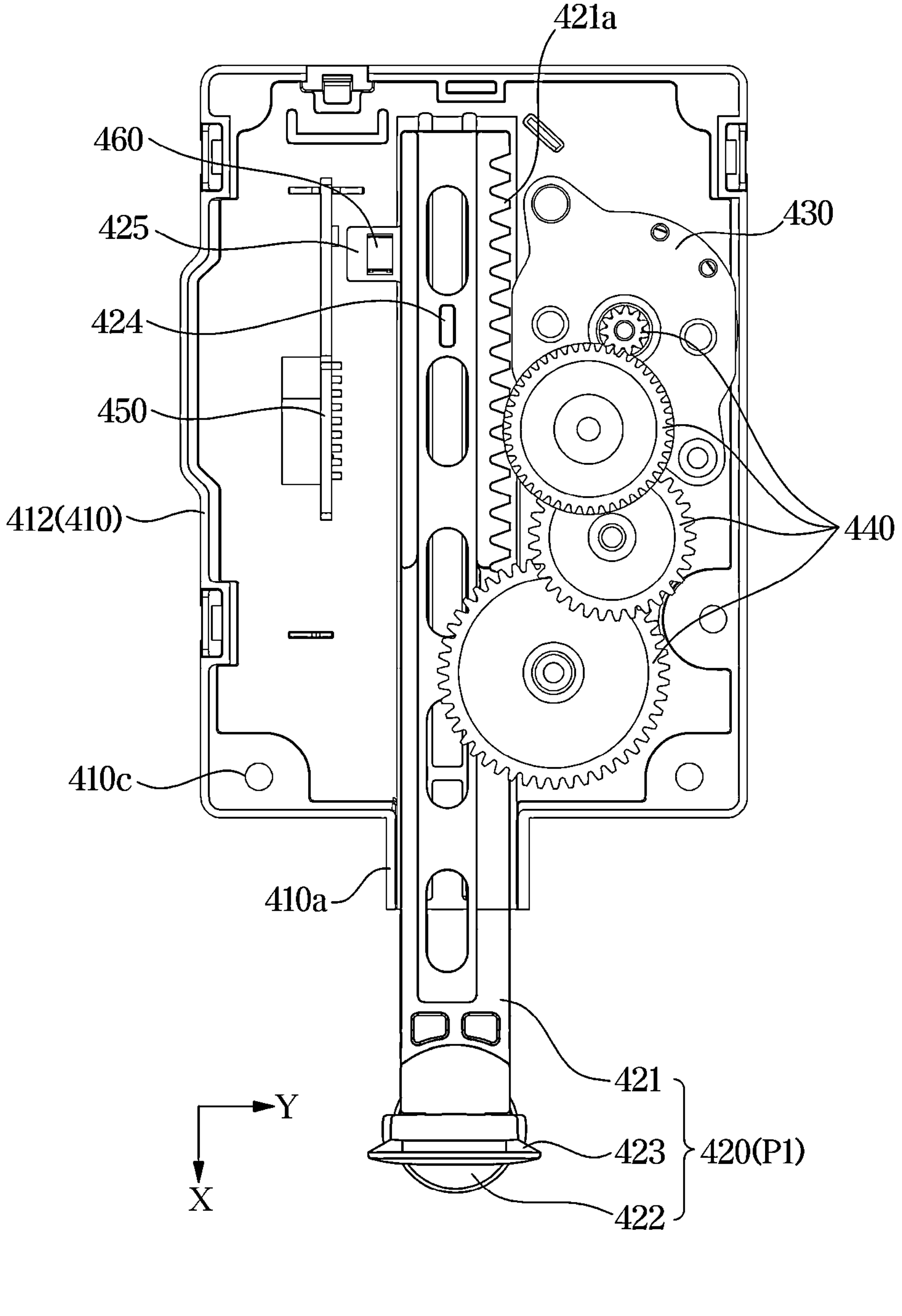
FIG. 6 is a view illustrating a partial configuration of the door opening device of the refrigerator according to one embodiment of the present disclosure when the door pusher is at the first pusher position.
Figure 7:
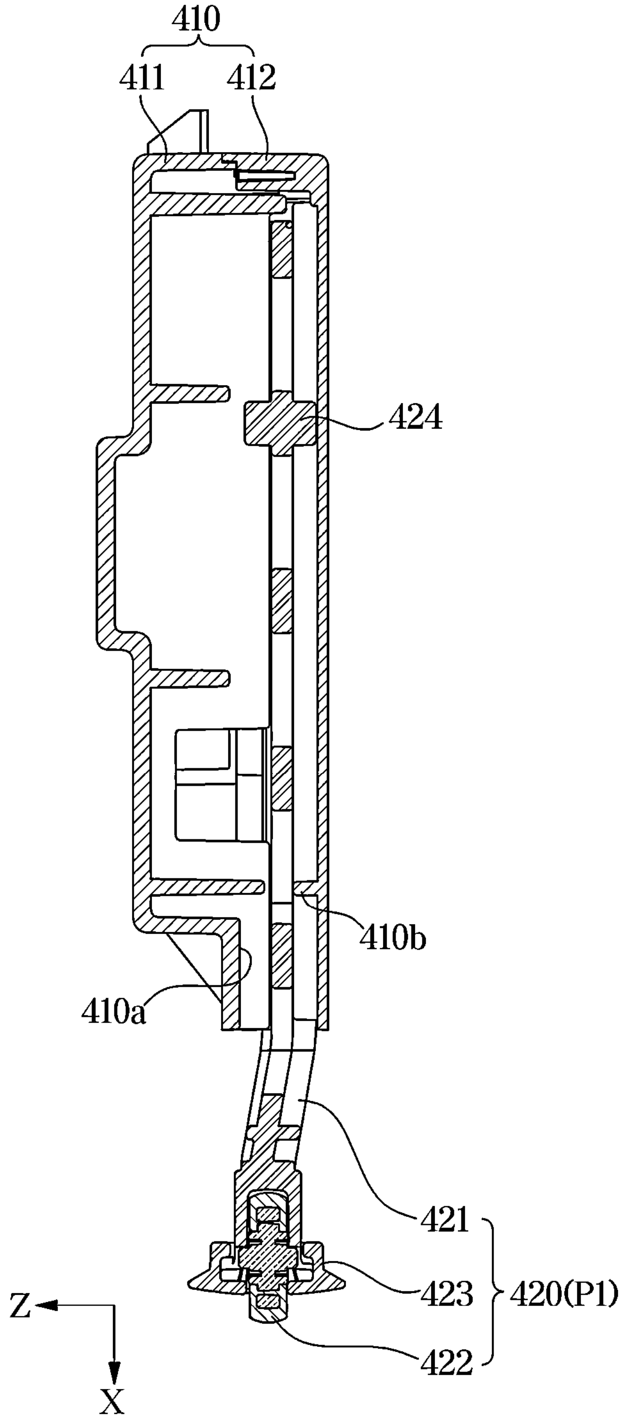
FIG. 7 is a cross-sectional view of the door opening device of the refrigerator according to one embodiment of the present disclosure when the door pusher is at the first pusher position.
Figure 8:
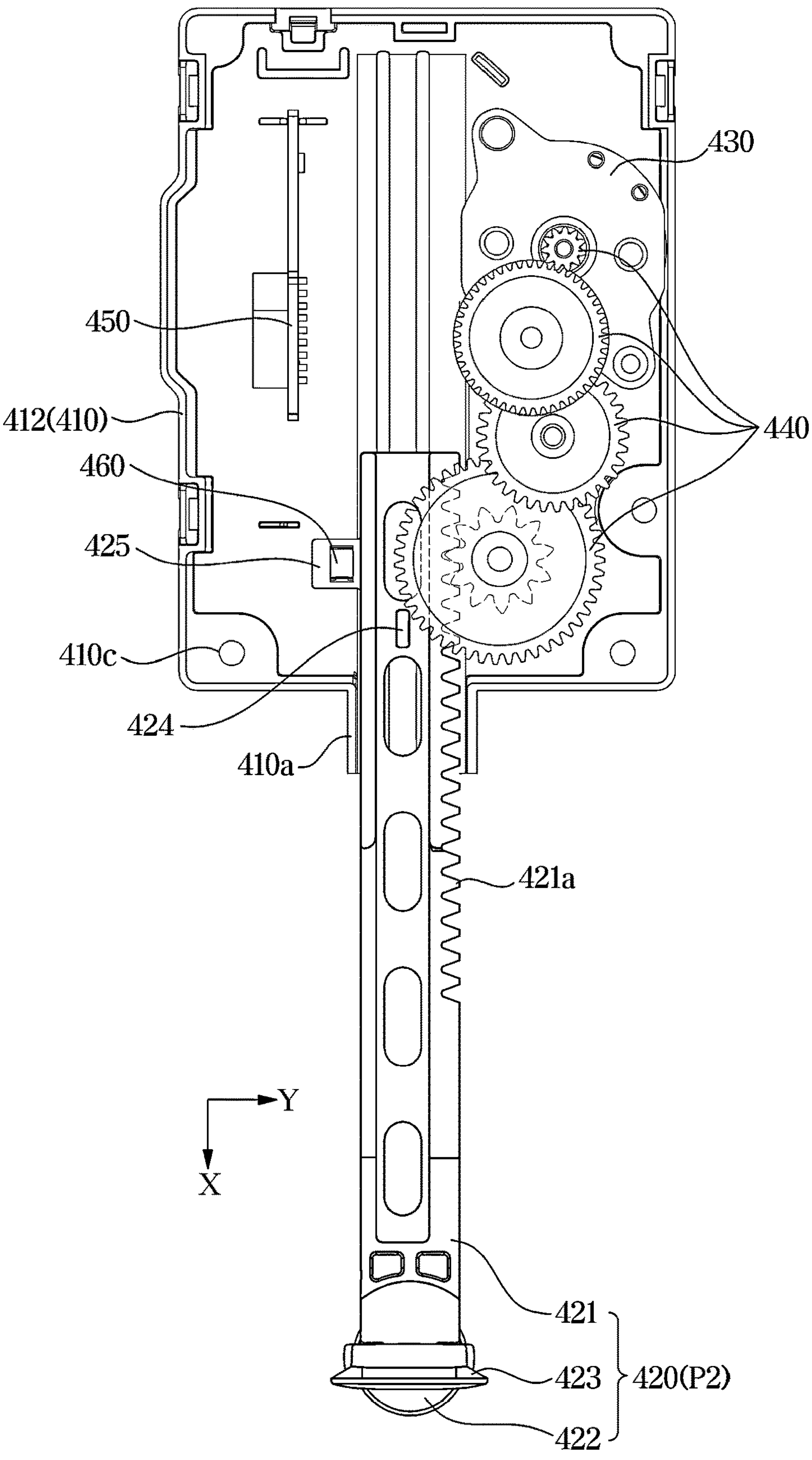
FIG. 8 is a view illustrating a partial configuration of the door opening device of the refrigerator according to one embodiment of the present disclosure when the door pusher is at the second pusher position.
Figure 9:
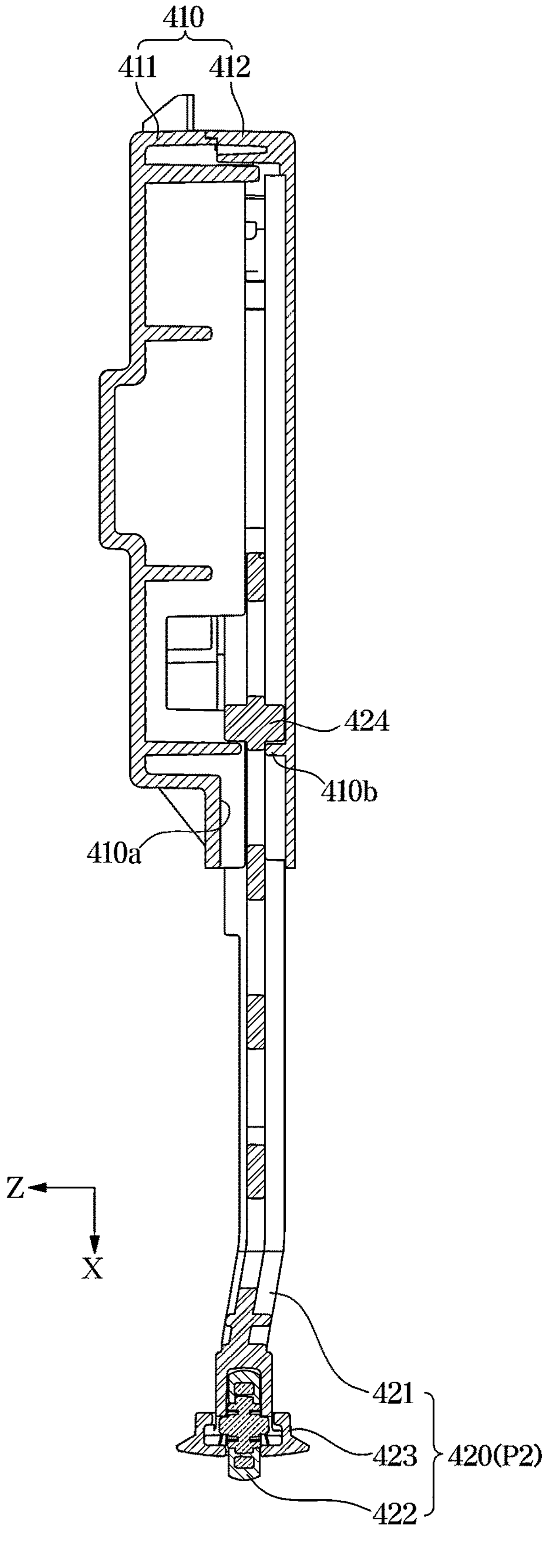
FIG. 9 is a cross-sectional view of the door opening device of the refrigerator according to one embodiment of the present disclosure when the door pusher is at the second pusher position.

FIG. 5 is a view illustrating a partial configuration of the door opening device of the refrigerator according to one embodiment of the present disclosure. FIG. 6 is a view illustrating a partial configuration of the door opening device of the refrigerator according to one embodiment of the present disclosure when the door pusher is at the first pusher position. FIG. 7 is a cross-sectional view of the door opening device of the refrigerator according to one embodiment of the present disclosure when the door pusher is at the first pusher position. FIG. 8 is a view illustrating a partial configuration of the door opening device of the refrigerator according to one embodiment of the present disclosure when the door pusher is at the second pusher position. FIG. 9 is a cross-sectional view of the door opening device of the refrigerator according to one embodiment of the present disclosure when the door pusher is at the second pusher position.

Referring to FIGS. 5 to 9, the door opening device 400 of the refrigerator 1 according to one embodiment of the present disclosure may include a power source 430 configured to generate power for the door pusher 420 to move. The power source 430 may generate power that is required for the door pusher 420 when the door pusher 420 moves between the first pusher position P1 and the second pusher position P2.

For example, the power source 430 may include a drive motor and a motor driver connected to the drive motor. The drive motor may generate power by receiving a drive current from the motor driver. The motor driver may be electrically connected to a controller of the refrigerator 1 and may operate based on control signals received from the controller.

The power source 430 may be supported by the pusher case 410. The power source 430 may be accommodated inside the pusher case 410.

The door opening device 400 may include a power transmission member 440 provided to transmit power generated by the power source 430 to the door pusher 420.

The power transmission member 440 may be supported by the pusher case 410. The power transmission member 440 may be accommodated inside the pusher case 410.

The door pusher 420 may include a structure configured to receive power from the power transmission member 440. Particularly, the structure configured to receive power from the power transmission member 440 may be disposed in the movable rod 421. Accordingly, the power generated by the power source 430 may be transmitted to the door pusher 420 through the power transmission member 440.

For example, the power transmission member 440 may include at least one gear. As shown in FIG. 5, the power transmission member 440 may include a plurality of gears. At this time, the movable rod 421 may include a rod gear portion 421*a* engaged with one or more gears of the power transmission member 440, and the rod gear portion 421*a* may receive power from the gear of the power transmission member 440.

For example, the power transmission member 440 and the rod gear portion 421*a* may form a rack-pinion gear structure. Accordingly, the movable rod 421 may move linearly with respect to the pusher case 410.

The power source 430 may be controlled by the controller of the refrigerator 1. The power source 430 may be electrically connected to the controller. The controller may transmit a control signal for controlling the power source 430 to the power source 430, and the power source 430 may operate based on the control signal received from the controller.

The controller of the refrigerator 1 may control the power source 430 to move the door pusher 420 from the first pusher position P1 to the second pusher position P2 based on a condition for opening the door 30. For example, the condition for opening the door 30 may include that a user input for opening the door 30 is obtained.

The refrigerator 1 may include a user interface including an input button. The input button may be configured to obtain a user input for opening the door 30.

For example, the input button may include a touch sensor such as a capacitive sensor. The input button may be configured to obtain a user input for opening the door 30 when a user touches or presses the input button. However, the input button is not limited thereto, and the input button may obtain a user input in various ways.

For example, the input button may be disposed on the door 30. Particularly, the input button may be disposed on the handle of the door 30 or in a position adjacent thereto. In this case, as a user touches the handle of the door 30, the input button may easily obtain a user input to open the door 30. In addition, the input button may be disposed in various locations, such as the front surface of the door 30.

The input button may be electrically connected to the controller. The input button may transmit an electrical signal related to the obtained user input to the controller. The controller may control the power source 430 to open the door 30 based on obtaining a user input for opening the door 30 through the input button.

Meanwhile, when the door pusher 420 reaches the second pusher position P2, it may be required to control the door pusher 420 to prevent the door pusher 420 from moving further to the direction of pressing the door 30 from the second pusher position P2. Accordingly, the controller may control the power source 430 to stop the movement of the door pusher 420 based on the door pusher 420 reaching the second pusher position P2.

In addition, when the door opening device 400 opens the door 30, the door pusher 420 may need to return to the first pusher position P1 immediately after the door 30 moves to the open position or between that point and a point of time in which the door 30 reaches the closed position. Accordingly, the controller may control the power source 430 to move the door pusher 420 to the first pusher position P1 based on the door pusher 420 reaching the second pusher position P2.

For example, the door opening device 400 may include a position detection sensor 450 configured to detect the position of the door pusher 420.

The position detection sensor 450 may be supported on the pusher case 410. The position detection sensor 450 may be accommodated in the pusher case 410. Alternatively, the position detection sensor 450 may be configured to detect the position of the door pusher 420 from the outside of the pusher case 410.

The position detection sensor 450 may detect the position of the door pusher 420 in various ways. For example, the position detection sensor 450 may be configured to detect a magnetic field of a magnet 460 mounted on the door pusher 420. Particularly, the door pusher 420 may be provided with a magnet mounting portion 425 on which the magnet 460 is mounted, and the magnet 460 may be mounted on the magnet mounting portion 425 and move together with the door pusher 420. The position detection sensor 450 may detect changes in the magnetic field caused by the magnet 460 as the door pusher 420 moves.

For example, the magnet mounting portion 425 may be disposed on the movable rod 421. The magnet mounting portion 425 may extend from the movable rod 421 toward a direction in which the position detection sensor 450 is located.

For example, the position detection sensor 450 may include a Hall sensor configured to detect a magnetic field. However, the type of the position detection sensor 450 is not limited thereto, and the position detection sensor 450 may include various types of sensors configured to detect the position of the door pusher 420, particularly, configured to detect that at least the door pusher 420 reaches the second pusher position P2. For example, the position detection sensor 450 may include various types of sensors, such as a reed switch and an optical sensor.

The position detection sensor 450 may be electrically connected to the controller of the refrigerator 1. The position detection sensor 450 may transmit an electrical signal corresponding to the position of the door pusher 420 to the controller. When the position detection sensor 450 detects that the door pusher 420 reaches the second pusher position P2, the position detection sensor 450 may output a corresponding electrical signal and transmit the electrical signal to the controller. When the controller receives the electrical signal indicating that the door pusher 420 reaches the second pusher position P2, the controller may control the power source 430 to allow the door pusher 420 to stop or to move to the first pusher position P1.

In addition, the controller may determine whether the door pusher 420 reaches the second pusher position P2 using various methods, and control the power source 430 based on the determination.

For example, based on the position information of the rotor of the drive motor provided in the power source 430, the controller may control the power source 430 to allow the door pusher 420 to move to the second pusher position P2, and when the door pusher 420 reaches the second pusher position P2, the controller may control the power source 430 to allow the door pusher 420 to stop or to return to the first pusher position P1.

For example, the power source 430 may include a step motor. In this case, based on the number of pulse signals input to the step motor, the controller may control the power source 430 to allow the door pusher 420 to move to the second pusher position P2 and when the door pusher 420 reaches the second pusher position P2, the controller may control the power source 430 to allow the door pusher 420 to stop or to return to the first pusher position P1.

As illustrated in FIGS. 5 to 9, in one embodiment, when the door pusher 420 reaches the second pusher position P2, the door pusher 420 may stop the movement thereof by a mechanical structure.

For example, the door pusher 420 may include a stopper 424. The stopper 424 may be provided to prevent the door pusher 420 from moving further in the direction of pressing the door 30 when the door pusher 420 is located at a specific position with respect to the pusher case 410. As shown in FIGS. 8 and 9, when the door pusher 420 reaches the second pusher position P2, the stopper 424 may stop the door pusher 420 relative to the main body 10 and the pusher case 410.

For example, a distance between one end (e.g., roller 422) in contact with the door 30 of the door pusher 420 and the stopper 424 may be the same as a distance between the first pusher position P1 and the second pusher position P2. However, this may vary according to a distance between the door pusher 420 and the door 30 at the first pusher position P1, the position of the stopper 424, etc.

For example, the stopper 424 may be disposed on the movable rod 421. For example, the stopper 424 may be formed in the shape of a rib protruding from the movable rod 421. For example, the stopper 424 may protrude from the movable rod 421 in the vertical direction (Z).

For example, the stopper 424 may be provided to stop the movement of the door pusher 420 with respect to the pusher case 410 as the stopper 424 is locked to the pusher case 410 when the door pusher 420 moves.

Particularly, the pusher case 410 may include a case entrance and exit portion 410*a* through which the door pusher 420 moves and penetrates. The case entrance and exit portion 410*a* may be formed on one side of the pusher case 410 with respect to the direction in which the door pusher 420 is withdrawn from the pusher case 410 (e.g., the front side of the pusher case 410). The case entrance and exit portion 410*a* may have the shape of a hole connecting the inside and outside of the pusher case 410. The door pusher 420 may be provided to be withdrawn to the outside of the pusher case 410 or inserted into the inside of the pusher case 410 through the case entrance and exit portion 410*a*.

When the door pusher 420 is withdrawn from the pusher case 410, the stopper 424 may be provided to be locked to the case entrance and exit portion 410*a*. For example, the stopper 424 may be provided to be locked to the case entrance and exit portion 410*a* when the door pusher 420 reaches the second pusher position P2. When the stopper 424 is locked to the case entrance and exit portion 410*a*, the door pusher 420 may no longer move in the direction in which the door pusher 420 is withdrawn from the pusher case 410, and the door pusher 420 may stop.

The case entrance and exit portion 410*a* may include a locking portion 410*b* provided to allow the stopper 424 to be locked thereto. For example, the locking portion 410*b* may have the shape of a rib extending from the inner wall of the pusher case 410 toward the inside of the pusher case 410.

When the door pusher 420 reaches the second pusher position P2, the stopper 424 may be in contact with the locking portion in a direction parallel to the moving direction of the door pusher 420 (front and rear direction based on the drawings) so as to prevent the door pusher 420 from passing through the case entrance and exit portion 410*a*.

When the door pusher 420 moves in the direction of pressing the door 30, the movable rod 421 may pass through the case entrance and exit portion 410*a* without being locked to the locking portion 410*b*, but the stopper 424 may be locked to the locking portion 410*b*. Accordingly, the stopper 424 may not pass through the case entrance and exit portion 410*a* and thus the door pusher 420 may stop.

The configuration of the stopper 424 is not limited thereto, and the stopper 424 may be provided to locked to various configurations, which are disposed on various portions of the pusher case 410 or disposed on the inside of the pusher case 410, when the door pusher 420 moves to the second pusher position P2, so as to stop the door pusher 420.

However, when the stopper 424 is locked to the case entrance and exit portion 410*a*, the position of the door pusher 420 and the second pusher position P2 may be different from each other. For example, when the door pusher 420 is withdrawn from the pusher case 410, the door pusher 420 may reach the second pusher position P2 before the stopper 424 is locked to the case entrance and exit portion 410*a*. In this case, the controller may control the power source 430 to allow the door pusher 420 to stop or to return to the first pusher position P1 based on an output signal of the position detection sensor 450 corresponding to the fact that the door pusher 420 reaches the second pusher position P2. Even in this case, when the door pusher 420 is withdrawn further than the second pusher position P2 due to a control error or the like, the stopper 424 may prevent that the door pusher 420 is separated from the pusher case 410 through the case entrance and exit portion 410*a*.

The structure of the door opening device 400 described with reference to FIGS. 5 to 9 is an example of the structure of the door opening device that is included in the refrigerator according to the present disclosure and configured to automatically open the door, but the present disclosure is not limited thereto.

Hereinafter the door opening and closing guide module including the lever device 100 and the guide 200 described above in FIG. 2 will be described with reference to FIGS. 10 to 26.

Figure 10:
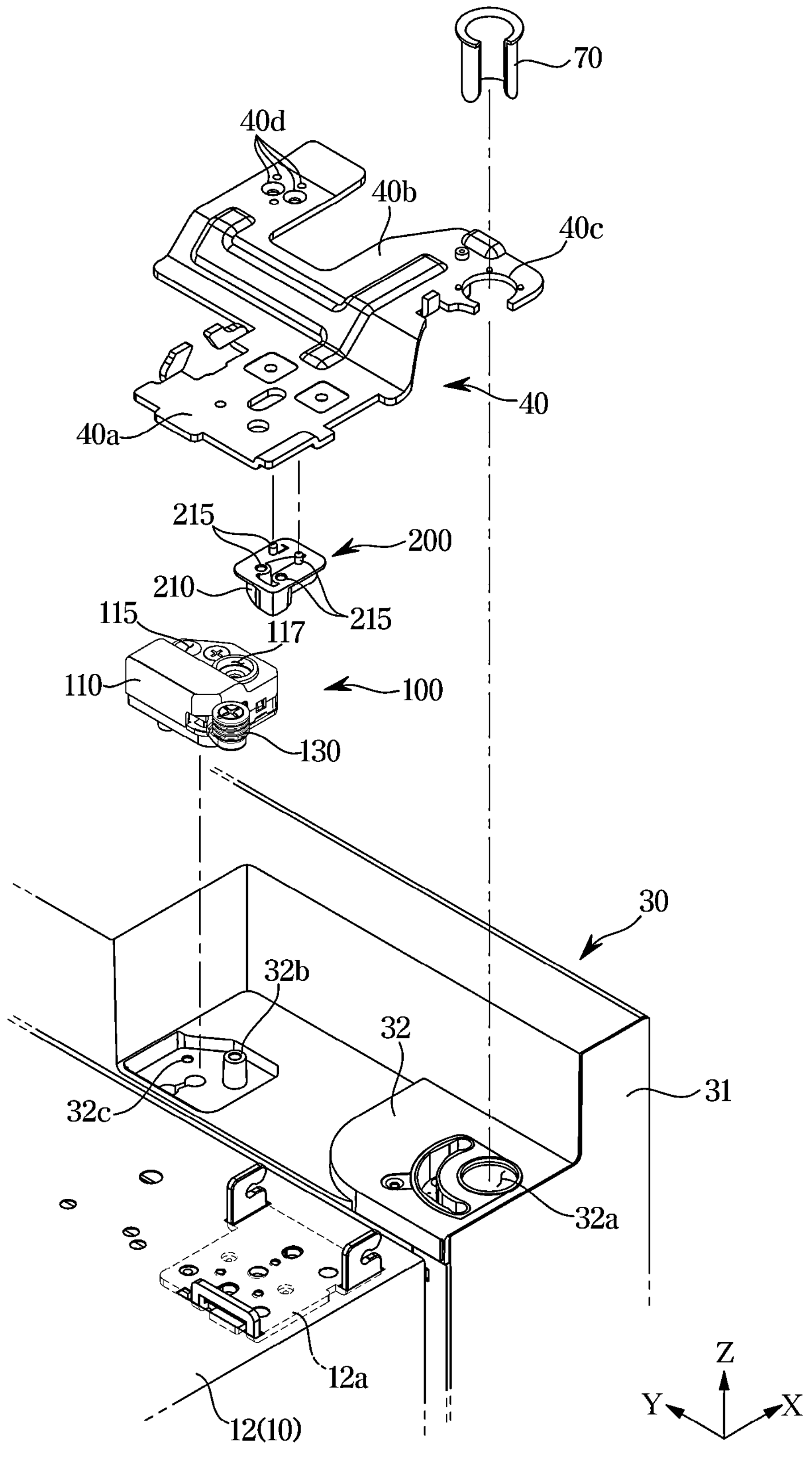
FIG. 10 is a view illustrating a partial configuration of the refrigerator according to one embodiment of the present disclosure.

FIG. 10 is a view illustrating a partial configuration of the refrigerator according to one embodiment of the present disclosure.

Referring to FIG. 10, a portion of the hinge bracket 40 included in the refrigerator 1 according to one embodiment of the present disclosure may be fixed to the main body 10, and the other portion thereof may rotatably support the door 30.

Particularly, the hinge bracket 40 may include a body fixing portion 40*a* fixed to the main body 10 and a door support portion 40*b* supporting the door 30. The body fixing portion 40*a* and the door support portion 40*b* may be connected to each other. The door support portion 40*b* may be formed to extend from the body fixing portion 40*a* toward the door 30. For example, the body fixing portion 40*a* and the door support portion 40*b* may be formed integrally with each other.

For example, the body fixing portion 40*a* may be coupled to the outer case 12. The body fixing portion 40*a* may be seated on one surface of the outer case 12. For example, the main body 10 may include a hinge bracket coupling member 12*a* coupled to the outer case 12. The body fixing portion 40*a* may be coupled to the outer case 12 by being fitted and coupled to the hinge bracket coupling member 12*a*. Alternatively, the body fixing portion 40*a* may be coupled to the outer case 12 by being screwed to the hinge bracket coupling member 12*a*.

For example, the door support portion 40*b* may be disposed on one side of the door 30. On one side of the door 30, the door support portion 40*b* may be disposed adjacent to the rotation axis of the door 30. The door support portion 40*b* may rotatably support the door 30.

The refrigerator 1 may include a hinge shaft 70 coupled to the door 30 and the hinge bracket 40. The hinge shaft 70 may pass through the rotation axis of the door 30. The hinge bracket 40 may include a hinge shaft coupling portion 40*c* to which the hinge shaft 70 is coupled. The hinge shaft coupling portion 40*c* may be disposed on the door support portion 40*b*.

For example, the hinge shaft 70 may be formed to have a substantially cylindrical shape having a central axis corresponding to the rotation axis of the door 30.

For example, the hinge shaft 70 may be fixed to the hinge shaft coupling portion 40*c* of the door support portion 40*b*, and the door 30 may be rotatable about the hinge shaft 70. The hinge shaft 70 may be inserted into one side of the door 30. The door 30 may include a shaft hole 32*a* into which the hinge shaft 70 is inserted, and the shaft hole 32*a* may be formed on one surface of the door 30 facing the hinge bracket 40.

For example, the hinge shaft coupling portion 40*c* may be formed to allow the hinge shaft 70 to pass therethrough. The hinge shaft 70 may be fitted into the hinge shaft coupling portion 40*c* while being disposed to penetrate the hinge shaft coupling portion 40*c*. The hinge shaft coupling portion 40*c* may be disposed at a position corresponding to the shaft hole 32*a*.

The door 30 may include a door frame 31 and a door cap 32 coupled to the door frame 31. The door frame 31 and the door cap 32 may each form the exterior of the door 30. The door frame 31 may be formed along an edge of the door 30 and may form an appearance of a left edge and an appearance of a right edge of the door 30. The door cap 32 may be provided as a pair and may be coupled to upper and lower portions of the door frame 31, respectively. The pair of door caps 32 may form the appearance of the left edge and the appearance of the right edge of the door 30. FIG. 10 illustrates the door cap 32 provided on the upper portion of the door 30 among the pair of door caps 32, as an example, For example, the door support portion 40*b* of the hinge bracket 40 may be provided to support the door cap 32 of the door 30. The shaft hole 32*a* may be formed in the door cap 32, and the hinge shaft 70 may pass through the shaft hole 32*a* formed in the door cap 32 so as to connect the hinge bracket 40 and the door 30.

The guide 200 may be coupled to the hinge bracket 40. The guide 200 may be fixed to the main body 10 by being fixed to the hinge bracket 40. For example, the guide 200 may be fixed to the body fixing portion 40*a* of the hinge bracket 40.

As shown in FIG. 10, the hinge bracket 40 may include a guide coupling portion 40*d* to which the guide 200 is coupled so as to support the guide 200. The guide 200 may include a hinge bracket coupling portion 215 coupled to the guide coupling portion 40*d*. For example, the guide 200 may be fastened to the hinge bracket 40 by a screw penetrating the guide coupling portion 40*d* and the hinge bracket coupling portion 215. For example, the hinge bracket coupling portion 215 of the guide 200 may have a protrusion shape that penetrates the guide coupling portion 40*d*. As the hinge bracket coupling portion 215 penetrates the guide coupling portion 40*d*, the guide 200 may be coupled to the hinge bracket 40. However, the method by which the guide 200 is fixed to the hinge bracket 40 is not limited thereto.

When the guide 200 is coupled to the hinge bracket 40 as mentioned above, the guide 200 may have a fixed position with respect to the main body 10 while being located in a position away from the main body 10. That is, as the guide 200 is coupled to the hinge bracket 40, the guide 200 may be positioned closer to the door 30 and fixed to the main body 10. As a result, the guide 200 may have a simple structure and may apply a force to the door 30 (or the lever device 100 mounted on the door 30) when the door 30 rotates.

The lever device 100 may be mounted on the door 30. Particularly, the lever device 100 may be mounted on one side of the door 30 adjacent to the hinge bracket 40.

The lever device 100 may be coupled to the door cap 32. For example, a lever device coupling protrusion 32*b* may be provided on one side of the door cap 32, and the lever device coupling protrusion 32*b* may be inserted into an insertion hole 117 formed in the lever device 100 to fix the lever device 100. For example, a lever device coupling hole 32*c* may be formed on one side of the door cap 32, and a coupling hole 115 corresponding to the lever device coupling hole 32*c* may be formed in the lever device 100. Accordingly, the lever device 100 may be coupled to the door cap 32 by a fastening member (e.g., screw) penetrating the coupling hole 115 and the lever device coupling hole 32*c*. However, the structure in which the lever device 100 is mounted on the door 30 is not limited thereto.

Figure 11:
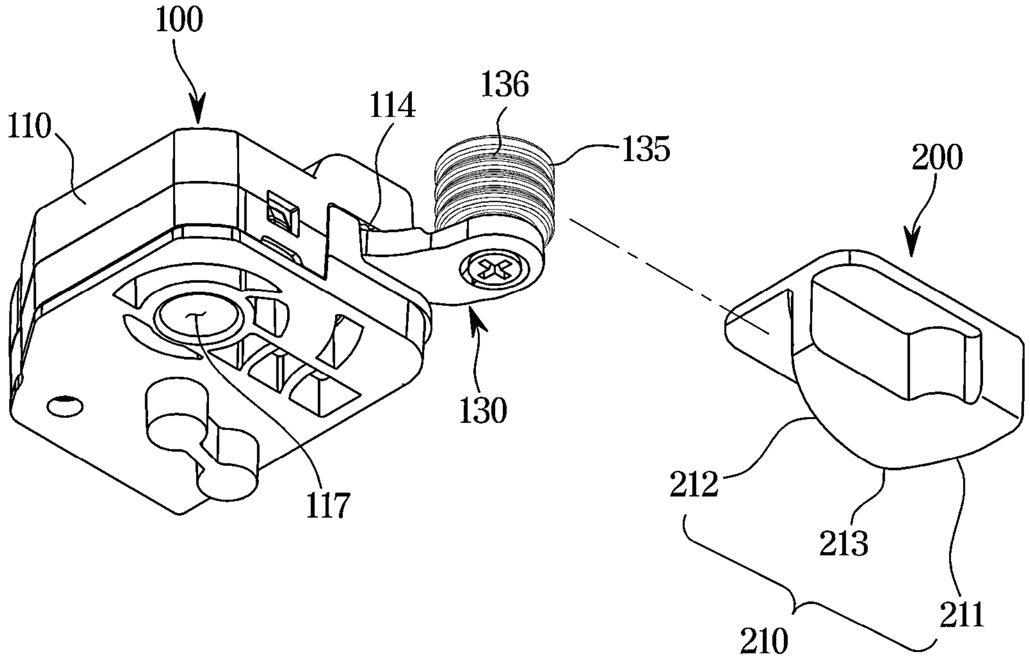
FIG. 11 is a view illustrating a lever device and a guide of the refrigerator according to one embodiment of the present disclosure.

FIG. 11 is a view illustrating a lever device and a guide of the refrigerator according to one embodiment of the present disclosure.

Referring to FIG. 11, the refrigerator 1 may include the lever device 100 and the guide 200. The lever device 100 and the guide 200 may form the door opening and closing guide module configured to apply a force to the door 30 and guide the rotation of the door 30 when the door 30 rotates.

The lever device 100 may be configured to receive a force from the guide 200 and transmit the force to the door 30 when the door 30 rotates. For example, when the door 30 rotates to the open position, the lever device 100 may receive a force from the guide 200 and transmit the force to the door 30 in the direction in which the door 30 is opened (i.e., the first direction). For example, when the door 30 rotates to the closed position, the lever device 100 may receive a force from the guide 200 and transmit the force to the door 30 in the direction in which the door 30 is closed (i.e., the second direction).

Particularly, the lever device 100 may include the lever 130 provided to be in contact with the guide 200. The guide 200 may be provided to guide the movement of the lever 130 by being in contact with the lever 130 when the door 30 rotates. Because the guide 200 is fixed to the main body 10 and the lever 130 is mounted on the door 30, the relative position of the lever 130 with respect to the guide 200 may be changed according to the position of the door 30. That is, the position of the lever 130 in contact with the guide 200 may vary according to the opening angle of the door 30. The guide 200 may have a cam structure that guides the movement of the lever 130.

The guide 200 may include a guide surface 210 provided to be in contact with the lever 130 while the door 30 is being opened or closed. The guide surface 210 may form a portion of the outer surface of the guide 200.

Particularly, the guide surface 210 may include a first contact surface 211 provided to apply a force to the lever 130 in the direction, in which the door 30 is closed (i.e., the second direction), by being in contact with the lever 130. When the lever 130 is in contact with the first contact surface 211, the lever 130 may apply a force to the door 30 in the direction in which the door 30 is closed (i.e., the second direction). When the lever 130 comes into contact with the first contact surface 211 while the door 30 is being closed, the lever 130 may apply a force to the door 30 in the direction in which the door 30 is closed. At this time, the lever 130 may move along the first contact surface 211.

In addition, the guide surface 210 may include a second contact surface 212 provided to transmit a force in the direction, in which the door 30 is opened (i.e., the first direction) to the lever 130, by being in contact with the lever 130. When the lever 130 is in contact with the second contact surface 212 of the guide 200, the lever 130 may apply a force to the door 30 in the direction in which the door 30 is opened (i.e., the first direction). When the lever 130 comes into contact with the second contact surface 212 while the door 30 is being opened, the lever 130 may apply a force to the door 30 in the direction in which the door 30 is opened. At this time, the lever 130 may move along the second contact surface 212.

The guide surface 210 may include a curved point 213 disposed between the first contact surface 211 and the second contact surface 212. The first contact surface 211 and the second contact surface 212 may be connected to each other based on the curved point 213. While the door 30 is being opened, the lever 130 in contact with the guide 200 may move by sequentially passing the first contact surface 211, the curved point 213, and the second contact surface 212. While the door 30 is being closed, the lever 130 in contact with the guide 200 may move by sequentially passing the second contact surface 212, the curved point 213, and the first contact surface 211. That is, as the opening angle of the door 30 increases, the lever 130 may move while being sequentially in contact with the first contact surface 211, the curved point 213, and the second contact surface 212. Conversely, as the opening angle of the door 30 decreases, the lever 130 may move while being sequentially in contact with the second contact surface 212, the curved point 213, and the first contact surface 211.

Figure 16:
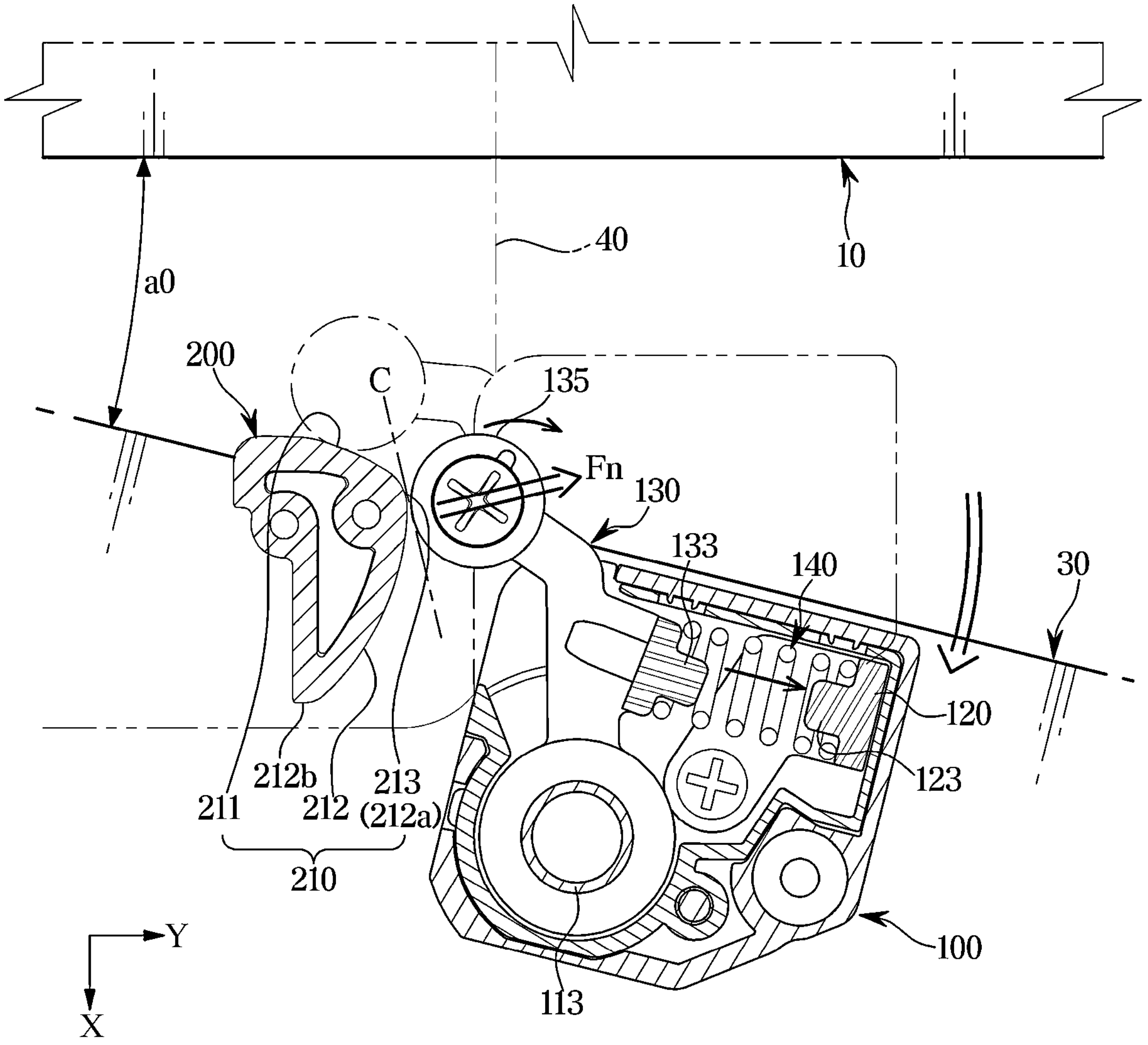
FIG. 16 is a view illustrating a state in which the roller of the lever is in contact with a curved point of the guide in the refrigerator according to one embodiment of the present disclosure.

An opening angle of the door 30 when the lever 130 is in contact with the curved point 213 of the guide 200 is defined as a reference angle a0 (refer to FIG. 16).

When the opening angle of the door 30 is less than the reference angle a0, the lever 130 may be in contact with the first contact surface 211 of the guide 200. In this case, the lever 130 may apply a force to the door 30 in the direction in which the door 30 is closed (i.e., the second direction). Through the lever 130, the guide 200 may apply a force to the door 30 in the direction in which the door 30 is closed (i.e., the second direction). When an additional external force is not applied to the door 30 in the state in which the lever 130 is in contact with the first contact surface 211, the door 30 may rotate in the second direction and be closed. When a force greater than the force applied by the guide 200 and the lever 130 is transmitted to the door 30 in the direction of opening the door 30, the door 30 may rotate to the open position despite of the lever 130 and the guide 200.

Conversely, when the opening angle of the door 30 is greater than the reference angle a0, the lever 130 may be in contact with the second contact surface 212 of the guide 200. In this case, the lever 130 may apply a force to the door 30 in the direction in which the door 30 is opened (i.e., the first direction). Through the lever 130, the guide 200 may apply a force to the door 30 in the direction in which the door 30 is opened (i.e., the first direction). When an additional external force is not applied to the door 30 in the state in which the lever 130 is in contact with the second contact surface 212, the door 30 may rotate in the first direction and be opened. When a force greater than the force applied by the guide 200 and the lever 130 is transmitted to the door 30 in the direction of closing the door 30, the door 30 may rotate to the closed position.

With this structure, the guide 200 and the lever device 100 may transmit a force to the door 30 in the direction in which the door 30 is closed (i.e., the second direction) while the door 30 is being closed. That is, the guide 200 and the lever device 100 may automatically close the door 30 when the door 30 is closed at a certain angle or more in the second direction from the maximum open position. In addition, while the door 30 being is opened, the guide 200 and the lever device 100 may apply a force to the door 30 in the direction in which the door 30 is opened. That is, the guide 200 and the lever device 100 may easily open the door 30 with only a small force when the door 30 is opened at a certain angle or more in the first direction from the closed position.

A force which is applied to the door 30 when the guide 200 is in contact with the lever 130 may include an elastic force caused by the lever 130. Particularly, the lever device 100 may include a spring 140 (refer to FIG. 12) connected to the lever 130. The spring 140 may elastically support the lever 130. For example, the spring 140 may include a compression spring.

According to a position in which the lever 130 is in contact with the guide 200, the spring 140 may accumulate an elastic force or provide an elastic force to the door 30. The spring 140 may be provided to be compressed or stretched according to the position in which the lever 130 is in contact with the guide 200. For example, the lever 130 may be provided to be movable with respect to the door 30, and one end of the spring 140 may be connected to the lever 130 and the other end thereof may be fixed to the door 30. In this case, according to the position in which the lever 130 is in contact with the guide 200, the relative position of the lever 130 with respect to the door 30 may vary, and the spring 140 may be compressed or stretched. The lever 130 may provide an elastic force to the door 30 using the spring 140.

When the lever 130 is in contact with the first contact surface 211 of the guide 200, the spring 140 may provide an elastic force to the door 30 in the direction in which the door 30 is closed (i.e., the second direction). In other words, when the lever 130 is in contact with the first contact surface 211 of the guide 200, the lever 130 may apply an elastic force to the door 30 in the direction, in which the door 30 is closed (i.e., the second direction), by using the spring 140. When the lever 130 is in contact with the second contact surface 212 of the guide 200, the spring 140 may provide an elastic force to the door 30 in the direction in which the door 30 is opened (i.e., the first direction). In other words, when the lever 130 is in contact with the second contact surface 212 of the guide 200, the lever 130 may apply an elastic force to the door 30 in the direction, in which the door 30 is opened (i.e., the first direction), by using the spring 140. When the lever 130 is in contact with the curved point 213 located between the first contact surface 211 and the second contact surface 212, the elastic force may be maximally accumulated in the spring 140.

The guide surface 210 may have a shape that protrudes toward the lever 130 when the lever 130 is in a position in contact with the guide surface 210. The guide surface 210 may be formed to maximally protrude at the curved point 213.

As shown in FIGS. 14 to 17, etc., a distance from the rotation axis of the door 30 in the horizontal direction (left and right direction (Y)) may be the furthest from the curved point 213 among regions on the guide surface 210. The first contact surface 211 and the second contact surface 212 may be extended in such a way that as the first contact surface 211 and the second contact surface 212 are away from the curved point 213, the distance in the horizontal direction (Y) from the rotation axis of the door 30 may be reduced. That is, the first contact surface 211 and the second contact surface 212 of the guide surface 210 may be formed to be inclined in a direction opposite to the direction in which the guide surface 210 protrudes based on the curved point 213.

With this configuration, the elastic force may be maximally accumulated in the spring 140 when the lever 130 is in contact with the curved point 213, and when the lever 130 moves from the position in contact with the curved point 213 to the first contact surface 211 or the second contact surface 212, the spring 140 may be returned and the accumulated elastic force may be applied to the door 30. The curved point 213 may be a reference point at which the elastic force accumulated in the spring 140 is applied to the door 30.

Hereinafter the structure of the lever device 100 will be described with reference to FIGS. 12 and 13.

Figure 12:
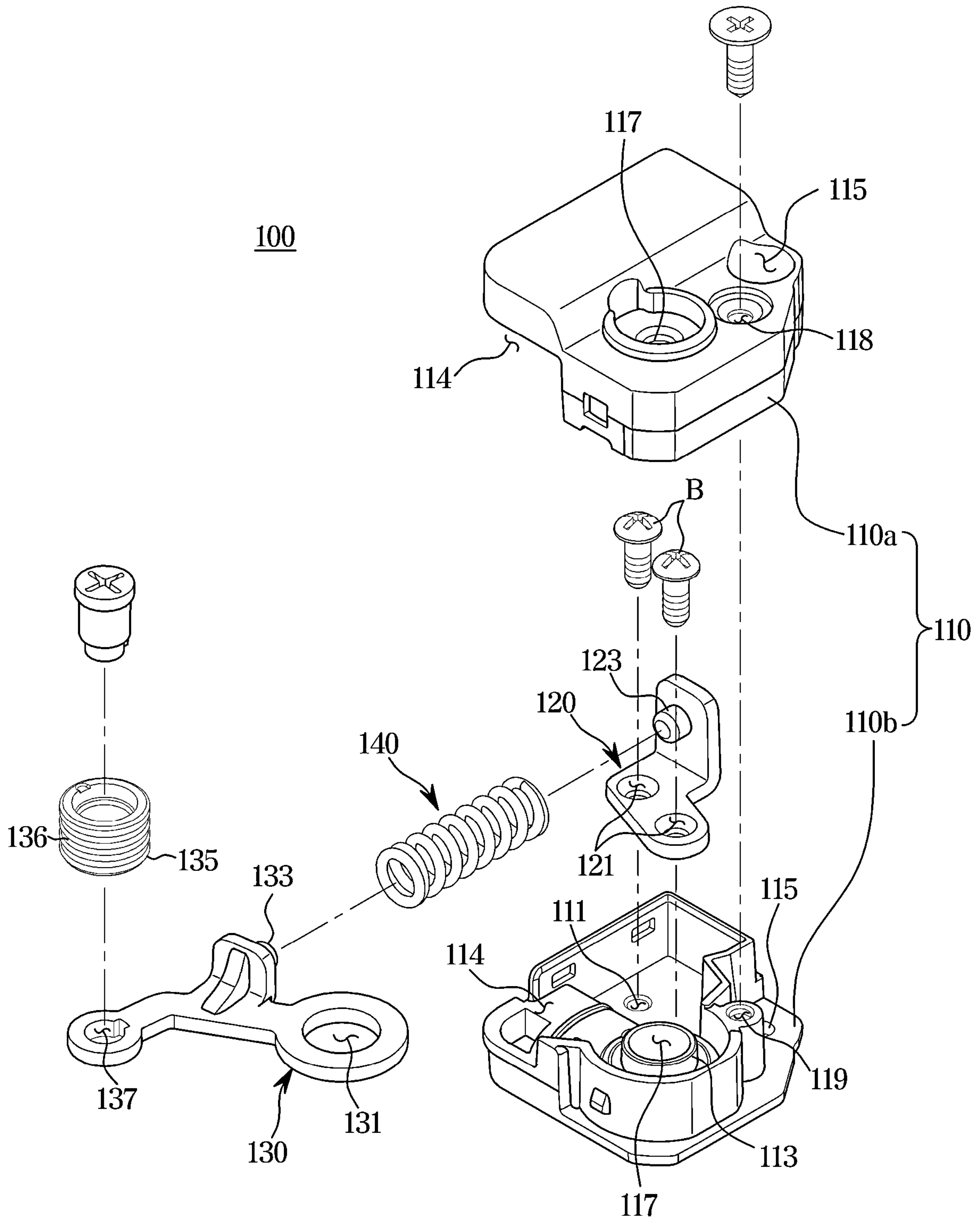
FIG. 12 is a view illustrating a configuration of the lever device of the refrigerator according to one embodiment of the present disclosure.

FIG. 12 is a view illustrating a configuration of the lever device of the refrigerator according to one embodiment of the present disclosure. FIG. 13 is a view illustrating the configuration of the lever device of the refrigerator according to one embodiment of the present disclosure.

Figure 13:
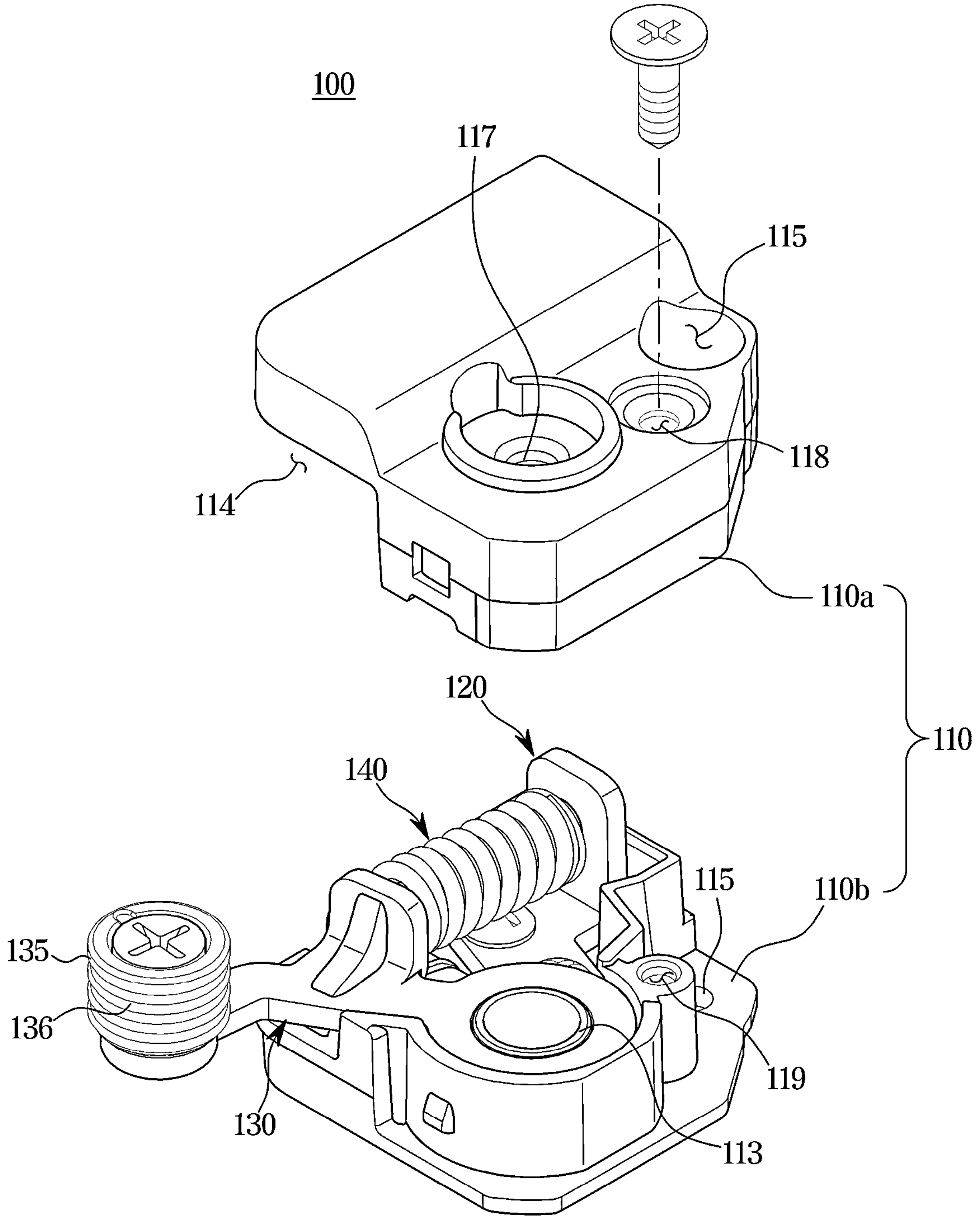
FIG. 13 is a view illustrating the configuration of the lever device of the refrigerator according to one embodiment of the present disclosure.

Referring to FIGS. 12 and 13, the lever device 100 included in the refrigerator 1 according to one embodiment of the present disclosure may include a lever case 110. The lever case 110 may be fixed to the door 30. For example, the lever case 110 may be mounted on the door cap 32. The lever case 110 may form the exterior of the lever device 100. The lever case 110 may support each component of the lever device 100, such as the lever 130 and the spring 140.

For example, the lever case 110 may include a first case **110*a* and a second case 110*b*. The first case 110*a* may be coupled to an upper portion of the second case 110*b*. To fasten the first case 110*a* and the second case 110*b*, a fastening hole 118 and a fastening groove 119 may be formed in the first case 110*a* and the second case 110*b*, respectively. A fastening member passing through the fastening hole 118 may be fastened to the fastening groove 119, and thus the first case 110*a* and the second case 110*b*** may be fastened to each other.

The lever case 110 may movably support the lever 130. The lever 130 may be configured to be movable with respect to the lever case 110. Particularly, the lever 130 may be rotatably coupled to the lever case 110.

The lever case 110 may include a lever shaft 113 to which the lever 130 is rotatably coupled. The lever 130 may be rotatably coupled to the lever shaft 113 and may rotate with respect to the lever shaft 113. For example, the lever 130 may be configured to be rotatable with respect to the lever shaft 113 when the lever 130 is in contact with the guide 200 while the door 30 rotates.

For example, the lever shaft 113 may have a cylindrical shape having a central axis corresponding to the rotation axis of the lever 130.

The lever case 110 may include a lever opening 114 provided to open to allow the lever 130 to rotate about the lever shaft 113. The lever opening 114 may be formed to prevent the lever 130 from being interfered with the lever case 110 when the lever 130 rotates about the lever shaft 113. The lever opening 114 may form a space to allow the lever 130 to rotate about the lever shaft 113. A portion of the lever 130 accommodated inside the lever case 110 may be exposed to the outside of the lever case 110 through the lever opening 114.

The lever case 110 may include the coupling hole 115 corresponding to the lever device coupling hole **32*c* of the door cap 32. The coupling hole 115 may be formed in the first case 110*a* and the second case 110*b***.

The lever case 110 may include the insertion hole 117 into which the lever device coupling protrusion 32*b* of the door cap 32 is inserted. As the lever device coupling protrusion 32*b* is inserted into the insertion hole 117, the lever device 100 may be fixed to the door cap 32. The insertion hole 117 may be formed in the first case 110*a* and the second case 110*b*.

The lever device 100 may include a support 120. The support 120 may be mounted inside the lever case 110. The support 120 may be fixed to the lever case 110. For example, the support 120 may be coupled to the lever case 110 by a fastening member. For example, the lever case 110 may include a support mounting groove 111, and the support 120 may include a mounting hole 121 mounted on the support mounting groove 111 by a fastening member. For example, the support mounting groove 111 may be formed in the second case 110*b*. For example, the support mounting groove 111 and the mounting hole 121 may be provided as a pair.

The support 120 may be provided to support the spring 140. The support 120 may be provided to support one end of the spring 140. In the lever case 110, both ends of the spring 140 may be supported by the support 120 and the lever 130, respectively.

For example, the support 120 may include a first support protrusion 123 on which one end of the spring 140 is supported. One end of the spring 140 may be supported by the first support protrusion 123 of the support 120 fixed inside the lever case 110, and the other end thereof may be supported by the lever 130. While the door 30 rotates, the lever 130 may be in contact with the guide surface 210 and rotate about the lever shaft 113 so as to compress the spring 140 or to allow the compressed spring 140 to be returned to the length of the spring 140 before the compression.

Alternatively, one end of the spring 140 may be fixed to a portion other than the support 120 as long as the spring 140 is provided to be fixed when the lever 130 rotates. For example, one end of the spring 140 may be fixed inside the lever case 110. The first support protrusion 123 may be integrally provided inside the lever case 110 in order that one end of the spring 140 is fixed inside the lever case 110. FIGS. 12 and 13 illustrate that the support 120 is separately provided and mounted inside the lever case 110, but is not limited thereto. That is, the support 120 may be formed integrally with the lever case 110.

As described above, the lever 130 may be rotatably coupled to the inside of the lever case 110. The lever 130 may include a rotation hole 131 rotatably coupled to the lever shaft 113 of the lever case 110. The lever shaft 113 may be arranged to penetrate the rotation hole 131. The lever shaft 113 may rotatably support the lever 130 in a state in which the lever shaft 113 penetrates the rotation hole 131.

The lever 130 may include a second support protrusion 133 on which the other end of the spring 140 is supported. One end of the spring 140 may be supported on the first support protrusion 123 of the support 120 fixed inside the lever case 110, and the other end thereof may be supported on the second support protrusion 133 of the lever 130 rotatably coupled to the lever shaft 113 inside the lever case 110. Therefore, one end of the spring 140 is fixed to the support 120 and the other end thereof is connected to the lever 130, and thus when the lever 130 rotates according to the opening and closing of the door 30, the spring 140 may be compressed by the lever 130 that rotates relative to the lever case 110 or the length of the spring may be returned before the compression. When the lever 130 rotates about the lever shaft 113, the spring 140 may be compressed or returned to the original length before the compression, according to the rotation direction of the lever 130. When the spring 140 is compressed by the lever 130, the spring 140 may accumulate the elastic force as much as the spring 140 is compressed, and when the compressed spring 140 is returned to the length before the compression, the accumulated elastic force may be applied to the door 30.

The lever 130 may include a roller 135 provided to be in contact with the guide 200. The roller 135 may be provided to be in contact with the guide surface 210 when the door 30 rotates. The roller 135 in contact with the guide surface 210 may move along the shape of the guide surface 210. As the roller 135 moves along the guide surface 210, the lever 130 may rotate about the lever shaft 113. When the lever 130 rotates about the lever shaft 113, the roller 135 may move while maintaining contact with the guide surface 210 due to the elastic force of the spring 140. When the lever 130 rotates about the lever shaft 113, the roller 135 may move while maintaining contact with the guide surface 210. Accordingly, the spring 140 may be compressed more efficiently and when the spring 140 is returned to the length before the compression, the elastic force of the spring 140 may be more efficiently provided to the door 30. The spring 140 may be compressed or returned when the roller 135 moves along the guide surface 210 while the roller 135 is in contact with the guide surface 210.

For example, the roller 135 may include a plurality of grooves 136 formed along an outer circumferential surface of the roller 135. When the roller 135 is in contact with the guide surface 210, a contact area between the roller 135 and the guide surface 210 may be reduced because the plurality of grooves 136 is formed on the outer circumferential surface of the roller 135. Accordingly, friction between the roller 135 and the guide surface 210 may be reduced.

For example, the roller 135 may be rotatably mounted to the lever 130. The lever 130 may include a roller mounting hole 137 on which the roller 135 is mounted. The roller 135 may be rotatably mounted on the roller mounting hole 137 by a fastening member.

With the above structure, when the door 30 rotates, the lever 130 may rotate with respect to the lever shaft 113 while the roller 135 is in contact with the guide surface 210 of the guide 200 and moves along the shape of the guide surface 210.

Figure 14:
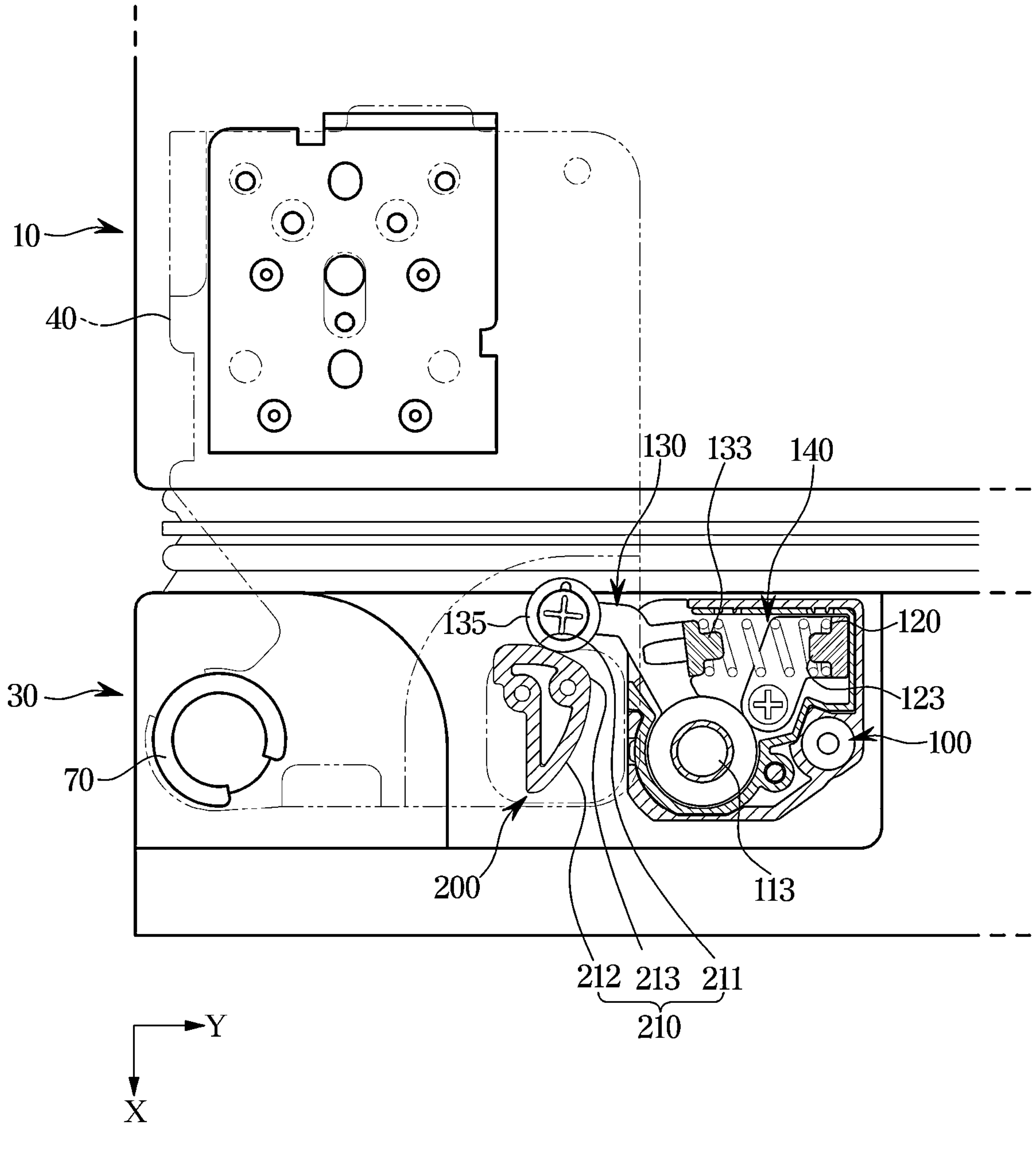
FIG. 14 is a view illustrating the refrigerator according to one embodiment of the present disclosure when the door is at a closed position.
Figure 15:
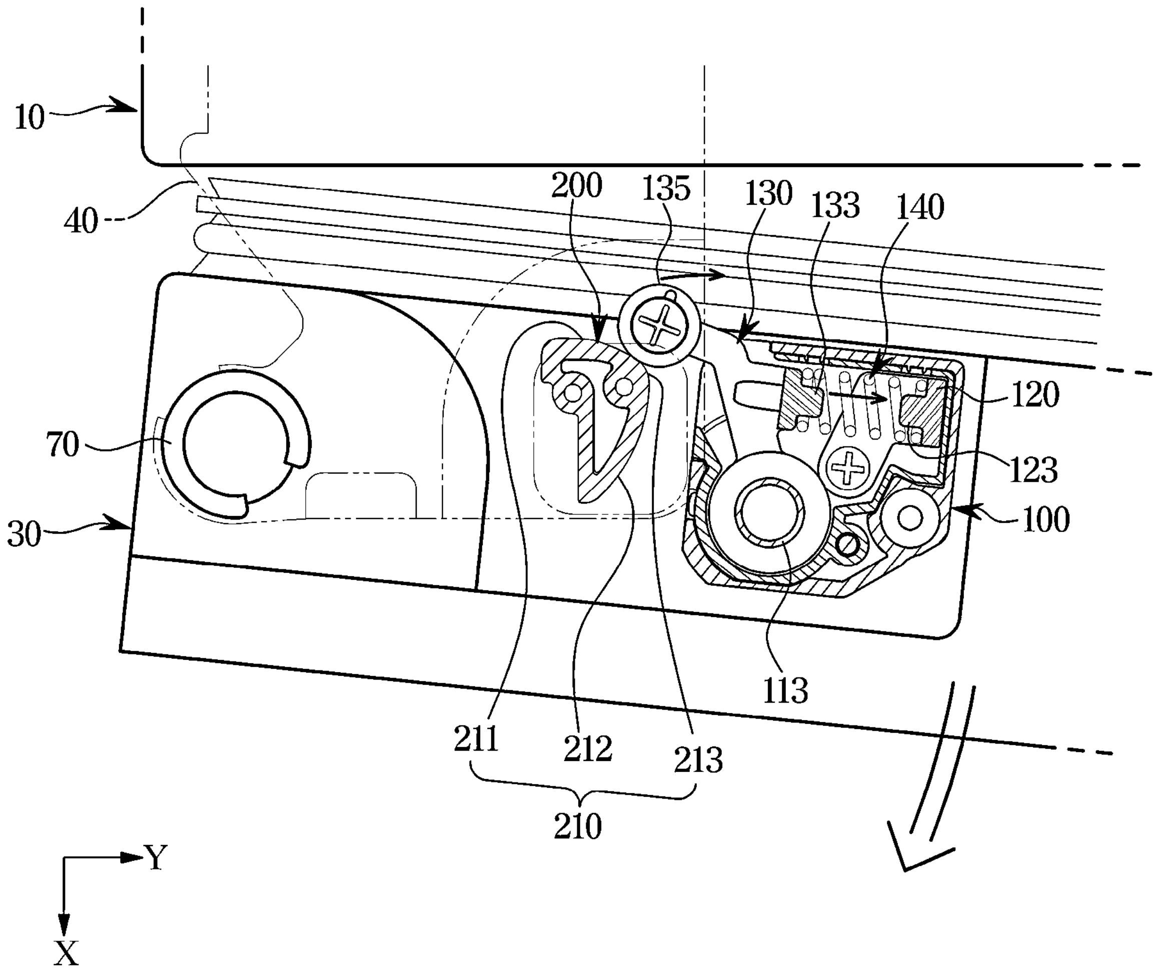
FIG. 15 is a view illustrating a state in which a roller of the lever moves along a first contact surface of the guide while the door is being opened in the refrigerator according to one embodiment of the present disclosure.
Figure 17:
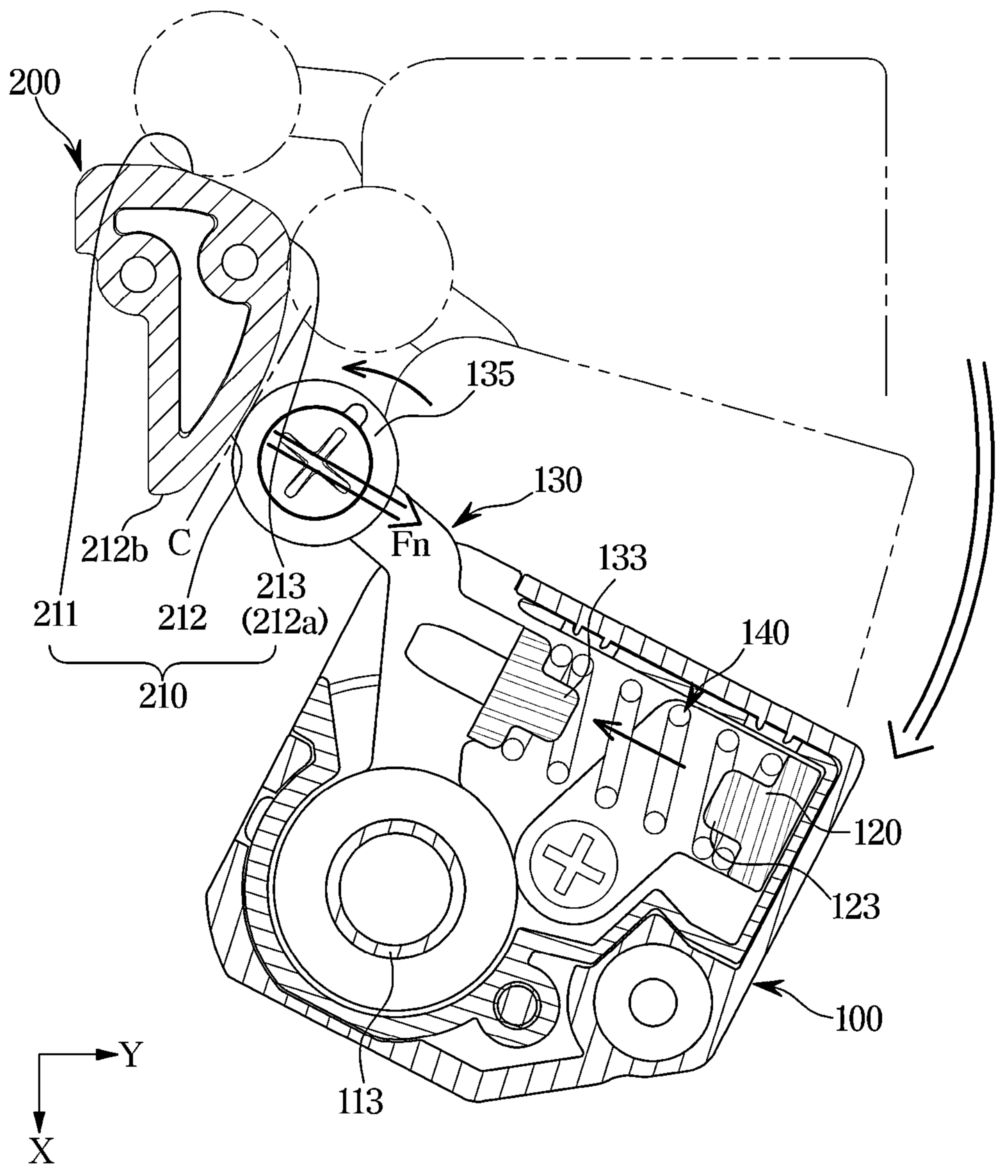
FIG. 17 is a view illustrating a state in which the roller of the lever moves along a second contact surface of the guide while the door is being opened in the refrigerator according to one embodiment of the present disclosure.

FIG. 14 is a view illustrating the refrigerator according to one embodiment of the present disclosure when the door is at a closed position. FIG. 15 is a view illustrating a state in which a roller of the lever moves along a first contact surface of the guide while the door is being opened in the refrigerator according to one embodiment of the present disclosure. FIG. 16 is a view illustrating a state in which the roller of the lever is in contact with a curved point of the guide in the refrigerator according to one embodiment of the present disclosure. FIG. 17 is a view illustrating a state in which the roller of the lever moves along a second contact surface of the guide while the door is being opened in the refrigerator according to one embodiment of the present disclosure.

Referring to FIGS. 14 to 17, while the door 30 is being opened or closed in the refrigerator 1 according to one embodiment of the present disclosure, the door opening and closing guide module including the guide 200 and the lever device 100 may guide the rotation of the door 30. While the door 30 is being opened or closed, the door opening and closing guide module including the guide 200 and the lever device 100 may apply a force to the door 30 in the direction in which the door 30 is opened (i.e., the first direction) or in the direction in which the door 30 is closed (i.e., the second direction).

Particularly, while the door 30 is being opened, the lever 130 may move and rotate with respect to the door 30 in the state in which the lever 130 is in contact with the first contact surface 211 of the guide 200. At this time, the spring 140 may be compressed to accumulate the elastic force. That is, the spring 140 may be provided to be compressed by the lever 130 when the lever 130 comes into contact with the first contact surface 211 and moves toward the curved point 213 along the first contact surface 211. While the door 30 is being opened, the first contact surface 211 may be a section in which the lever device 100 accumulates the elastic force. When the lever 130 (particularly, the roller 135 of the lever 130) passes the first contact surface 211 and reaches the curved point 213, the elastic force accumulated in the lever 130 may be maximized.

When the opening angle of the door 30 further increases after the lever 130 is in contact with the curved point 213, the lever may be in contact with the second contact surface 212, and the lever 130 may rotate to a direction in which the compressed spring 140 is returned. As the compressed spring 140 is returned, the elastic force accumulated in the spring 140 may be applied to the door 30 in a direction in which the opening angle of the door 30 further increases. That is, when the lever 130 is in contact with the second contact surface 212 and moves in a direction away from the curved point 213 along the second contact surface 212, the spring 140 may apply the elastic force to the door 30 in the direction in which the opening angle of the door 30 increases. The second contact surface 212 may be a section in which the lever device 100 provides the elastic force to the door 30 while the door 30 is being opened.

Particularly, when the door 30 is in the closed position, the lever 130 may be in contact with the first contact surface 211 of the guide surface 210 as shown in FIG. 14. When the door 30 begins to rotate in the first direction from the closed position, the lever 130 may move along the first contact surface 211 and rotate about the lever shaft 113 as shown in FIG. 15. When the lever 130 rotates about the lever shaft 113, the spring 140 may be compressed by the lever 130 and may accumulate the elastic force. Based on the drawing, when the lever 130 moves toward the curved point 213 along the first contact surface 211, the lever 130 may rotate clockwise about the lever shaft 113 and thus the spring 140 may be compressed.

When the opening angle of the door 30 is less than the reference angle a0 (refer to FIG. 16), the lever 130 may be in contact with the first contact surface 211 as illustrated in FIG. 15. The spring 140 may be compressed until the lever 130 reaches the curved point 213 after the lever 130 moves along the first contact surface 211.

When the opening angle of the door 30 is equal to the reference angle a0, the lever 130 may be in contact with the curved point 213 as illustrated in FIG. 16. When the lever 130 passes the first contact surface 211 and reaches the curved point 213, the spring 140 may be maximally compressed.

When the spring 140 may be maximally compressed as the lever 130 passes the first contact surface 211 and reaches the curved point 213, a repulsive force Fn of the guide 200 caused by the elastic force of the spring 140 may be generated in a direction perpendicular to a tangent line between the roller 135 of the lever 130 and the guide surface 210.

When the opening angle of the door 30 exceeds the reference angle a0, the lever 130 may move to the second contact surface 212 from the curved point 213 of the guide 200 and then be in contact with the second contact surface 212 as illustrated in FIG. 17. At this time, when the lever 130 moves along the second contact surface 212 and moves away from the curved point 213, the spring 140 may be stretched from the maximum compressed length and returned to the length before the compression. The lever 130 may move along the second contact surface 212 while the lever 130 rotates by changing the rotation direction to the opposite direction. Based on the drawing, when the lever 130 moves in a direction away from the curved point 213 along the second contact surface 212, the lever 130 may rotate counterclockwise about the lever shaft 113.

When the spring 140 is returned, the elastic force accumulated in the spring 140 may be applied to the door 30. When the roller 135 of the lever 130 comes into contact with the second contact surface 212, the repulsive force Fn of the guide 200, which is caused by the elastic force of the spring 140 and generated in the direction perpendicular to the tangent line between the roller 135 and the guide surface 210, may be applied to the door 30 in the direction in which the door 30 is opened (i.e., the first direction). Therefore, when the lever 130 comes into contact with the second contact surface 212 as the opening angle of the door 30 is greater than the reference angle a0, the door 30 may be opened by the elastic force transmitted from the lever device 100.

As shown in FIGS. 16 and 17, the second contact surface 212 of the guide 200 may include a first point 212*a* at which the lever 130 is in contact with the second contact surface 212 and enters when the opening angle of the door 30 increases, and a second point 212*b* from which the lever 130 is separated from the second contact surface 212. That is, when the opening angle of the door 30 increases, the lever 130 may pass the first contact surface 211 and the curved point 213 and enter the second contact surface 212 through the first point 212*a*. The lever 130 may move along the second contact surface 212 from the first point 212*a* toward the second point 212*b*, and then be separated from the second contact surface 212 when the lever 130 reaches the second point 212*b*.

The first point 212*a* of the second contact surface 212 may be disposed at one end of the second contact surface 212 closest to the curved point 213, and the second point 212*b* may be disposed at the other end of the second contact surface 212 that is opposite to the first point 212*a*. For example, as shown in FIGS. 16 and 17, the first point 212*a* of the second contact surface 212 may coincide with the curved point 213.

When the opening angle of the door 30 is greater than the reference angle a0, the lever 130 may pass the first point 212*a* and reach the second contact surface 212. In this state, when the opening angle of the door 30 further increases, the lever 130 may pass the second point 212*b* of the second contact surface 212 and be separated from the second contact surface 212. The elastic force is applied to the door 30 while the lever 130 moves along the second contact surface 212, and thus even after the lever 130 is completely separated from the second contact surface 212, the door 30 may continue to rotate toward the open position due to the inertia.

With this structure, after the door 30 is opened at an angle greater than the reference angle a0, the door 30 may automatically rotate in the first direction and then be completely opened.

An operation while the door 30 is being closed, which is opposite to the description with reference to FIGS. 14 and 17, will be described.

Particularly, while the door 30 is being closed, the lever 130 may move and rotate with respect to the door 30 in the state in which the lever 130 is in contact with the second contact surface 212 of the guide 200. At this time, the spring 140 may be compressed to accumulate the elastic force. That is, the spring 140 may be provided to be compressed by the lever 130 when the lever 130 comes into contact with the second contact surface 212 and moves toward the curved point 213 along the second contact surface 212. While the door 30 is being closed, the second contact surface 212 may be a section in which the lever device 100 accumulates the elastic force. When the lever 130 (particularly, the roller 135 of the lever 130) passes the second contact surface 212 and reaches the curved point 213, the elastic force accumulated in the lever 130 may be maximized.

When the opening angle of the door 30 further decreases after the lever 130 is in contact with the curved point 213, the lever 130 may be in contact with the first contact surface 211, and the lever 130 may rotate to a direction in which the compressed spring 140 is returned. As the compressed spring 140 is returned, the elastic force accumulated in the spring 140 may be applied to the door 30 in a direction in which the opening angle of the door 30 further decreases. That is, when the lever 130 is in contact with the first contact surface 211 and moves in the direction away from the curved point 213 along the first contact surface 211, the spring 140 may apply the elastic force to the door 30 in the direction in which the opening angle of the door 30 decreases. The first contact surface 211 may be a section in which the lever device 100 provides the elastic force to the door 30 while the door 30 is being closed.

Particularly, when the door 30 is rotated by a predetermined angle from the fully opened position to the second direction, the lever 130 may be in contact with the second contact surface 212 of the guide surface 210. Particularly, the lever 130 may enter the second contact surface 212 through the second point 212*b* of the second contact surface 212 and move to the first point 212*a* along the second contact surface 212. The lever 130 may move along the second contact surface 212 and rotate about the lever shaft 113. When the lever 130 rotates about the lever shaft 113, the spring 140 may be compressed by the lever 130 and may accumulate the elastic force. Based on the drawing, when the lever 130 moves toward the curved point 213 along the second contact surface 212, the lever 130 may rotate clockwise about the lever shaft 113 and thus the spring 140 may be compressed.

When the opening angle of the door 30 is greater than the reference angle a0 while the door 30 is being closed, the lever 130 may be in contact with the second contact surface 212. The spring 140 may be compressed until the lever 130 reaches the curved point 213 after the lever 130 moves along the second contact surface 212.

When the opening angle of the door 30 is equal to the reference angle a0, the lever 130 may be in contact with the curved point 213, and the spring 140 may be maximally compressed.

When the spring 140 is maximally compressed as the lever 130 passes the second contact surface 212 and reaches the curved point 213, a repulsive force Fn of the guide 200 caused by the elastic force of the spring 140 may be generated in a direction perpendicular to a tangent line between the roller 135 of the lever 130 and the guide surface 210.

When the opening angle of the door 30 is less than the reference angle a0, the lever 130 may move to the first contact surface 211 from the curved point 213 of the guide 200 and then be in contact with the first contact surface 211. At this time, when the lever 130 moves along the first contact surface 211 and moves away from the curved point 213, the spring 140 may be stretched from the maximum compressed length and returned to the length before the compression. The lever 130 may move along the first contact surface 211 while the lever 130 rotates by changing the rotation direction to the opposite direction. Based on the drawing, when the lever 130 moves in a direction away from the curved point 213 along the first contact surface 211, the lever 130 may rotate counterclockwise about the lever shaft 113.

When the spring 140 is returned, the elastic force accumulated in the spring 140 may be applied to the door 30. When the roller 135 of the lever 130 comes into contact with the first contact surface 211, the repulsive force Fn of the guide 200, which is caused by the elastic force of the spring 140 and generated in the direction perpendicular to the tangent line between the roller 135 and the guide surface 210, may be applied to the door 30 in the direction in which the door 30 is closed (i.e., the second direction). Therefore, when the lever 130 comes into contact with the first contact surface 211 as the opening angle of the door 30 is less than the reference angle a0, the door 30 may be closed by the elastic force transmitted from the lever device 100.

With this door opening and closing guide module, the door 30 may be easily opened or closed, and even when only a small force is applied to the door 30, the door 30 may be automatically opened or closed.

In addition, the refrigerator 1 according to one embodiment of the present disclosure may include a door opening and closing guide module including various configurations configured to guide the rotation of the door 30 by transmitting a force to the door 30 when the door 30 rotates between the open position and the closed position.

Figure 18:
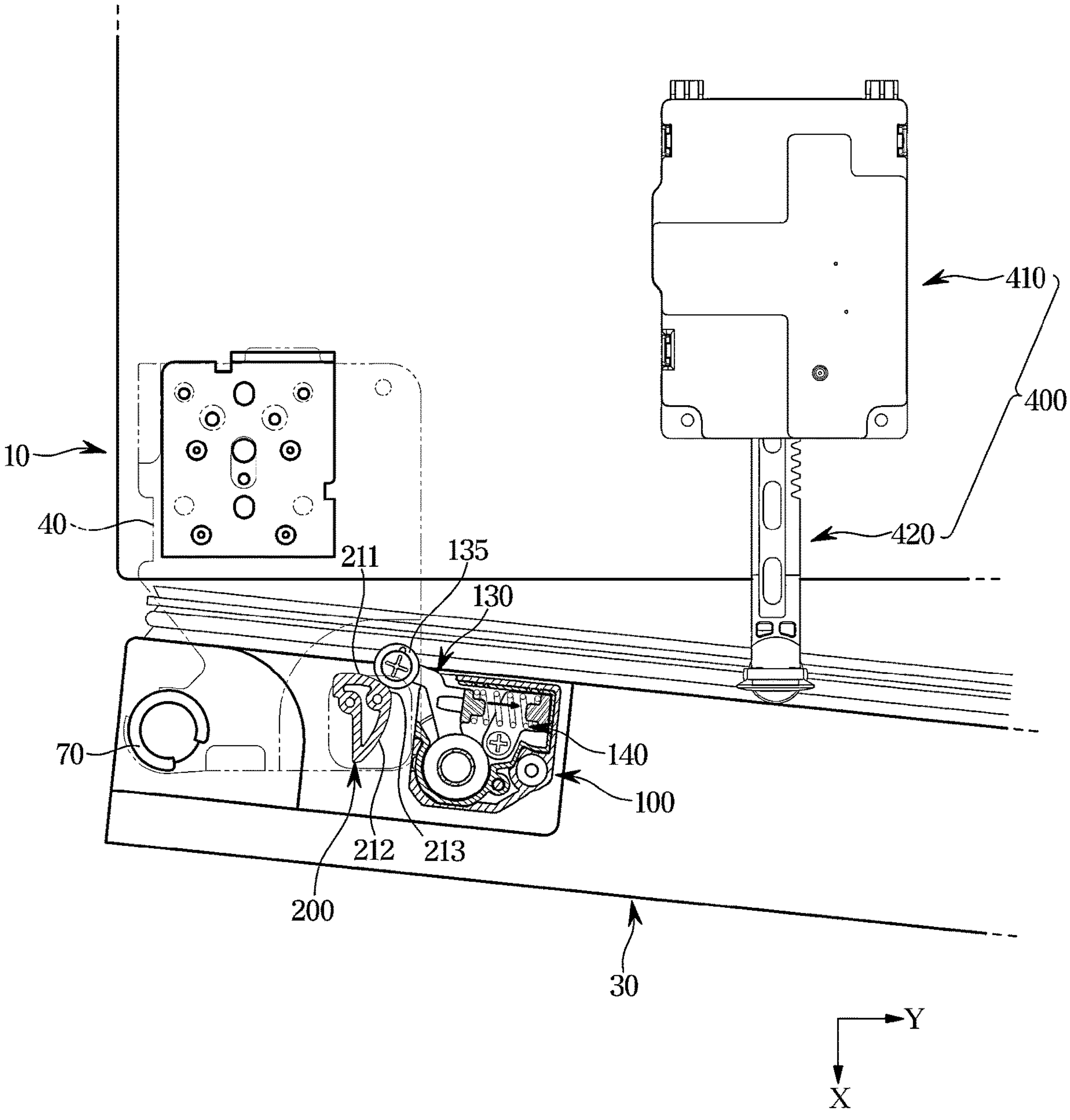
FIG. 18 is a view illustrating a state in which the door pusher presses the door when the roller of the lever is in contact with the first contact surface of the guide in the refrigerator according to one embodiment of the present disclosure.
Figure 19:
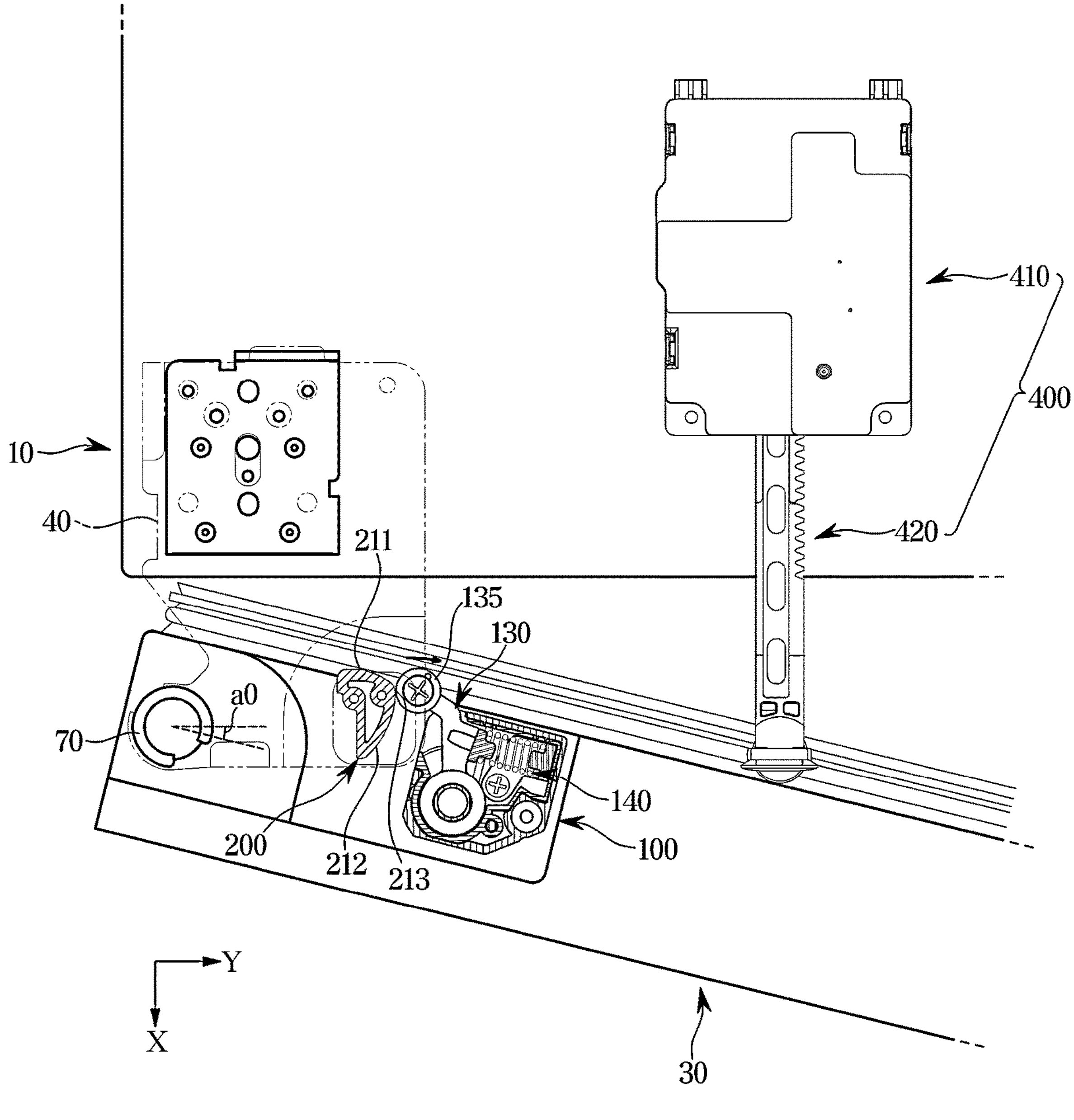
FIG. 19 is a view illustrating a state in which the door pusher presses the door when the roller of the lever is in contact with the curved point of the guide in the refrigerator according to one embodiment of the present disclosure.
Figure 20:
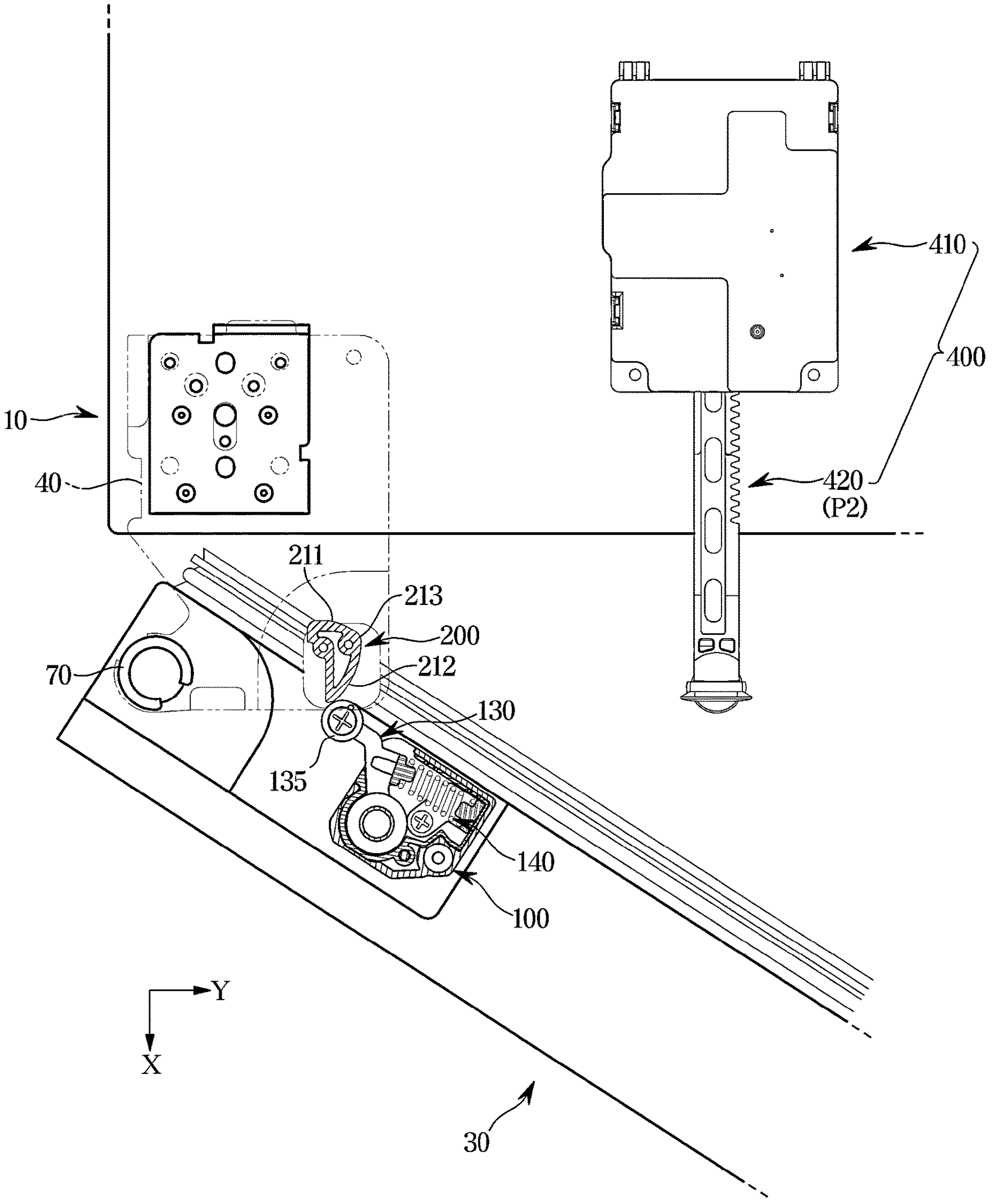
FIG. 20 is a view illustrating a state in which the door pusher in a stopped state when the roller of the lever is in contact with the second contact surface of the guide in the refrigerator according to one embodiment of the present disclosure.

FIG. 18 is a view illustrating a state in which the door pusher presses the door when the roller of the lever is in contact with the first contact surface of the guide in the refrigerator according to one embodiment of the present disclosure. FIG. 19 is a view illustrating a state in which the door pusher presses the door when the roller of the lever is in contact with the curved point of the guide in the refrigerator according to one embodiment of the present disclosure. FIG. 20 is a view illustrating a state in which the door pusher in a stopped state when the roller of the lever is in contact with the second contact surface of the guide in the refrigerator according to one embodiment of the present disclosure.

Referring to FIGS. 18 to 20, the refrigerator 1 according to one embodiment of the present disclosure may include the door opening device 400 configured to open the door 30. Additionally, the refrigerator 1 may include the guide 200 provided to apply a force to the door 30 while the door 30 is being opened or closed. In addition, the refrigerator 1 may include the lever device 100 mounted on the door 30 and provided to apply a force to the door 30 by being in contact with the guide 200 while the door 30 is being opened or closed. Detailed descriptions of each of the above components are the same as described above and are therefore omitted.

As illustrated in FIGS. 18 to 20, as the door pusher 420 of the door opening device 400 presses the door 30 while the door pusher 420 moves from the first pusher position P1 to the second pusher position P2, the door 30 may be opened.

As illustrated in FIG. 18, when the opening angle of the door 30 is less than the reference angle a0 (refer to FIG. 19), the guide 200 may transmit a force to the door 30 in the direction in which the door 30 is closed. Particularly, when the opening angle of the door 30 is less than the reference angle a0, the lever 130 of the lever device 100 may be in contact with the first contact surface 211 of the guide 200, and the lever 130 in contact with the first contact surface 211 of the guide 200 may apply a force to the door 30 in the direction in which the door 30 is closed. While the door 30 is being opened, the lever 130 in contact with the first contact surface 211 may press the spring 140, and the elastic force may be accumulated in the spring 140.

As shown in FIG. 19, when the opening angle of the door 30 is equal to the reference angle a0, the lever 130 may be in contact with the curved point 213 of the guide 200, and the spring 140 may be maximally compressed.

When the opening angle of the door 30 does not exceed the reference angle a0 while the door 30 is being opened, a force in the direction of opening the door 30 may not be applied to the door 30. Particularly, when the opening angle of the door 30 does not exceed the reference angle a0, the lever 130 may move only before the lever 130 comes into contact with the second contact surface 212 of the guide 200, and thus the elastic force accumulated in the spring 140 may not be applied to the door 30 in the direction of opening the door 30. When the rotation of the door 30 stops in the state in which the lever 130 is in contact with the first contact surface 211 of the guide 200, the elastic force accumulated in the spring 140 may be applied to the door 30 in the direction of closing the door 30.

When the door pusher 420 of the door opening device 400 includes a structure in which the opening angle of the door 30 is less than the reference angle a0 even when the door pusher 420 moves to the second pusher position P2 in which the door 30 is maximally pressed, the door 30 may not be opened and may instead be closed.

Therefore, the door pusher 420 may be configured to press the door 30 until the door 30 reaches a position, in which the door 30 is rotated from the closed position to the first direction by an angle greater than or equal to the reference angle a0. In other words, when the door pusher 420 is located at the second pusher position P2, the opening angle of the door 30 may be greater than or equal to the reference angle a0.

As illustrated in FIG. 20, when the opening angle of the door 30 is greater than the reference angle a0 as the door pusher 420 presses the door 30, the guide 200 may apply a force to the door 30 in the direction in which the door 30 is opened. Particularly, when the door 30 is in a position rotated by an angle greater than the reference angle a0 from the closed position as the door pusher 420 presses the door 30, the lever 130 of the lever device 100 may be in contact with the second contact surface 212 of the guide 200, and the elastic force accumulated in the spring 140 may be applied to the door 30. At this time, the elastic force transmitted to the door 30 may open the door 30. Therefore, when the door pusher 420 moves to the second pusher position P2 and presses the door 30 until the opening angle of the door 30 is greater than the reference angle a0, the opening angle of the door 30 may continue to increase although the door pusher 420 stops at the second pusher position P2.

In addition, even when the door pusher 420 presses the door 30 only until the opening angle of the door 30 is equal to the reference angle a0, the opening angle of the door 30 rotating in the first direction may increase slightly due to the inertia of the door 30 even after the operation of the door pusher 420 stops. As a result, the door 30 may move to a position in which the door 30 is rotated by an angle greater than the reference angle a0, and the guide 200 may transmit a force to the door 30 in the direction in which the door 30 is opened.

The reference angle a0 of the door 30 may vary according to the shape of the guide surface 210. The second pusher position P2 of the door pusher 420 may vary according to the reference angle a0, the width of the door 30, and the distance in the horizontal direction (Y) between the point, at with the door pusher 420 presses the door 30, and the rotation axis of the door 30. In other words, the moving distance of the door pusher 420 or the withdrawal distance of the door pusher 420 may vary according to the reference angle a0, the width of the door 30, and the distance in the horizontal direction (Y) between the point, at with the door pusher 420 presses the door 30, and the rotation axis of the door 30.

When the door pusher 420 is located at the second pusher position P2, the guide 200 may be provided to apply a force to the door 30 in the direction in which the door 30 is opened. In other words, the door pusher 420 may press the door 30 while the door pusher 420 moves from the first pusher position P1 until the guide 200 transmits a force to the door 30 in the direction in which the door 30 is opened.

When the door pusher 420 is located at the second pusher position P2, the lever 130 may be provided to be in contact with the second contact surface 212 of the guide 200. In other words, the door pusher 420 may be provided to press the door 30 until the lever 130 is in contact with the second contact surface 212 of the guide 200.

The door pusher 420 may press the door 30 until the lever 130 in contact with the first contact surface 211 of the guide 200 passes the curved point 213 and reaches the second contact surface 212.

The door pusher 420 may be configured to move from a position corresponding to where the lever 130 is in contact with the first contact surface 211 to a position corresponding to where the lever 130 is in contact with the second contact surface 212.

When the door pusher 420 is located at the second pusher position P2, the lever 130 may apply a force to the door 30 in the direction in which the door 30 is opened. In other words, the door pusher 420 may be provided to press the door 30 until the lever 130 applies a force to the door 30 in the direction in which the door 30 is opened.

When the door pusher 420 is located at the second pusher position P2, the spring 140 may provide the accumulated elastic force to the door 30 in the direction in which the door 30 is opened. In other words, the door pusher 420 may be provided to press the door 30 until the spring 140 applies the accumulated elastic force to the door 30 in the direction in which the door 30 is opened.

When the door pusher 420 is located in the second pusher position P2, the lever 130 may be in contact with a point between the first point 212*a* (refer to FIG. 17) and the second point 212*b* (refer to FIG. 17) on the second contact surface 212. In other words, the door pusher 420 may be configured to press the door 30 until the lever 130 reaches a point between the first point 212*a* and the second point 212*b* on the second contact surface 212. While the door 30 is being opened, the door pusher 420 may be configured to press the door 30 until the lever 130 reaches a point between the first point 212*a* and the second point 212*b* on the second contact surface 212.

Even when the door pusher 420 presses the door 30 only until the lever 130 reaches a point between the first point 212*a* (refer to FIG. 17) and the second point 212*b* (refer to FIG. 17) on the second contact surface 212 of the guide 200, the lever 130 may move along the second contact surface 212 and continuously apply a force to the door 30 in the direction in which the door 30 is opened.

When an opening angle of the door 30 in the state in which the door pusher 420 is located in the second pusher position P2 is defined as a first opening guide angle, the door pusher 420 may press the door 30 until the door 30 reaches a position in which the door 30 is rotated from the closed position to the open position by the first opening guide angle. The door opening device 400 may open the door 30 until the opening angle of the door 30 reaches the first opening guide angle. The first opening guide angle may be an angle greater than or equal to the reference angle a0.

When the opening angle of the door 30 is in a range between the first opening guide angle and a second opening guide angle (the second opening guide angle is greater than the first opening guide angle), the guide 200 may be provided to apply a force to the door 30 in the direction in which the door 30 is opened. The second opening guide angle may mean an opening angle of the door 30 when the lever 130 is in contact with the second point 212*b* (refer to FIG. 17) of the second contact surface 212.

When the opening angle of the door 30 is greater than the second opening guide angle, the door 30 may no longer receive a force from the guide 200. Particularly, when the opening angle of the door 30 is greater than the second opening guide angle, the lever 130 may pass the second point 212*b* (refer to FIG. 17) and be separated from the guide 200. Accordingly, the lever 130 may no longer be in contact with the guide 200. Even in this case, the door 30 in the opening process may continue to be opened due to the inertia. Accordingly, the door 30 may be completely opened even without the application of the additional external force.

With this structure, the door 30 may be opened automatically and may easily rotate to the fully opened position without stopping in the opening process.

Figure 21:
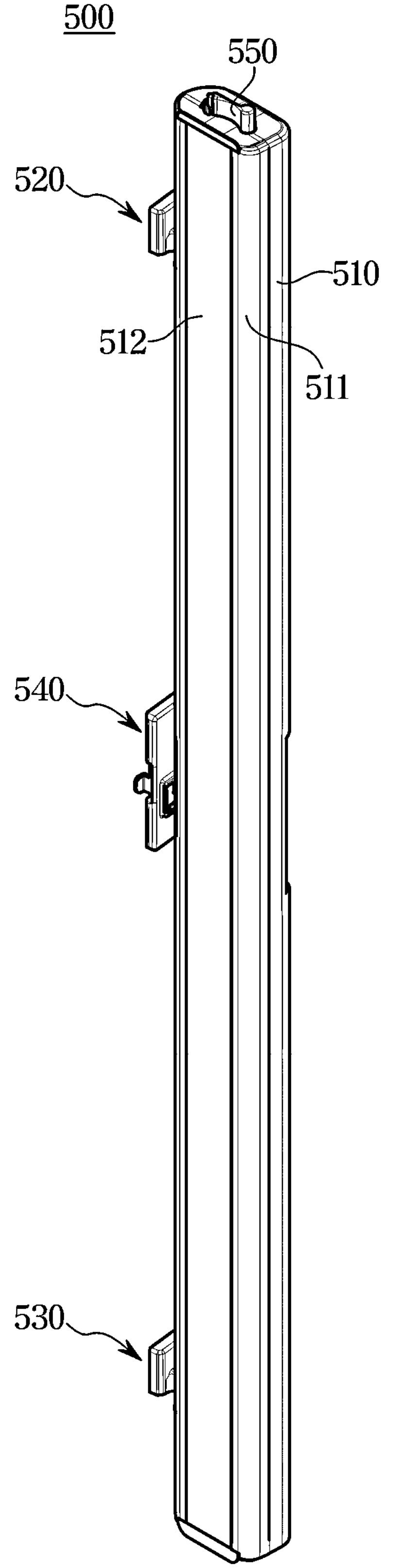
FIG. 21 is a view illustrating a rotation bar of the refrigerator according to one embodiment of the present disclosure.
Figure 22:
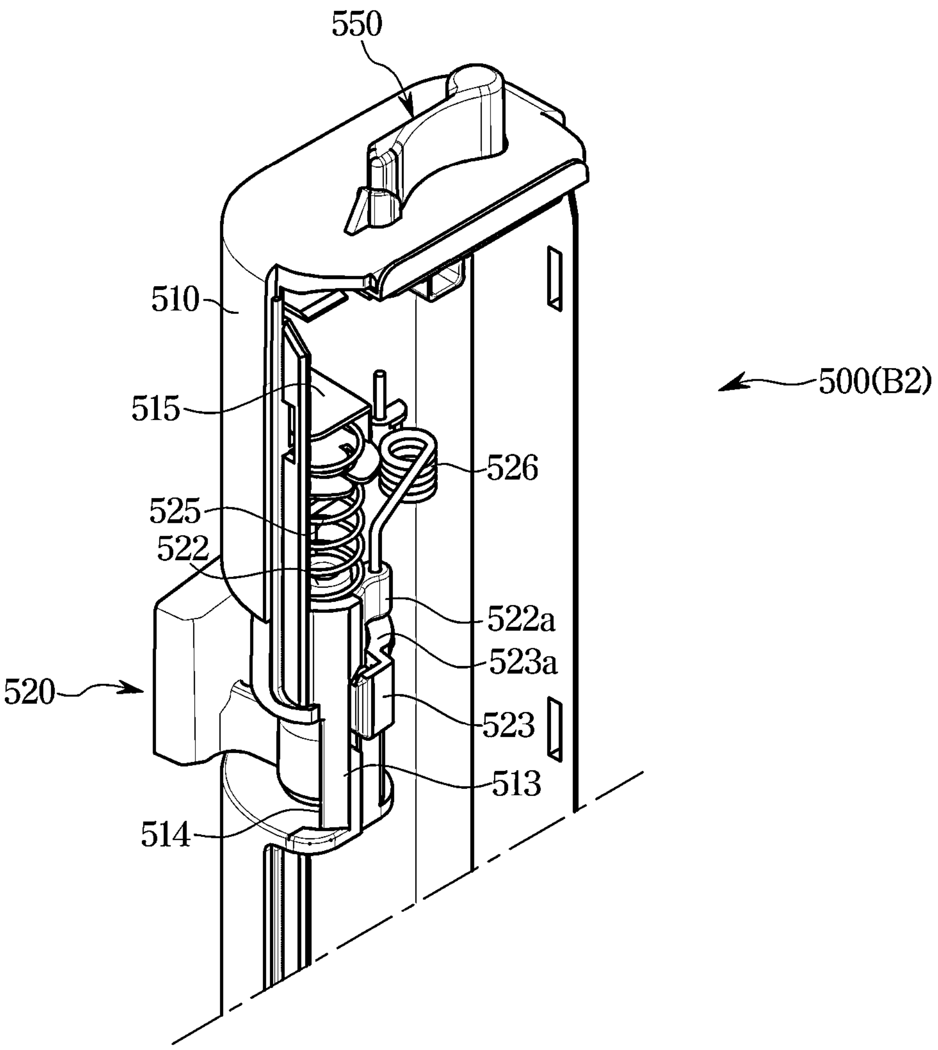
FIG. 22 is an enlarged view illustrating a partial configuration of the rotation bar when the door is at an open position in the refrigerator according to one embodiment of the present disclosure.
Figure 23:
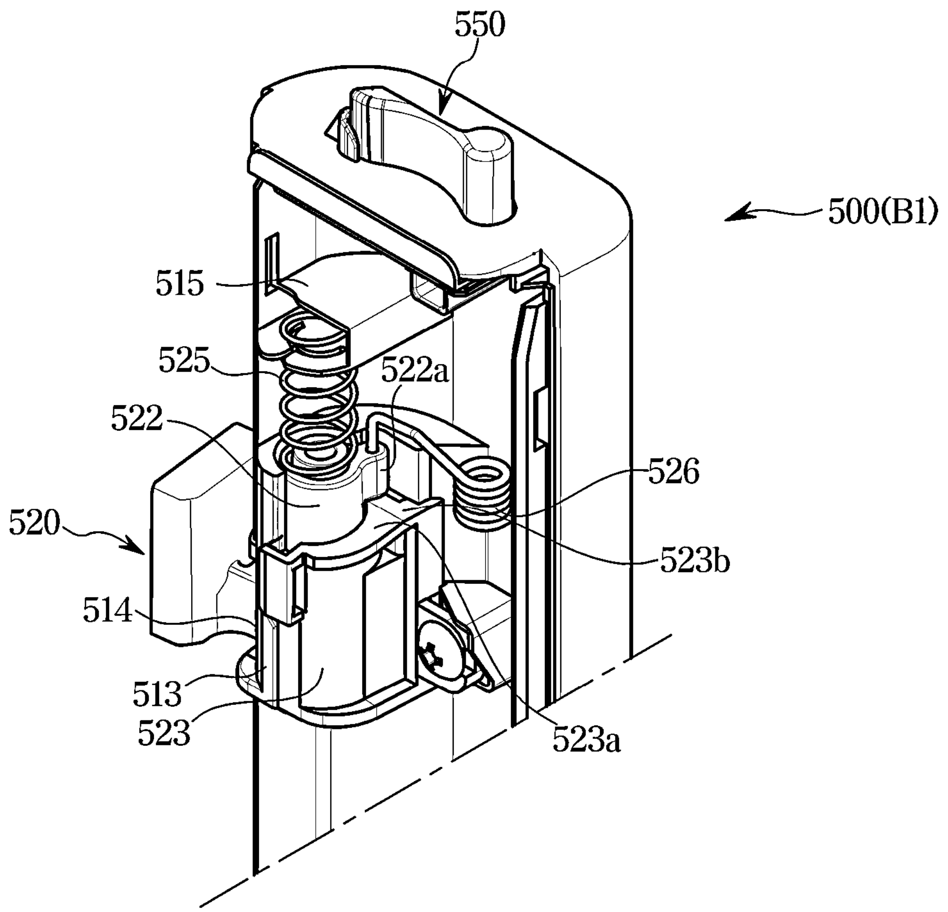
FIG. 23 is an enlarged view illustrating a partial configuration of the rotation bar when the door is at the closed position in the refrigerator according to one embodiment of the present disclosure.

FIG. 21 is a view illustrating a rotation bar of the refrigerator according to one embodiment of the present disclosure. FIG. 22 is an enlarged view illustrating a partial configuration of the rotation bar when the door is at an open position in the refrigerator according to one embodiment of the present disclosure. FIG. 23 is an enlarged view illustrating a partial configuration of the rotation bar when the door is at the closed position in the refrigerator according to one embodiment of the present disclosure.

Referring to FIGS. 21 to 23, the refrigerator 1 according to one embodiment of the present disclosure may include a rotation bar 500.

As illustrated in FIG. 1, the refrigerator 1 may include the first door 30A and the second door 30B arranged side by side with each other. The first door 30A and the second door 30B may be configured to open and close a single first storage compartment 21. The rotation bar 500 may be provided to cover a gap between the first door 30A and the second door 30B when the first door 30A and the second door 30B close the first storage compartment 21. The rotation bar 500 may be rotatably coupled to the first door 30A. The rotation bar 500 may be formed in the shape of a bar that is elongated along the height direction (Z) of the first door 30A.

As illustrated FIG. 1, the refrigerator 1 may include a rotation guide 80 provided to guide the movement of the rotation bar 500. The rotation guide 80 may be provided to guide the movement of the rotation bar 500 when the first door 30A rotates between the open position and the closed position. The rotation guide 80 may include a groove structure into which a portion of the rotation bar 500 is inserted and moved. The rotation guide 80 may be mounted on the main body 10. Particularly, the rotation guide 80 may be mounted on the upper portion of the inner case 11.

The rotation bar 500 may be configured to be rotatable between a first bar position B1 (refer to FIGS. 23 and 24) with respect to the first door 30A and a second bar position B2 (refer to FIGS. 22 and 26) with respect to the first door 30A. The first bar position B1 of the rotation bar 500 is a position corresponding to the position of the rotation bar 500 with respect to the first door 30A when the first door 30A is located in the closed position, and the second bar position B2 of the rotation bar 500 is a position corresponding to the position of the rotation bar 500 with respect to the first door 30A when the first door 30A is located in the open position.

Figure 26:
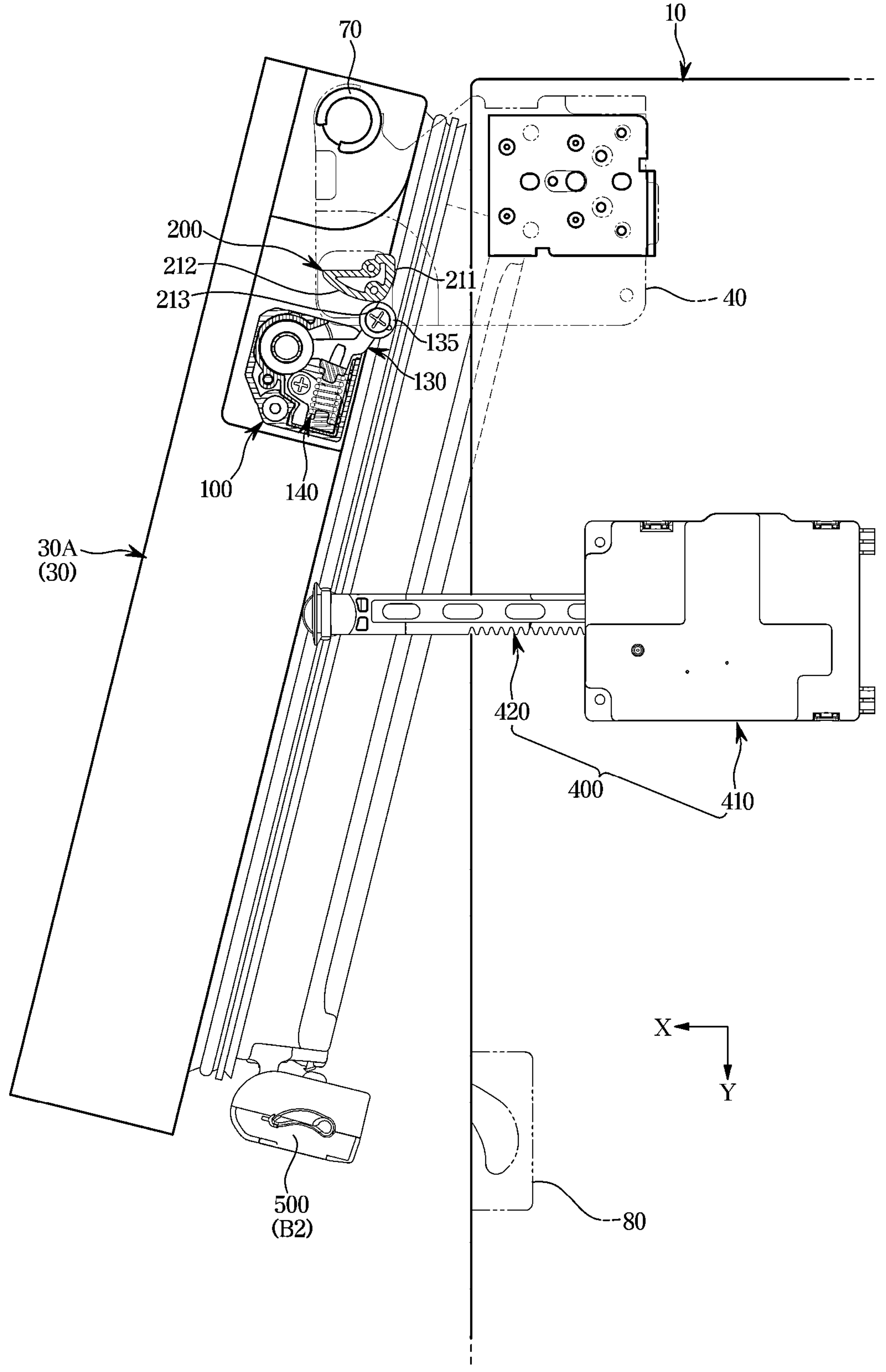
FIG. 26 is a view illustrating the lever and the door pusher when the rotation bar is at the second bar position in the refrigerator according to one embodiment of the present disclosure.

In other words, when the first door 30A is in the closed position, the rotation bar 500 may be located in the first bar position B1 (refer to FIGS. 23 and 24), and while the first door 30A is being opened, the rotation bar 500 may be guided by the rotation guide 80 (refer to FIG. 24) and rotate to the second bar position B2 (refer to FIGS. 22 and 26). When the first door 30A is in the open position, the rotation bar 500 may be located in the second bar position B2, and while the first door 30A is being closed, the rotation bar 500 may be guided by the rotation guide 80 and rotate to the first bar position B1.

For example, the rotation bar 500 may be arranged approximately parallel to the first door 30A when the rotation bar 500 is in the first bar position B1. For example, the rotation bar 500 may be arranged approximately perpendicular to the first door 30A when the rotation bar 500 is in the second bar position B2.

According to one embodiment, with respect to a certain position (hereinafter referred to as a 'reference position') located between the first bar position B1 (refer to FIGS. 23 and 24) and the second bar position B2 (refer to FIGS. 22 and 26) with respect to the first door 30A, the rotation bar 500 may be biased to rotate to the first bar position B1 when the rotation bar 500 is located closer to the first bar position B1 than the reference position. Conversely, the rotation bar 500 may be biased to rotate to the second bar position B2 when the rotation bar 500 is located closer to the second bar position B2 than the reference position with respect to the first door 30A.

Hereinafter the structure of the rotation bar 500 will be described with reference to FIGS. 21 to 23.

Referring to FIGS. 21 to 23, the rotation bar 500 may include a bar case 510 including one open surface, bar covers 511 and 512 provided to cover the open surface of the bar case 510, bar hinge members 520, 530 and 540 provided to rotatably support the bar case 510 and the bar covers 511 and 512 with respect to the first door 30A, and a guide protrusion 550.

The guide protrusion 550 may be provided to be inserted into a groove formed in the rotation guide 80. The rotation of the rotation bar 500 may be guided as the guide protrusion 550 moves along the rotation guide 80.

For example, the rotation bar 500 may include an upper bar hinge member 520, a lower bar hinge member 530, and a middle bar hinge member 540. The upper bar hinge member 520, the lower bar hinge member 530, and the middle bar hinge member 540 may each be fixed to the first door 30A.

The bar case 510 may form an exterior of the rotation bar 500. An insulating material (not shown) may be accommodated inside the bar case 510. One open surface of the bar case 510 may be covered by the first bar cover 511 and the second bar cover 512.

The bar case 510 may include a bar hinge accommodating portion 513 to which the upper bar hinge member 520 is coupled. As the upper bar hinge member 520 is accommodated in the bar hinge accommodating portion 513, the rotation bar 500 may be rotatably supported on the first door 30A. Particularly, the bar case 510 may rotate relative to the first door 30A with respect to the bar hinge members 520, 530, and 540.

The bar case 510 may include a bar hinge opening 514 provided to be penetrated by the upper bar hinge member 520. The bar hinge opening 514 may be provided on one side of the bar hinge accommodating portion 513.

The bar case 510 may include a support portion 515 supported by a compression spring 525, which will be described later. The support portion 515 may be connected to an upper end of the compression spring 525.

The upper bar hinge member 520 may include a bar hinge shaft 522. The bar hinge shaft 522 may rotatably support the bar case 510. The bar case 510 may rotate about the bar hinge shaft 522. Additionally, the bar case 510 may slide in the vertical direction with respect to the bar hinge shaft 522.

The bar hinge shaft 522 may include a protrusion 522*a* that protrudes in a radial direction with respect to a rotation axis of the bar case 510. The protrusion 522*a* may slide on an inclined portion 523*a* and/or a horizontal portion 523*b* of a bar hinge cover portion 523 which will be described later. A lower surface of the protrusion 522*a* may be in contact with an upper surface of the inclined portion 523*a* and/or the horizontal portion 523*b*.

The rotation bar 500 may include the bar hinge cover portion 523 to cover the bar hinge shaft 522 accommodated in the bar hinge accommodating portion 513. The bar hinge cover portion 523 may be coupled to the bar case 510.

Together with the bar hinge accommodating portion 513 of the bar case 510, the bar hinge cover portion 523 may rotatably and slidably support the bar hinge shaft 522. Together with the bar hinge accommodating portion 513, the bar hinge cover portion 523 may form a coupling hole having a size corresponding to the size and/or shape of the bar hinge shaft 522.

The bar hinge cover position 523 may include the inclined portion 523*a* formed on an upper surface thereof. The inclined portion 523*a* may be inclined downward toward the front when the first door 30A is in the closed position and the rotation bar 500 is in the first bar position B1. The inclined portion 523*a* may be inclined downward along a direction in which the rotation bar 500 rotates from the second bar position B2 to the first bar position B1. When the rotation bar 500 rotates from the second bar position B2 to the first bar position B1, the inclined portion 523*a* may be pressed by the protrusion 522*a* of the upper bar hinge member 520 to lower a height in the Z-direction.

The bar hinge cover portion 523 may include the horizontal portion 523*b* that is formed to be substantially flat. The horizontal portion 523*b* may be connected to the inclined portion 523*a*. The horizontal portion 523*b* may be connected to an upper end of the inclined portion 523*a*. The horizontal portion 523*b* may extend from the upper end of the inclined portion 523*a* to a direction in which the rotation bar 500 rotates from the first bar position B1 to the second bar position B2.

The rotation bar 500 may include the compression spring 525. The compression spring 525 may support the bar case 510 and the bar covers 511 and 512 of the rotation bar 500. One end of the compression spring 525 may be fixed to the support portion 515 of the bar case 510, and the other end opposite to the one end may be fixed to the bar hinge shaft 522. The compression spring 525 may be compressed or stretched between the support portion 515 and the bar hinge shaft 522. For example, the compression spring 525 may include a compression spring.

When the bar case 510 rotates, the bar hinge cover portion 523 fixed to the bar case 510 may also rotate in the same direction as the bar case 510. Accordingly, a portion of the upper surface of the bar hinge cover portion 523 in contact with the protrusion 522*a* may also vary. In addition, an extent to which the compression spring 525 is compressed may also vary.

For example, when the rotation bar 500 rotates from the second bar position B2 to the first bar position B1, the protrusion 522*a*, which presses a lower portion of the inclined portion 523*a*, may press an upper portion of the inclined portion 523*a* as the bar hinge coupling portion 523 rotates with respect to the protrusion 522*a*. Accordingly, a height of the bar case 510 may descend. In other words, because the height of the protrusion 522*a* is fixed, the bar case 510 may descend along the protrusion 522*a* by the inclined portion 523*a*.

When the rotation bar 500 is located in the first bar position B1, the protrusion 522*a* may be disposed on the horizontal portion 523*b*. The horizontal portion 523*b* may be formed horizontally to stop the descent of the rotation bar 500.

Conversely, when the rotation bar 500 rotates from the first bar position B1 to the second bar position B2, the protrusion 522*a*, which presses the upper portion of the inclined portion 523*a*, may press the lower portion of the inclined portion 523*a* as the bar hinge coupling portion 523 rotates with respect to the protrusion 522*a*. Accordingly, the height of the bar case 510 may rise. In other words, because the height of the protrusion 522*a* is fixed, the bar case 510 may rise along the protrusion 522*a* by the inclined portion 523*a*.

The compression spring 525 may be compressed more when the rotation bar 500 is in the first bar position B1 than when the rotation bar 500 is in the second bar position B2. The compression spring 525 may press the bar hinge shaft 522 to allow the protrusion 522*a* of the bar hinge shaft 522 to come into close contact with the inclined portion 523*a* or the horizontal portion 523*b* of the bar hinge cover portion 523.

The rotation bar 500 may include a torsion spring 526. One end of the torsion spring 526 may be connected to the upper bar hinge member 520 and the other end thereof may be connected to the bar case 510. The torsion spring 526 may provide an elastic force to the rotation bar 500 to allow the rotation bar 500 to rotate smoothly. Particularly, the torsion spring 526 may be elastically biased to apply an elastic force to the bar case 510 in a direction in which the rotation bar 500 rotates to the first bar position B1.

As illustrated in FIG. 23, when the rotation bar 500 is located in the first bar position B1 with respect to the first door 30A, the protrusion 522*a* may be in contact with the horizontal portion 523*b*. While the rotation bar 500 is rotated by a predetermined angle from the first bar position B1 to the second bar position B2, the protrusion 522*a* may slide on the horizontal portion 523*b*. While the protrusion 522*a* is located on the horizontal portion 523*b*, the elastic force generated by the compression spring 525 may be maintained almost constant. Therefore, while the protrusion 522*a* is located on the horizontal portion 523*b*, only the elastic force caused by the torsion spring 526 may be applied to the bar case 510, and the rotation bar 500 may be biased in a direction of rotating toward the first bar position B1, by the torsion spring 526.

When the rotation bar 500 further rotates and is positioned at a position rotated by an angle greater than a predetermined angle from the first bar position B1 toward the second bar position B2, the protrusion 522*a* may be in contact with the inclined portion 523*a*, as shown in FIG. 22. When the protrusion 522*a* enters the inclined portion 523*a*, the elastic force caused by the compression spring 525 may be transmitted to the bar case 510. When the elastic force caused by the compression spring 525 is transmitted to the bar case 510, the inclined portion 523*a* fixed to the bar case 510 may rise along the protrusion 522*a*, and thus the rotation bar 500 may be biased in a direction of rotating toward the second bar position B2. The compression spring 525 may be configured to have sufficient elastic force to allow the rotation bar 500 to rotate to the second bar position B2 despite of the elastic force of the torsion spring 526.

As the rotation bar 500 include the above-mentioned structure, when the rotation bar 500 is rotated by an angle less than the predetermined angle from the first bar position B1 toward the second bar position B2 with respect to the first door 30A, the rotation bar 500 may be biased to rotate toward the first bar position B1. Conversely, when the rotation bar 500 is rotated by an angle greater than or equal to the predetermined angle from the first bar position B1 to the second bar position B2 with respect to the first door 30A, the rotation bar 500 may be biased to rotate toward the second bar position B2. 'Predetermined angle' means that the minimum angle at which the rotation bar 500 rotates from the first bar position B1 to the second bar position B2 when the rotation bar 500 is biased to rotate towards the second bar position B2.

The above-mentioned structure in which the rotation bar 500 rotates with respect to the upper bar hinge member 520 may be applied to the structure in which the rotation bar 500 rotates with respect to the lower bar hinge member 530 or the middle bar hinge member 540. A detailed description thereof is omitted.

Figure 24:
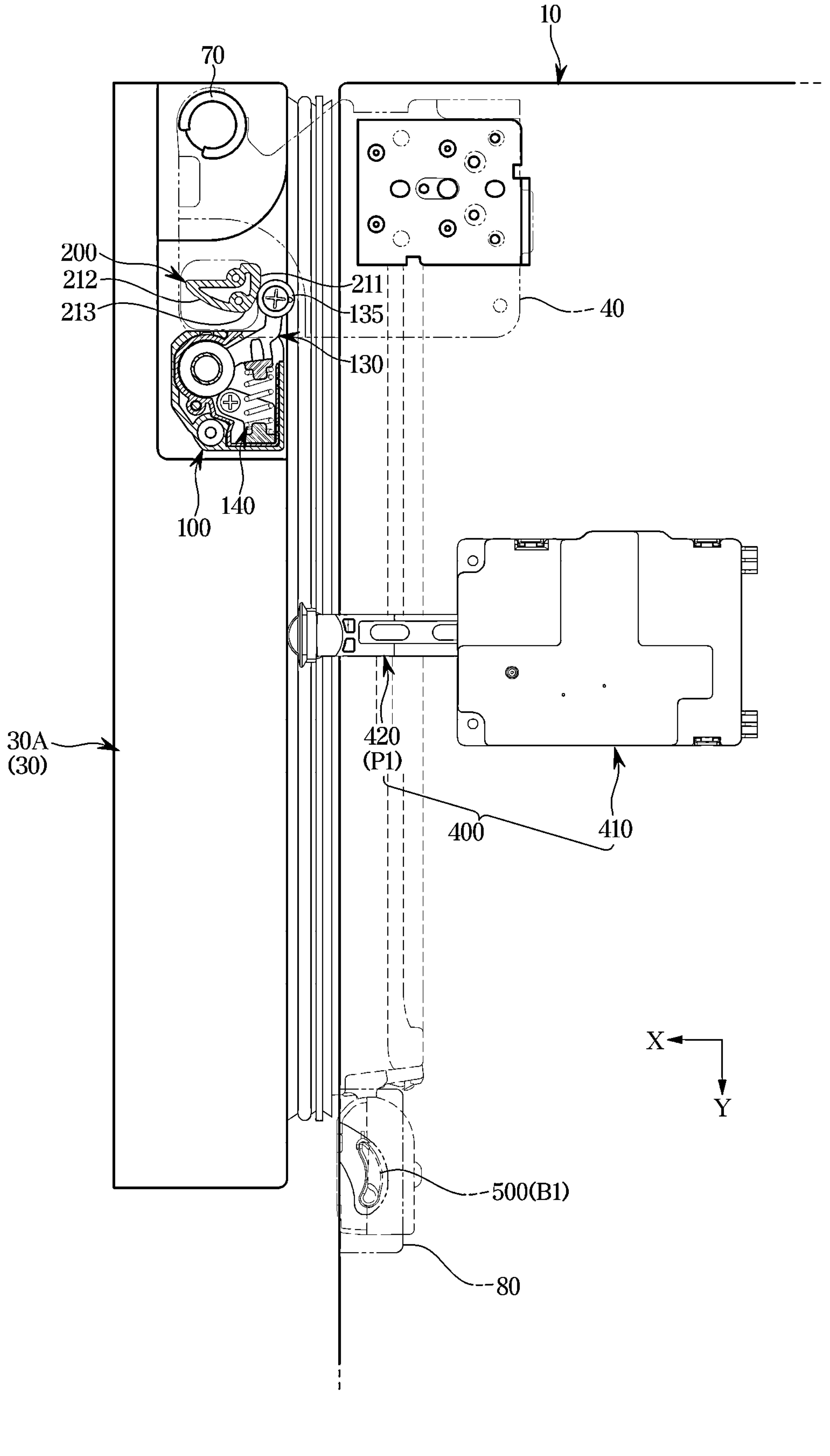
FIG. 24 is a view illustrating the lever and the door pusher when the rotation bar is at a first bar position in the refrigerator according to one embodiment of the present disclosure.
Figure 25:
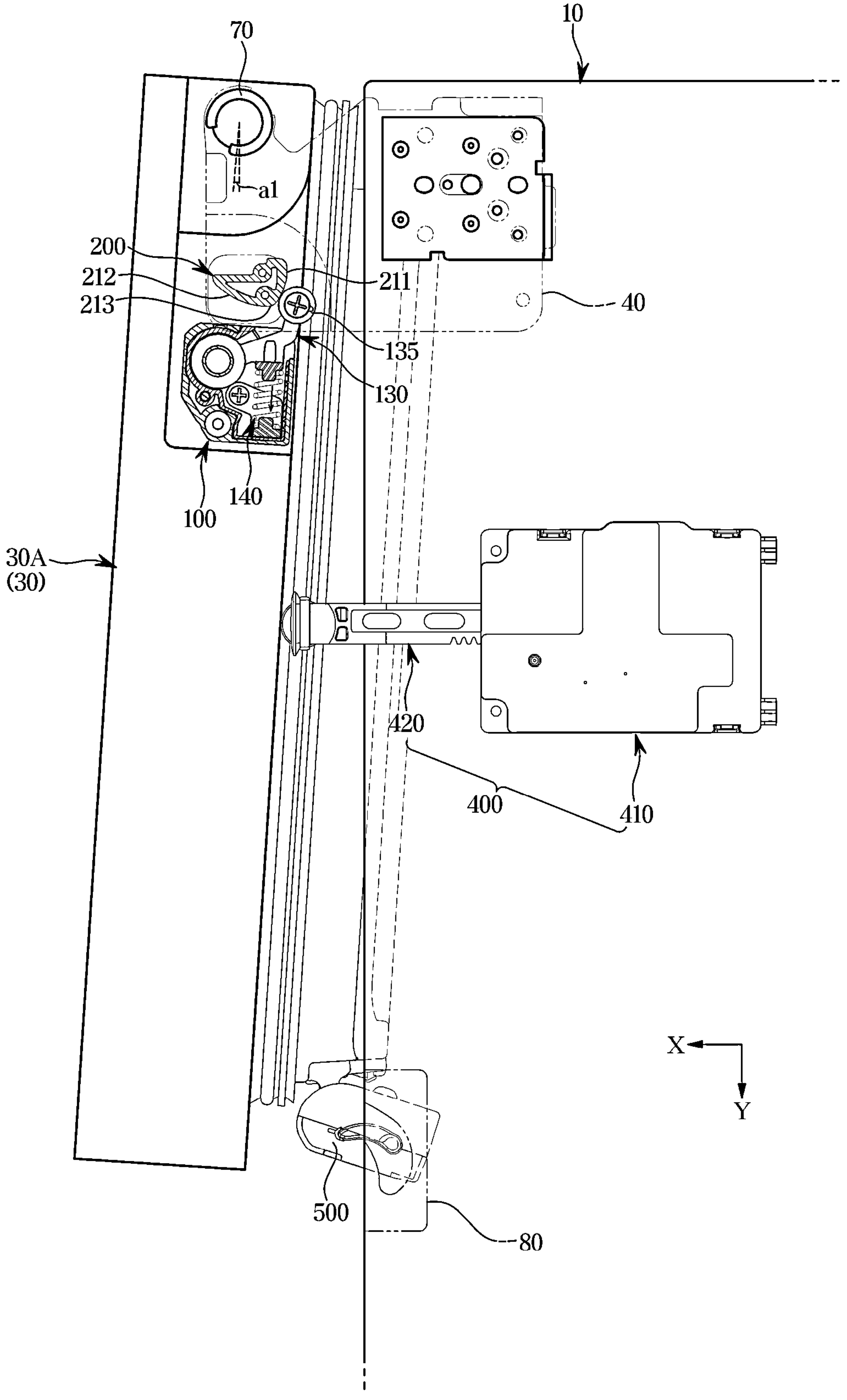
FIG. 25 is a view illustrating the lever and the door pusher when the rotation bar is rotated by a predetermined angle from the first bar position to a second bar position in the refrigerator according to one embodiment of the present disclosure.

FIG. 24 is a view illustrating the lever and the door pusher when the rotation bar is at a first bar position in the refrigerator according to one embodiment of the present disclosure. FIG. 25 is a view illustrating the lever and the door pusher when the rotation bar is rotated by a predetermined angle from the first bar position to a second bar position in the refrigerator according to one embodiment of the present disclosure. FIG. 26 is a view illustrating the lever and the door pusher when the rotation bar is at the second bar position in the refrigerator according to one embodiment of the present disclosure.

Referring to FIGS. 24 to 26, in the refrigerator 1 according to one embodiment of the present disclosure, while the first door 30A is being opened by the operation of the door opening device 400, the guide 200, the lever device 100, etc., the rotation bar 500 coupled to the first door 30A may rotate from the first bar position B1 toward the second bar position B2.

The rotation bar 500 may be biased to rotate toward the second bar position B2 when the rotation bar 500 is located in a position rotated by the predetermined angle or more from the first bar position B1 toward the second bar position B2 while the rotation bar 500 moves within the rotation guide 80. Conversely, when the rotation bar 500 is located in a position rotated by an angle less than the predetermined angle from the first bar position B1 toward the second bar position B2 while the rotation bar 500 moves the rotation guide 80, the rotation bar 500 may be biased to rotate toward the first bar position B1. The direction in which the rotation of the rotation bar 500 is biased may vary according to the structure of the rotation bar 500, the frictional force that the rotation bar 500 receives from the rotation guide 80, etc.

For example, as shown in FIG. 25, when the opening angle of the first door 30A is an angle a1 (hereinafter referred to as 'first opening angle a1'), the rotation bar 500 may be positioned in a reference position in which the rotation direction of the rotation bar 500 is biased toward the first bar position B1 or biased toward the second bar position B2.

When the first door 30A is rotated from the closed position by an angle less than the first opening angle a1, the lever 130 may be in contact with the first contact surface 211 of the guide 200. At this time, the rotation bar 500 may be biased to rotate toward the first bar position B1.

When the first door 30A is rotated from the closed position by an angle that is greater than or equal to the first opening angle but less than a second opening angle greater than the first opening angle (the second opening angle is the same as the reference angle a0 (refer to FIG. 19), the rotation bar 500 may be biased to rotate toward the second bar position B2. At this time, the lever 130 may still be in contact with the first contact surface 211 of the guide 200.

When the first door 30A is rotated from the closed position by the second opening angle a0 or more, the rotation bar 500 may be biased to rotate toward the second bar position B2. At this time, the lever 130 may be in contact with the second contact surface 212.

When the opening angle of the first door 30A is less than the first opening angle a1, the rotation bar 500 may be biased to rotate toward the first bar position B1 and thus a force may be applied to the first door 30A in the direction, in which the first door 30A is closed, by the rotation bar 500. Conversely, when the opening angle of the first door 30A is greater than or equal to the first opening angle a1, the rotation bar 500 may be biased to rotate toward the second bar position B2 and thus a force may be applied to the first door 30A in the direction, in which the first door 30A is opened, by the rotation bar 500.

Therefore, in order to open the first door 30A more efficiently, the door opening device 400 may be configured to press the first door 30A until the first door 30A is rotated by at least the first opening angle a1. The door pusher 420 may be configured to press the first door 30A until the opening angle of the first door 30A is greater than or equal to the first opening angle a1. The door pusher 420 may be configured to press the first door 30A to allow the rotation bar 500 to rotate from the first bar position B1 toward the second bar position B2 by the predetermined angle or more (a reference angle for determining a direction in which the rotation of the rotation bar 500 is biased). When the rotation bar 500 is rotated by the predetermined angle from the first bar position B1, the opening angle of the first door 30A may be the first opening angle a1. That is, when the door pusher 420 is located at the second pusher position P2, the first door 30A may be located at a position rotated from the closed position by the first opening angle a1 or more, and the rotation bar 500 may be located at a position rotated from the first bar position B1 by the predetermined angle or more with respect to the first door 30A.

With this structure, even when the door pusher 420 reaches the second pusher position P2 and no longer presses the rotation bar 500, the force may be applied to the first door 30A in the direction in which the first door 30A is opened, by the rotation bar 500.

When the first door 30A is rotated by the first opening angle a1 or more while the first door 30A is being opened, the force may be applied to the first door 30A in the direction in which the first door 30A is opened, by the rotation bar 500 although the lever 130 is in contact with the first contact surface 211 of the guide 200. Accordingly, the door pusher 420 may open the first door 30A more efficiently.

Additionally, when the lever 130 is in contact with the second contact surface 212 of the guide 200 while the first door 30A is being opened, the rotation bar 500 may be already rotated by the predetermined angle or more and biased to rotate to the second bar position B2. Accordingly, the force may be applied to the first door 30A in the direction in which the first door 30A is opened, by the rotation bar 500. Accordingly, the first door 30A may be opened more efficiently.

Alternatively, the opening angle a1 of the first door 30A, which is a reference for the rotation bar 500 to be biased to rotate to the first bar position B1 or for the rotation bar 500 to be biased to rotate to the second bar position B2, may be approximately equal to the reference angle a0 (refer to FIG. 19). In this case, when the opening angle of the first door 30A is less than the reference angle a0, the rotation bar 500 may be biased to rotate toward the first bar position B1, and the force may be applied to the first door 30A in the direction in which the first door 30A is closed, by the rotation bar 500. When the opening angle of the first door 30A is greater than the reference angle a0, the rotation bar 500 may be biased to rotate toward the second bar position B2, and the force may be applied to the first door 30A in the direction in which the first door 30A is opened, by the rotation bar 500. Accordingly, after the door pusher 420 presses the first door 30A until the first door 30A reaches a position rotated from the closed position by the reference angle a0 or more, the force may be applied to the first door 30A in the direction in which the first door 30A is opened, by each of the second contact surface 212 of the guide 200 and the rotation bar 500.

Alternatively, the opening angle a1 of the first door 30A, which is a reference for the rotation bar 500 to be biased to rotate to the first bar position B1 or for the rotation bar 500 to be biased to rotate to the second bar position B2, may be greater than the reference angle a0 (refer to FIG. 20). In this case, the door pusher 420 may be configured to press the door 30 until the door 30 reaches a position rotated from the closed position by an angle greater than the reference angle a0 as well as the angle a1, or by an angle that is at least equal to the angle a1. Accordingly, after the door pusher 420 presses the first door 30A until the first door 30A reaches a position rotated from the closed position by the angle a1 or more, the force may be applied to the first door 30A in the direction in which the first door 30A is opened, by each of the second contact surface 212 of the guide 200 and the rotation bar 500.

The refrigerator according to one embodiment of the present disclosure may include the main body forming the storage compartment, the door configured to be rotatable so as to open and close the storage compartment, the lever mounted on the door and configured to be movable with respect to the door, the guide provided to be in contact with the lever so as to guide movement of the lever in response to the door being rotated to open or close the storage compartment, and the door pusher configured to press the door so as to open the door. The guide may include the first contact surface provided to, in response to contact with the lever, allow the lever to apply a force to the door in a direction of closing the door, and the second contact surface provided to, in response to contact with the lever, allow the lever to apply a force to the door in a direction of opening the door. The door pusher may be configured to press the door until the lever is in contact with the second contact surface.

The angle, in which the door is rotated from a position of closing the storage compartment in response to the lever being in contact with the second contact surface, may be greater than the angle in which the door is rotated from the position of closing the storage compartment in response to the lever being in contact with the first contact surface.

The guide may further include the curved point disposed between the first contact surface and the second contact surface. The lever may be provided to be sequentially in contact with the first contact surface, the curved point, and the second contact surface, in response to the door being opened. The lever may be provided to be sequentially in contact with the second contact surface, the curved point, and the first contact surface, in response to the door being closed.

The refrigerator may further include the spring connected to the lever and provided to be compressed or stretched in response to the lever moving with respect to the door. The spring may be provided to maximally accumulate an elastic force in response to the lever being in contact with the curved point. The spring may be provided to be compressed by the lever in response to the lever moving toward the curved point along the first contact surface by being in contact with the first contact surface. The spring may be provided to apply an elastic force, which is in a direction of opening the door, to the door in response to the lever moving away from the curved point along the second contact surface by being in contact with the second contact surface.

The door pusher may be configured to be movable between a first pusher position, which is a position of the door pusher in response to the door being closed, and a second pusher position which moves from the first pusher position to a direction of pressing the door. The lever may be in contact with the second contact surface in response to the door pusher being in the second pusher position.

The door pusher may be configured to move linearly between the first pusher position and the second pusher position.

The door pusher may include a stopper configured to stop the door pusher with respect to the main body in response to the door pusher reaching the second pusher position.

The distance between one end of the door pusher in contact with the door and the stopper may be equal to the distance between the first pusher position and the second pusher position.

The refrigerator may further include the pusher case mounted on the main body and provided to accommodate at least a portion of the door pusher. The door pusher may be configured to be movable with respect to the pusher case. The pusher case may include a case entrance and exit portion through which the door pusher moves and penetrates. The stopper may be provided to be locked to the case entrance and exit portion in response to the door pusher reaching the second pusher position.

The refrigerator may further include the power source configured to transmit power to the door pusher, and the controller electrically connected to the power source. The controller may be configured to control the power source to allow the door pusher to press the door until the lever is in contact with the second contact surface based on a condition for opening the door.

The door pusher may be configured to be movable between the first pusher position, which is a position of the door pusher in response to the door being closed, and the second pusher position which moves from the first pusher position to a direction of pressing the door. The controller may be configured to control the power source to transmit power to the door pusher until the door pusher reaches the second pusher position, based on a condition for opening the door.

The refrigerator may further include the position detection sensor configured to detect a position of the door pusher and electrically connected to the controller. Based on the door pusher reaching the second pusher position, the controller may be configured to control the power source to allow the door pusher to stop or to move to the first pusher position.

The door may be the first door. The refrigerator may further include the second door disposed in parallel with the first door, and the rotation bar rotatably coupled to the first door and provided to cover the gap between the first door and the second door in response to the first door and the second door closing the storage compartment. The rotation bar may be configured to be rotatable between the first bar position with respect to the first door corresponding to a position in response to the first door being closed, and the second bar position with respect to the first door corresponding to a position in response to the first door being opened. In response to the first door being rotated from the position, in which the first door is closed, by an angle less than the first opening angle, the lever may be in contact with the first contact surface and the rotation bar may be biased to rotate to the first bar position. In response to the first door being rotated from the position, in which the first door is closed, by an angle that is greater than or equal to the first opening angle but less than the second opening angle greater than the first opening angle, the lever may be in contact with the first contact surface and the rotation bar may be biased to rotate to the second bar position. The lever may be in contact with the second contact surface in response to the first door being rotated from the position, in which the first door is closed, by the second opening angle.

The refrigerator may further include the hinge bracket provided to connect the main body and the door and provided to rotatably support the door with respect to the main body. The guide may be coupled to the hinge bracket.

The refrigerator according to one embodiment of the present disclosure may include the main body forming the storage compartment, the door configured to be rotatable so as to open and close the storage compartment, provided to be opened while being rotated in the first direction and provided to be closed while being rotated in the second direction, the guide configured to apply a force in a direction of rotating in the second direction to the door in response to the door being rotated from the position, in which the door is closed, to the first direction by an angle less than the reference angle, and configured to apply a force in a direction of rotating in the first direction to the door in response to the door being rotated from the position, in which the door is closed, to the first direction by an angle greater than the reference angle, and the door pusher mounted on the main body and configured to press the door so as to open the door. The door pusher may be configured to press the door until the door is rotated from the position, in which the door is closed, to the first direction by an angle greater than or equal to the reference angle.

The refrigerator may further include the lever mounted on the door. The guide may be fixed to the main body and configured to guide movement of the lever by being in contact with the lever in response to the door being rotated in the first direction or the second direction.

In response to the door being rotated from the position, in which the door is closed, to the first direction by an angle less than the reference angle, the lever may be in contact with the first contact surface so as to apply a force to the door in a direction of rotating in the second direction. In response to the door being rotated from the position, in which the door is closed, to the first direction by an angle greater than the reference angle, the lever may be in contact with the second contact surface so as to apply a force to the door in a direction of rotating in the first direction.

The refrigerator may further include the lever mounted on the door and configured to be movable with respect to the door, and the spring connected to the lever and provided to be compressed or stretched in response to the lever moving with respect to the door. The guide may include the first contact surface provided to, in response to contact with the lever, allow the spring to apply an elastic force to the door in a direction of rotating in the second direction, the second contact surface provided to, in response to contact with the lever, allow the spring to apply an elastic force to the door in a direction of rotating in the first direction, and the curved point disposed between the first contact surface and the second contact surface, and provided to allow the spring to maximally accumulate an elastic force in response to contact with the lever. The lever may be in contact with the curved point or the second contact surface in response to the door being rotated from the position, in which the door is closed, to the first direction by the reference angle.

The refrigerator according to one embodiment of the present disclosure may include the main body forming the storage compartment, the door configured to be rotatable so as to open and close the storage compartment, the lever mounted on the door, the guide provided to be in contact with the lever in response to the door being rotated, and the door pusher configured to be movable between the first pusher position and the second pusher position with respect to the main body and configured to press the door to a direction, in which the door is opened, as the door pusher moves from the first pusher position to the second pusher position. The guide may include the first contact surface provided to apply a force to the lever in a direction, in which the door is closed, in response to contact with the lever, and the second contact surface provided to apply a force to the lever in a direction, in which the door is opened, in response to contact with the lever. The lever may be in contact with the second contact surface in response to the door pusher being in the second pusher position.

As is apparent from the above description, a refrigerator may automatically open a door by including a door opening device including a door pusher.

Further, a refrigerator may include a guide configured to transmit a force to a door so as to guide rotation of the door, and thus the door may be easily opened even when only a small force is applied.

Further, a refrigerator may include a guide configured to transmit a force to a door so as to guide rotation of the door, and thus the door may be easily closed even when only a small force is applied.

Further, a door pusher of a door opening device may press a door until a guide transmits a force to the door in a direction in which the door is opened, and thus the door may be rotated to a position, in which the door is fully opened, without stopping in the opening process.

Additional aspects of the disclosure will be set forth in part in the description which follows and, in part, will be obvious from the description, or may be learned by practice of the disclosure.

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which can be decoded by a computer are stored. For example, there may be a Read Only Memory (ROM), a Random Access Memory (RAM), a magnetic tape, a magnetic disk, a flash memory, and an optical data storage device.

Storage medium readable by machine may be provided in the form of a non-transitory storage medium. "Non-transitory" means that the storage medium is a tangible device and does not contain a signal (e.g., electromagnetic wave), and this term includes a case in which data is semi-permanently stored in a storage medium and a case in which data is temporarily stored in a storage medium. For example, a "non-transitory storage medium" may include a buffer in which data is temporarily stored.

The method according to the various disclosed embodiments may be provided by being included in a computer program product. Computer program products may be traded between sellers and buyers as commodities. Computer program products are distributed in the form of a device-readable storage medium (e.g., compact disc read only memory (CD-ROM)), or are distributed directly or online (e.g., downloaded or uploaded) between two user devices (e.g., smartphones) through an application store (e.g., Play Store™). In the case of online distribution, at least a portion of the computer program product (e.g., downloadable app) may be temporarily stored or created temporarily in a device-readable storage medium such as the manufacturer's server, the application store's server, or the relay server's memory.

While the present disclosure has been particularly described with reference to exemplary embodiments, it should be understood by those of skilled in the art that various changes in form and details may be made without departing from the spirit and scope of the present disclosure.

The invention claimed is:

1. A refrigerator comprising:
a main body including a storage compartment;
a door configured to be rotatable about a first rotational axis so as to open and close the storage compartment;
a lever mounted on the door and configured to be movable with respect to the door;
a spring connected to the lever so as to be compressed and stretched in response to the lever moving with respect to the door, the lever being rotatable about a second rotational axis offset from a compression direction of the spring;
a guide configured to contact the lever so as to guide movement of the lever while the door is being rotated to open and close the storage compartment, wherein the guide has a first contact surface and a second contact surface; and
a door pusher configured to press the door so as to open the storage compartment,
wherein the guide, lever, and door pusher are configured so that:
while the door is rotated to open and close the storage compartment, the lever is moved along, and in contact with, the guide,
while the lever is in contact with the first contact surface of the guide, the lever applies a force to the door in a direction of closing the storage compartment,
while the lever is in contact with the second contact surface of the guide, the lever applies a force to the door in a direction of opening the storage compartment, and
the door pusher is operable to press the door in the direction of opening the storage compartment until the lever is in contact with the second contact surface.

2. The refrigerator of claim 1, wherein
while rotating the door from a position of the storage compartment being closed to a position of the storage compartment being open, an angle by which the door moves while the lever is in contact with the second contact surface is greater than an angle by which the door moves while the lever is in contact with the first contact surface.

3. The refrigerator of claim 1, wherein
the guide includes:
a curved point between the first contact surface and the second contact surface,
while the door is rotated so as to open the storage compartment, the lever is sequentially in contact with the first contact surface, the curved point, and the second contact surface, and
while the door is rotated so as to close the storage compartment, the lever is sequentially in contact with the second contact surface, the curved point, and the first contact surface.

4. The refrigerator of claim 3, wherein
the spring is configured to accumulate a maximum elastic force while the lever is in contact with the curved point,
the spring is configured to be compressed by the lever in response to the lever being moved along the first contact surface toward the curved point, and
the spring is configured to apply an elastic force to the door, in the direction of opening the storage compartment, while the lever is being moved away from the curved point along the second contact surface.

5. The refrigerator of claim 1, wherein
the door pusher is configured to be movable between a first pusher position, which is a position of the door pusher while the storage compartment is closed, and a second pusher position to which the door pusher moves to press the door in the direction of opening the storage compartment, and
the lever is in contact with the second contact surface while the door pusher is in the second pusher position.

6. The refrigerator of claim 5, wherein
the door pusher is configured to move linearly between the first pusher position and the second pusher position.

7. The refrigerator of claim 5, wherein
the door pusher includes a stopper configured to stop the door pusher with respect to the main body when the door pusher reaches the second pusher position.

8. The refrigerator of claim 7, wherein
a distance between the stopper and an end of the door pusher configured to contact the door is equal to a distance the door pusher moves between the first pusher position and the second pusher position.

9. The refrigerator of claim 7, further comprising:
a pusher case mounted on the main body and configured to accommodate at least a portion of the door pusher, wherein the door pusher is configured to be movable with respect to the pusher case, the pusher case includes a case entrance and exit portion through which the door pusher moves, and the stopper is configured to be locked to the case entrance and exit portion when the door pusher reaches the second pusher position.

10. The refrigerator of claim 1, further comprising:

a power source configured to transmit power to the door pusher; and a controller electrically connected to the power source, wherein the controller is configured to control the power source to operate the door pusher to press the door until the lever is in contact with the second contact surface based on a condition for opening the storage compartment.

11. The refrigerator of claim 10, wherein the door pusher is configured to be movable between a first pusher position, which is a position of the door pusher while the storage compartment is closed, and a second pusher position to which the door pusher moves to press the door in the direction of opening the storage compartment, and the controller is configured to control the power source to transmit power to operate the door pusher until the door pusher reaches the second pusher position, based on the condition for opening the storage compartment.

12. The refrigerator of claim 11, further comprising:

a position detection sensor electrically connected to the controller, and configured to detect a position of the door pusher, wherein, based on the door pusher reaching the second pusher position, the controller is configured to control the power source to operate the door pusher to stop or to move to the first pusher position.

13. The refrigerator of claim 1, wherein the door is a first door, the refrigerator further comprises:

a second door disposed in parallel with the first door, and configured to be rotatable so as to open and close the storage compartment, and a rotation bar coupled to the first door so as to be rotatable relative to the first door, and configured to cover a gap between the first door and the second door while the first door and the second door are in positions closing the storage compartment, the rotation bar is configured to be rotatable between a first bar position with respect to the first door corresponding to the position of the first door in which the storage compartment is closed, and a second bar position with respect to the first door corresponding to a position of the first door in which the storage compartment is open, while the first door is rotated from the position in which the storage compartment is closed, by an angle less than a first opening angle, the lever is in contact with the first contact surface and the rotation bar is biased to rotate to the first bar position, while the first door is rotated from the position in which the storage compartment is closed, by an angle that is greater than the first opening angle but less than a second opening angle greater than the first opening angle, the lever is in contact with the first contact surface and the rotation bar is biased to rotate to the second bar position, and the lever is in contact with the second contact surface when the first door is rotated, from the position in which the storage compartment is closed, by the second opening angle.

14. The refrigerator of claim 1, further comprising:

a hinge bracket connecting the main body and the door to support the door so that the door is rotatable with respect to the main body, wherein the guide is coupled to the hinge bracket.

* * * * *